US012637888B2

(12) United States Patent
Bacchetti

(10) Patent No.: US 12,637,888 B2
(45) Date of Patent: May 26, 2026

(54) HYDRAULIC HINGE FOR THE CONTROLLED ROTARY MOVEMENT OF A DOOR, A LEAF OR THE LIKE

(71) Applicant: IN & TEC S.r.l., Brescia (IT)

(72) Inventor: Luciano Bacchetti, Nave (IT)

( * ) Notice: Subject to any disclaimer, the term of this patent is extended or adjusted under 35 U.S.C. 154(b) by 128 days.

(21) Appl. No.: 18/556,864

(22) PCT Filed: Apr. 27, 2022

(86) PCT No.: PCT/IB2022/053913
§ 371 (c)(1),
(2) Date: Oct. 23, 2023

(87) PCT Pub. No.: WO2022/229878
PCT Pub. Date: Nov. 3, 2022

(65) Prior Publication Data

US 2024/0200383 A1 Jun. 20, 2024

(30) Foreign Application Priority Data

Apr. 29, 2021 (IT) ........................ 102021000010823
Apr. 29, 2021 (IT) ........................ 102021000010829
(Continued)

(51) Int. Cl.
*E05F 3/10* (2006.01)
*E05F 3/12* (2006.01)
*E05F 3/20* (2006.01)

(52) U.S. Cl.
CPC ................ *E05F 3/104* (2013.01); *E05F 3/12* (2013.01); *E05F 3/20* (2013.01)

(58) Field of Classification Search
CPC ..... E05F 3/104; E05F 3/12; E05F 3/20; E05F 3/10; E05F 3/04; E05Y 2900/132; E05Y 2201/21; E05Y 2201/264; E05Y 2201/458
See application file for complete search history.

(56) References Cited

U.S. PATENT DOCUMENTS 3,222,709 A * 12/1965 Ellis ........................ E05F 3/106 16/56
3,358,318 A * 12/1967 Ingham ..................... E05F 3/12 188/316
(Continued)

FOREIGN PATENT DOCUMENTS

AU 2010100487 A4 * 7/2010 ......... E05D 11/1064
AU 2011101327 A4 * 11/2011 ........... E05D 5/0246
(Continued)

*Primary Examiner* — Jason W San
*Assistant Examiner* — Matthew J Sullivan
(74) *Attorney, Agent, or Firm* — Themis Law

(57) ABSTRACT

A hydraulic hinge device for the controlled rotary movement of a closing element that can be anchored to a stationary support structure includes a shell, a pivot defining a first axis arranged to rotate around the first axis, and a system that controls the flow of a working fluid and that includes a first hydraulic working chamber fluidically connected to a second hydraulic working chamber and a first and a second stem slidable along respective second and third axes. The shell has an internal compartment that houses the pivot and the control system, and that provides a hydraulic portion including the working chambers and a dry portion including the pivot and the ends of the stems. The pivot has a cam susceptible to selectively and alternately dry-interact with a corresponding cam follower system integrally coupled to the stems.

14 Claims, 36 Drawing Sheets

(30) Foreign Application Priority Data

| | | |
|---|---|---|
| Apr. 29, 2021 | (IT) | 102021000010835 |
| Apr. 29, 2021 | (IT) | 102021000010841 |
| Apr. 29, 2021 | (IT) | 102021000010856 |

(56) References Cited

U.S. PATENT DOCUMENTS

| | | | | | |
|---|---|---|---|---|---|
| 4,103,392 | A * | 8/1978 | MacDonald | E05F 3/20 | 16/54 |
| 4,148,111 | A * | 4/1979 | Lieberman | E05F 3/12 | 16/84 |
| 4,386,446 | A * | 6/1983 | Zunkel | E05F 3/12 | 16/DIG. 21 |
| 4,693,454 | A * | 9/1987 | Tsuchiya | E05F 5/10 | 16/84 |
| 6,519,811 | B1 * | 2/2003 | Cheng | E05D 5/0246 | 16/334 |
| 8,539,643 | B2 * | 9/2013 | Hung | E05F 3/12 | 16/54 |
| 8,720,005 | B2 * | 5/2014 | Cheng | E05D 5/0246 | 16/54 |
| 10,337,229 | B2 * | 7/2019 | Beattie | E05F 3/20 | |
| 11,105,136 | B2 * | 8/2021 | Walter | F16K 17/30 | |
| 2004/0088822 | A1 * | 5/2004 | Huang | E05F 3/104 | 16/60 |
| 2008/0034535 | A1 * | 2/2008 | Chiang | E05F 3/10 | 16/60 |
| 2012/0216370 | A1 * | 8/2012 | Chow | E05F 3/20 | 16/386 |
| 2014/0068893 | A1 * | 3/2014 | Hung | E05F 3/20 | 16/52 |

FOREIGN PATENT DOCUMENTS

| | | | | |
|---|---|---|---|---|
| DE | 3519478 | | 12/1986 | |
| DE | 3519478 | A1 * | 12/1986 | |
| DE | 102009034740 | A1 * | 1/2011 | E05F 3/104 |
| DE | 102017209915 | A1 * | 12/2018 | E05F 15/63 |
| EP | 0663504 | | 7/1995 | |
| EP | 3431688 | A1 * | 1/2019 | E05C 17/305 |
| GB | 852213 | | 12/1960 | |
| GB | 2401148 | A * | 11/2004 | E05F 3/108 |
| GB | 2568530 | | 5/2019 | |
| GB | 2568530 | A * | 5/2019 | E05F 3/12 |
| IT | 202100010835 | A1 * | 10/2022 | E05F 3/20 |
| IT | 202100010856 | A1 * | 10/2022 | E05F 3/104 |
| IT | 202100010859 | A1 * | 10/2022 | E05F 3/12 |
| JP | H04118486 | A * | 4/1992 | |
| JP | 2024517726 | A * | 4/2024 | E05F 3/104 |

* cited by examiner

HYDRAULIC HINGE FOR THE CONTROLLED ROTARY MOVEMENT OF A DOOR, A LEAF OR THE LIKE

TECHNICAL FIELD

The present invention generally relates to the technical field of mechanics, and it particularly relates to a hinge device for the controlled rotary movement of a door, a door leaf or the like.

STATE OF THE ART

Hinges for the rotatable movement of a door, door leaf or the like which generally comprise a hinge body and a pivot rotatably connected to each other to mutually rotate between a door open position and a door closed position, are known.

The known hinges can be improved, in particular as regards costs, ease of construction and functionality.

In particular, hinges of the state of the art have the drawback lying in the fact that in the event of a gust of wind acting on the door, the latter can impact against possible obstacles, ending up damaged or broken.

SUMMARY OF THE INVENTION

An object of the present invention is to at least partly overcome the drawbacks illustrated above by providing hydraulic hinge device that is highly functional and cost-effective.

Another object of the invention is to provide a hydraulic hinge device that ensures control of the closing element both to open and to close.

Another object of the invention is to provide a hydraulic hinge device that is highly durable over time.

Another object of the invention is to provide a hydraulic hinge device that is simple to manufacture.

Another object of the invention is to provide a hydraulic hinge device that is small in size.

Another object of the invention is to provide a hydraulic hinge device that has a minimum number of components.

Another object of the invention is to provide a safe hydraulic hinge device.

Another object of the invention is to provide a hydraulic hinge device that is easy to install.

These and other objects which will be more apparent hereinafter, are attained by a hydraulic hinge device as described, illustrated and/or claimed herein.

The dependent claims define advantageous embodiments of the invention.

BRIEF DESCRIPTION OF THE DRAWINGS

Further characteristics and advantages of the invention will be more apparent in light of the detailed description of a preferred but non-exclusive embodiment of the invention, illustrated by way of non-limiting example with reference to the attached drawings, wherein.

DETAILED DESCRIPTION OF SOME PREFERRED EMBODIMENTS

With reference to the attached figures, herein described is a control unit 1, which will be particularly useful for controlling the flow of a working fluid, preferably an incompressible working fluid, for example oil.

Figures 59, 60A, 60B:
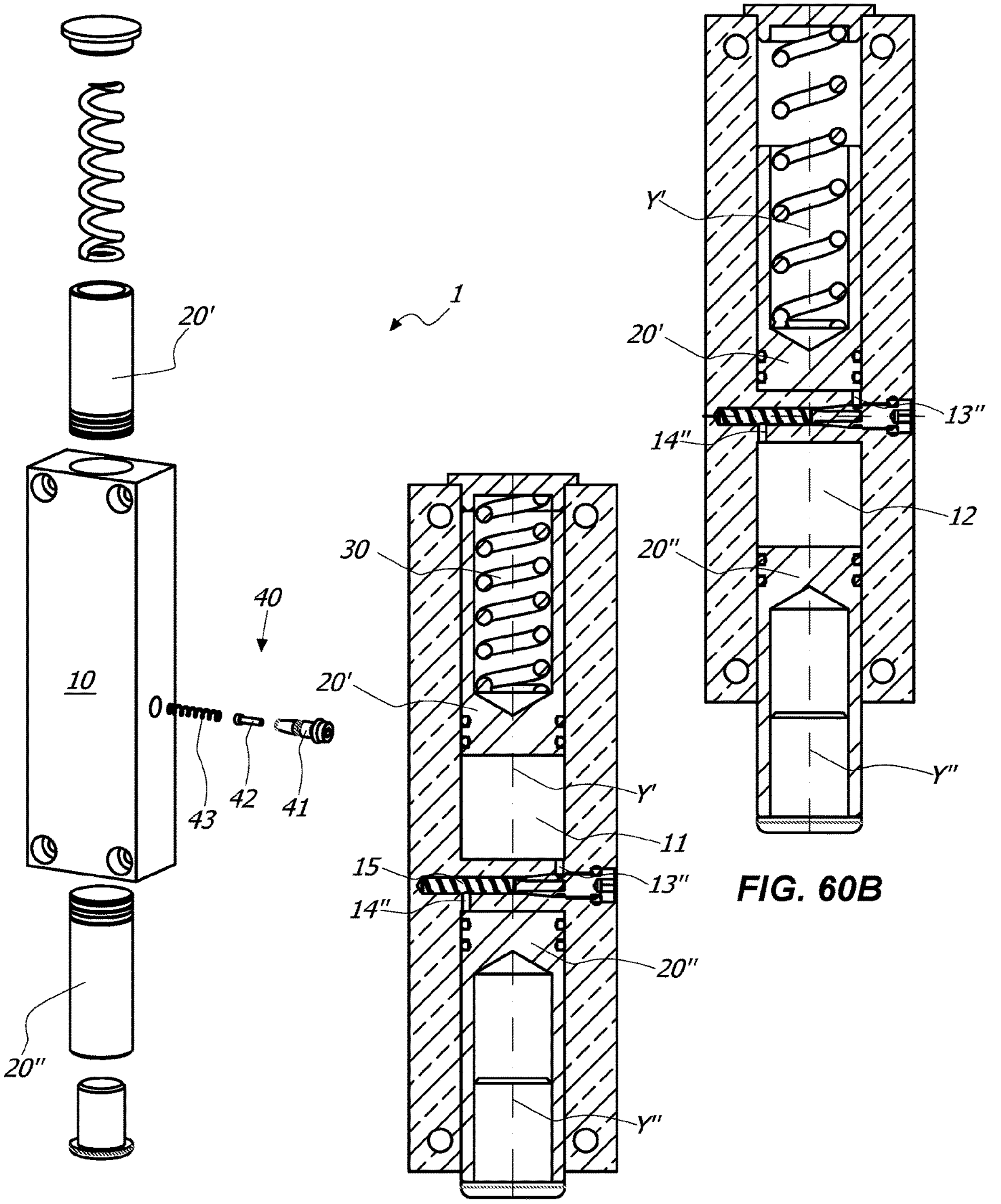
FIG. 59 is an exploded axonometric schematic view of a further embodiment of a control unit 1.
FIGS. 60A and 60B are axial cross-sectional views of the control unit 1 of FIG. 59 in two different operative positions.

The control unit 1 may be used for any purpose, for example it may be used as a unilateral decelerator, as shown in FIGS. 59-60B, or bilateral, as shown in FIGS. 61-64B.

The control unit 1 may also be used in any device. For example, the decelerators shown in FIGS. 59-64B may be used in machine tools or slidable doors.

In particular, the control unit 1 may be used in a closing or control hinge device 100, as shown in FIGS. 5 to 8, 15 to 28B, 33 to 41, 47 to 51, 56 to 58 and 65 to 69B.

It is clear that mentioning one or more figures in relation to particular embodiments of the invention is to be considered as an exemplifying and non-limiting example of the invention. The same embodiment there may be shown in other figures, although not specifically mentioned.

Essentially, the control unit 1 may consist of a main body 10 into which two or more stems 20', 20" are slidably inserted.

Although hereinafter reference will be made to a control unit 1 with two stems 20', 20", it is clear that the control unit 1 may also include more than two stems without departing from the scope of protection of the attached claims. Obviously, a control unit 1 which includes more than two stems will be configured as a result.

The present invention may include various parts and/or similar or identical elements. Unless otherwise specified, similar or identical parts and/or elements will be indicated using a single reference number, it being clear that the described technical features are common to all similar or identical parts and/or elements.

Figure 61:
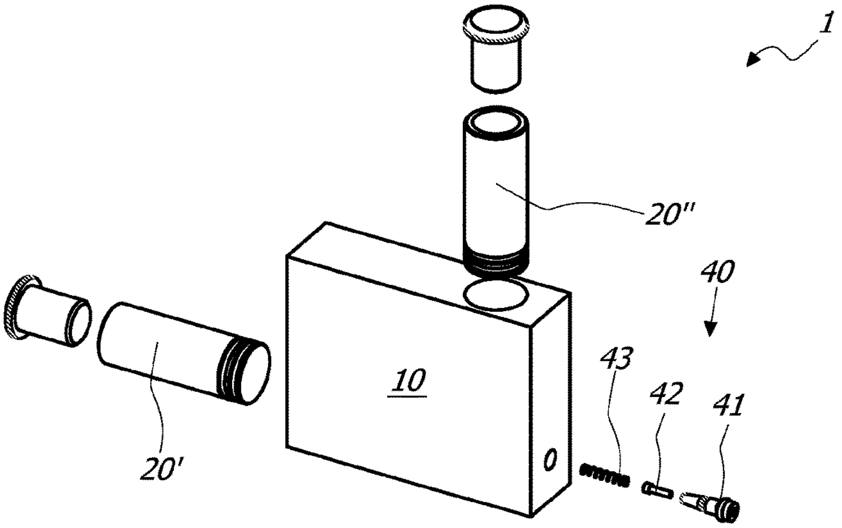
FIG. 61 is an exploded axonometric schematic view of a further embodiment of a control unit 1.
Figure 62A:
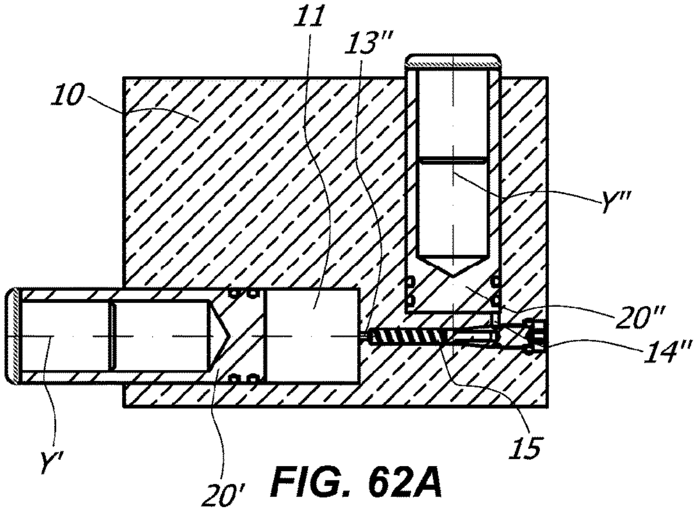
FIGS. 62A and 62B are axial cross-sectional views of the control unit 1 of FIG. 61 in two different operative positions.
Figure 62B:
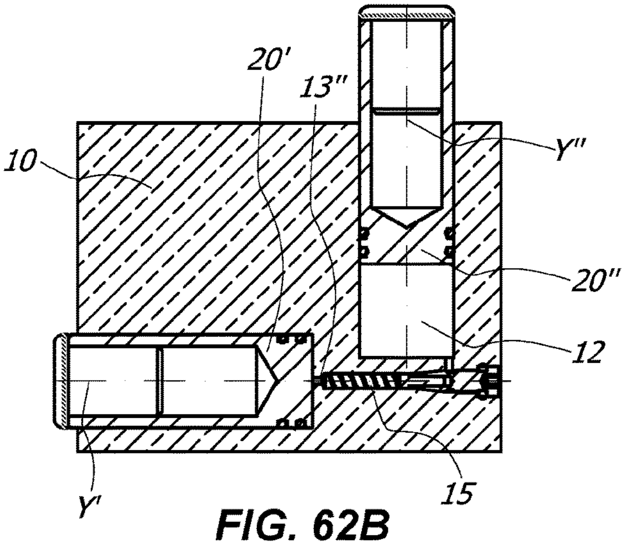
Figure 63:
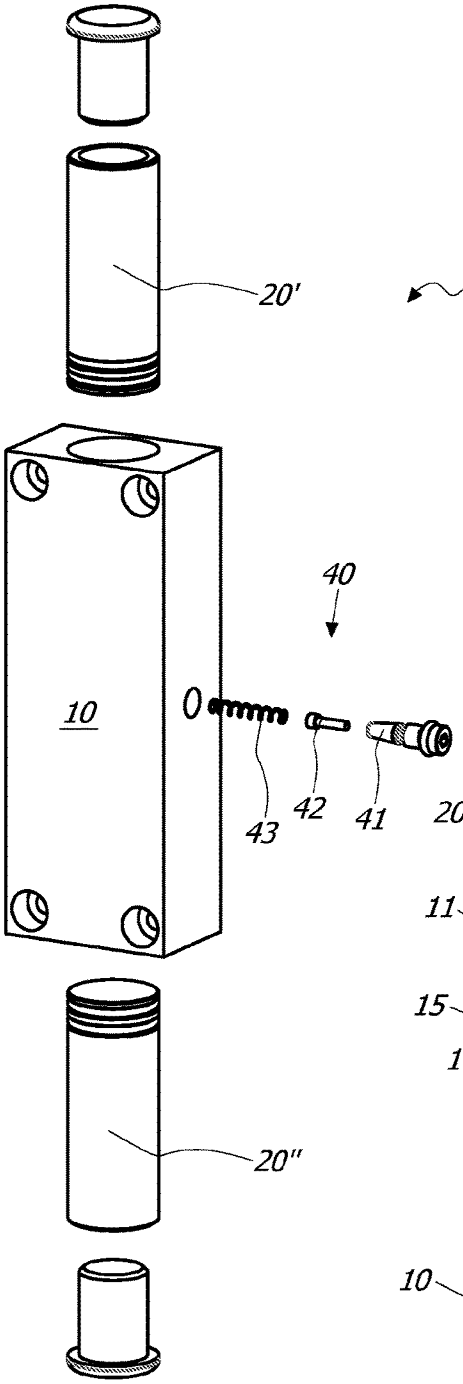
FIG. 63 is an exploded axonometric schematic view of a further embodiment of a control unit 1.
Figure 64B:
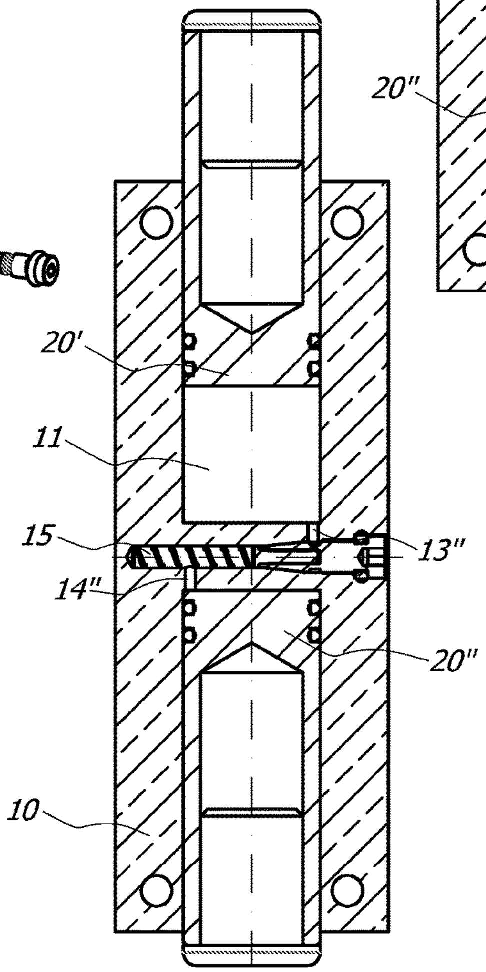
FIGS. 64A and 64B are axial cross-sectional views of the control unit 1 of FIG. 63 in two different operative positions.
Figure 64A:
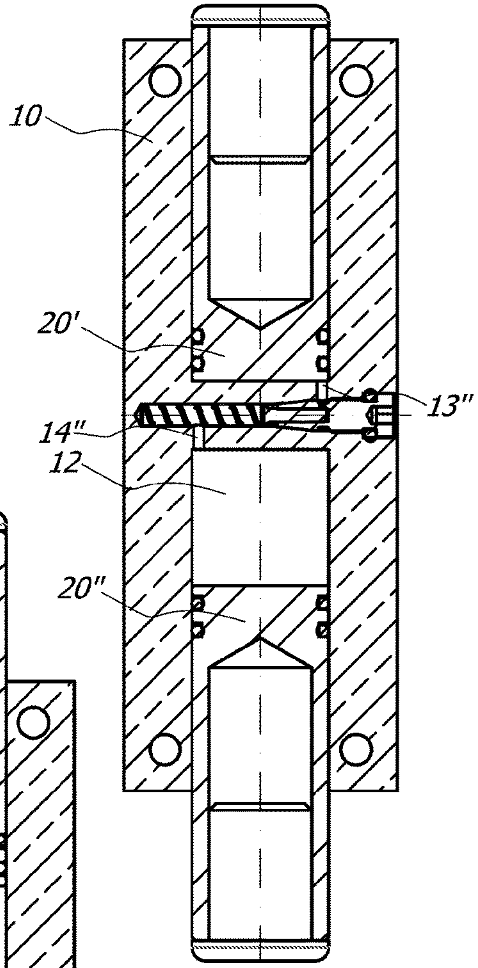
Figure 65:
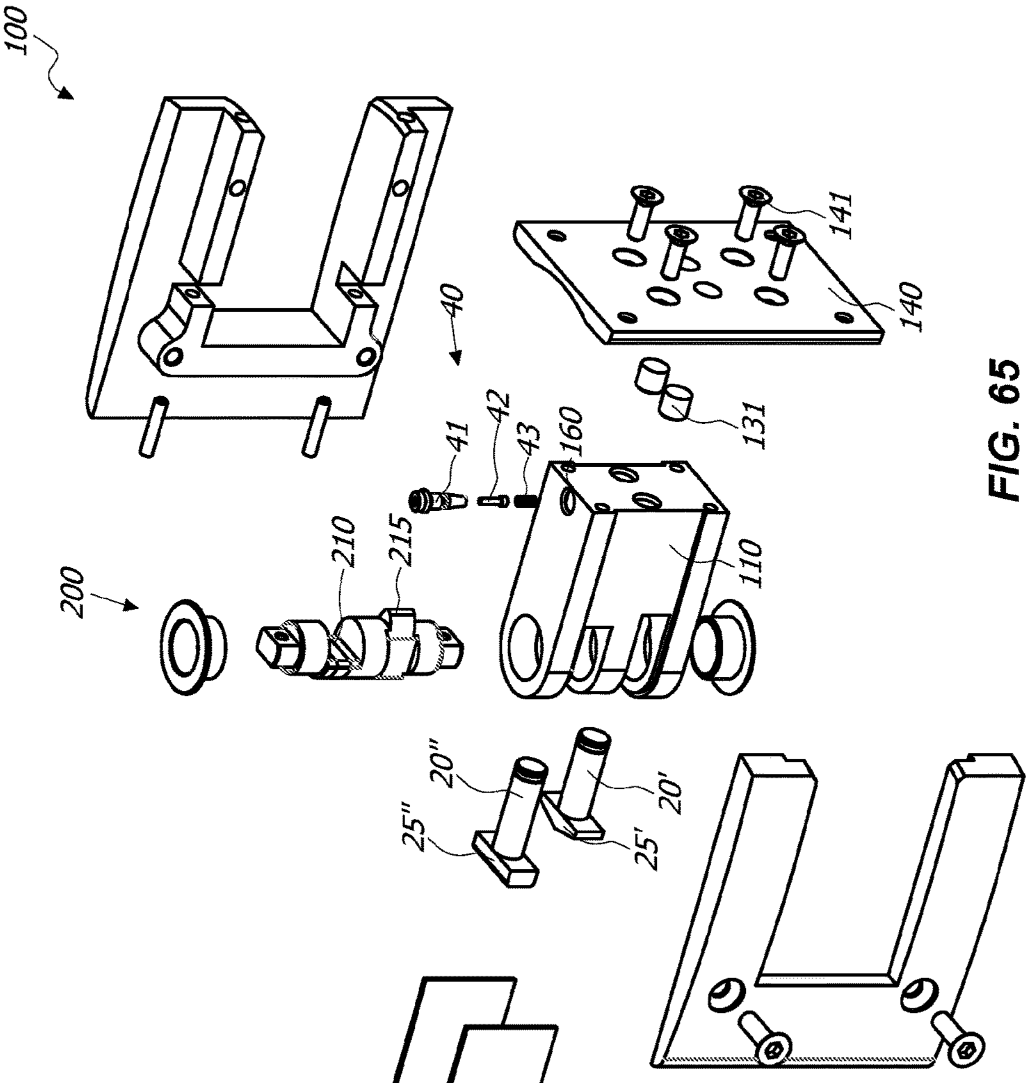
FIG. 65 is an exploded axonometric schematic view of a further embodiment of a hydraulic hinge device 100 in which the unit 1 is integrated in the hinge body 110, without springs.
Figure 66:
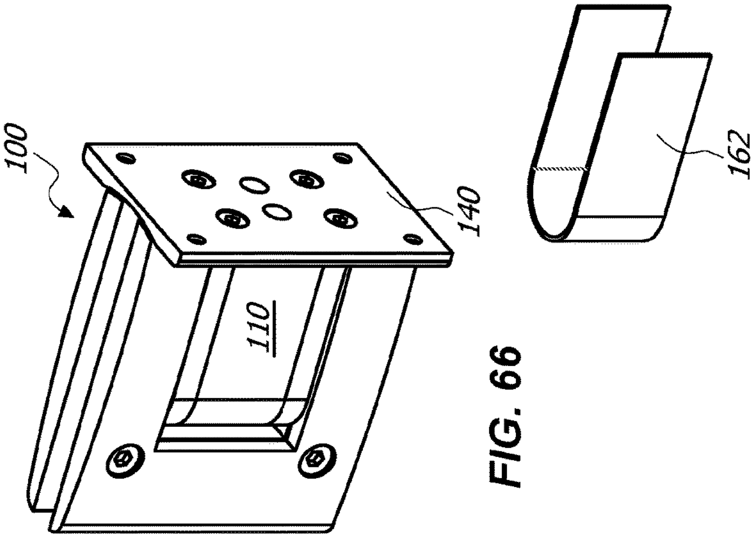
FIG. 66 is an assembled axonometric schematic view of the embodiment of the hydraulic hinge device 100 of FIG. 65.
Figure 67:
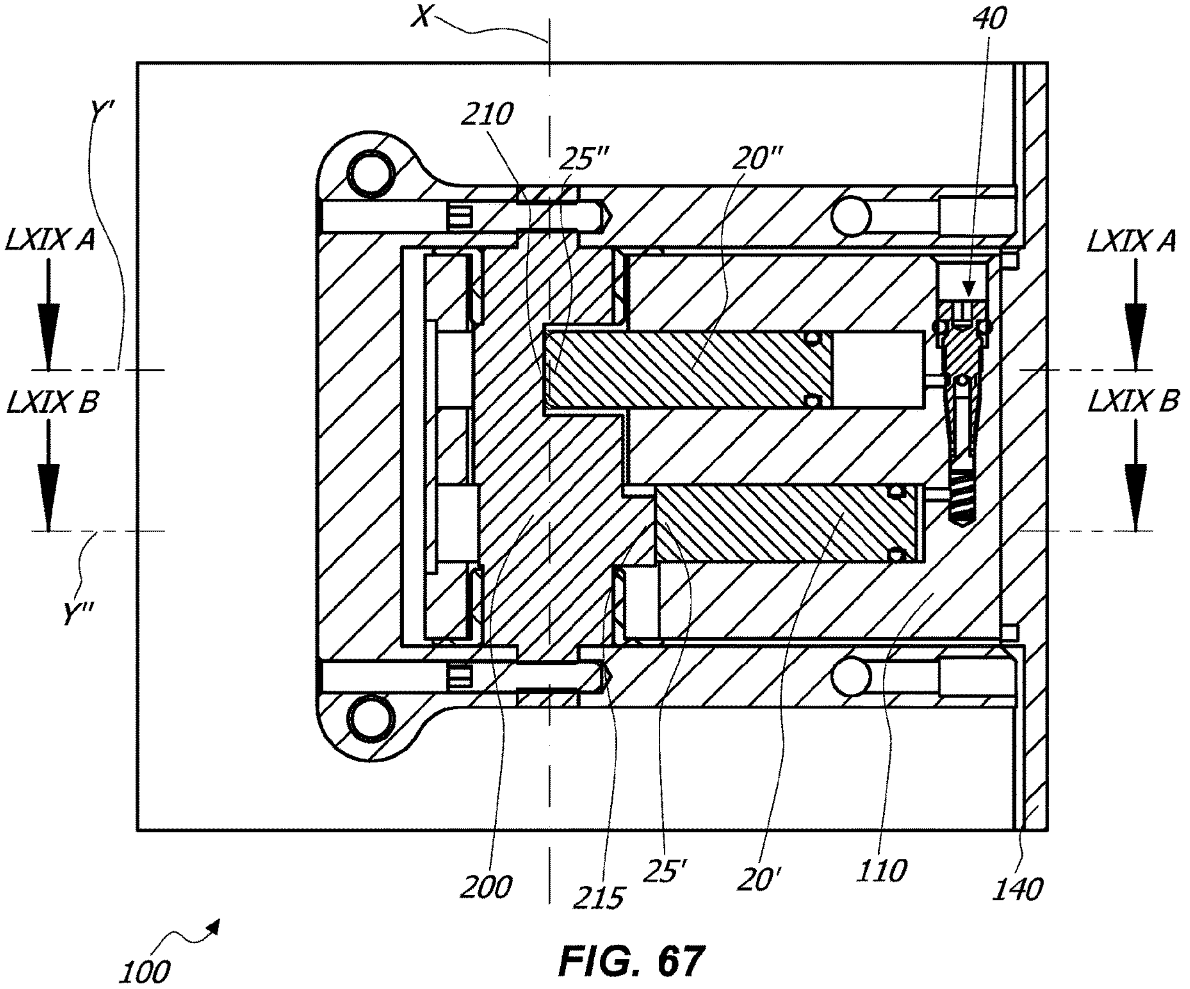
FIG. 67 is an axial cross-sectional view of the embodiment of the hydraulic hinge device 100 of FIG. 65.

The main body 10 may include two working chambers 11 and 12 arranged side by side and defining respective axes Y' and Y", which may preferably be substantially parallel, but also substantially coincident, as shown in the embodiment of FIGS. 63-64B, or substantially perpendicular, as shown in the embodiment of FIGS. 59-60B and 61-62B.

Such axes Y' and Y" may also define the sliding axes of the two stems 20', 20". The working chambers 11, 12 may include the working fluid, which will flow therein under the thrust of the stems 20', 20".

Each working chamber 11, 12 may include respective end openings 13', 13" and 14', 14", which may preferably be arranged along the axes Y' and Y".

The two stems 20', 20" may be inserted into the working chambers 11, 12 through the openings 13', 14', so as to have ends 21', 22' inside the working chambers 11, 12 and opposite ends 21", 22" outside them.

On the other hand, the openings 13", 14" may be fluidically connected to each other by means of the duct 15, which may preferably be substantially perpendicular to the axes Y' and Y", but also parallel to only one of them, as shown in the embodiment of FIGS. 61-62B.

The geometry and relative positions of the components shown above shall not be deemed to be limiting, but merely an illustration of the invention. The geometry and the relative positions of the components may be of any type, without departing from the scope of protection of the attached claims.

Thanks to the above characteristics, the sliding of the stem 20' along the axis Y' from the opening 13' toward the opening 13", will correspond to the sliding of the stem 20" in the opposite direction along the axis Y" from the opening 14" toward the opening 14', and vice versa.

Figure 3B:
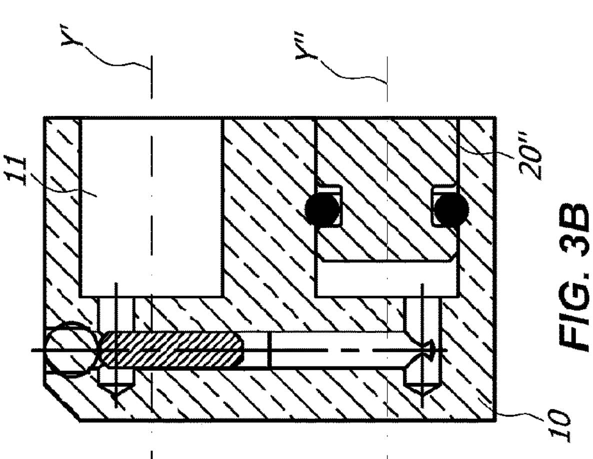
Figure 3A:
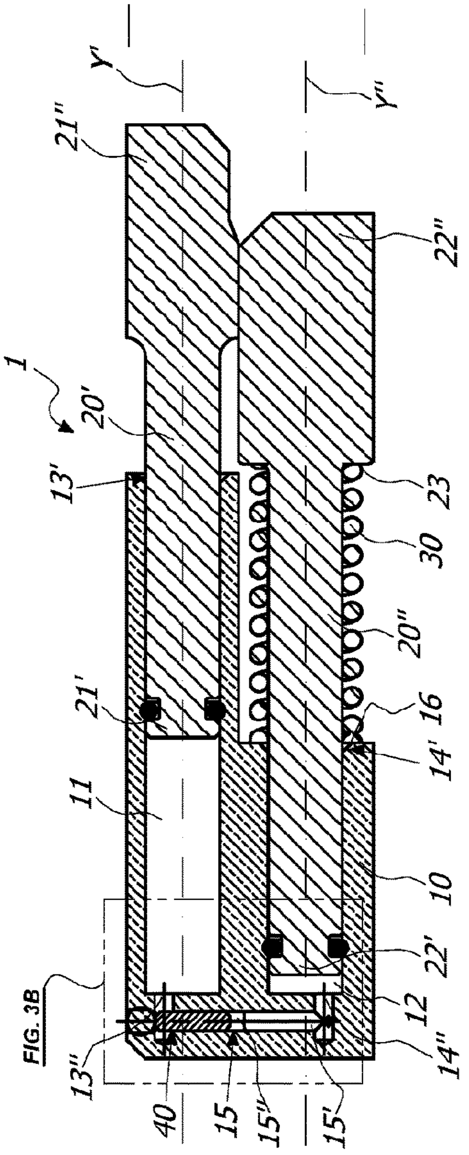
Figure 4B:
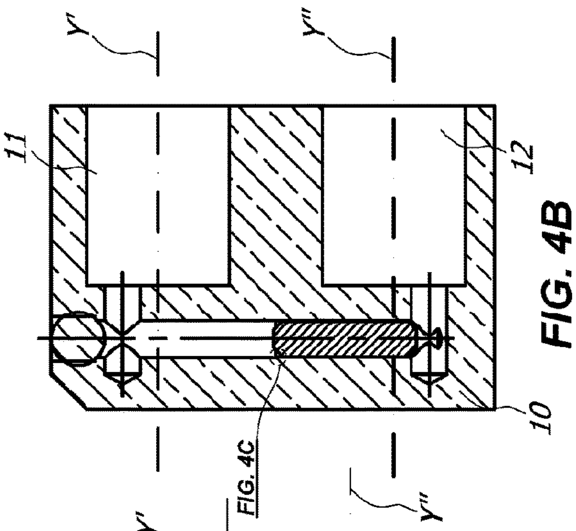
Figure 4A:
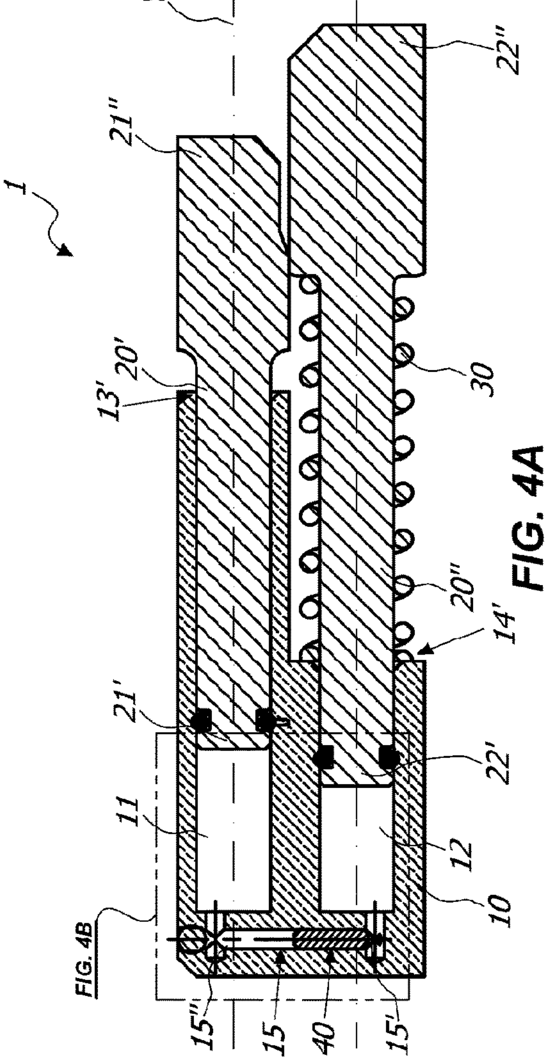

The flow of the working fluid through the fluidic connection line defined by the openings 13", 14" and by the duct 15 will actually ensure that to the sliding of the stem 20' along the axis Y' from the distal position of the end 21' from the opening 13', for example shown in FIG. 3A, toward the one proximal thereto, for example shown in FIG. 3B, there will correspond the sliding of the stem 20" in the opposite direction along the axis 20" from the proximal position of the end 22' to the opening 14', for example shown in FIG. 3A, toward the one proximal thereto, for example shown in FIG. 3B, and vice versa.

Basically, the working fluid will transmit the thrust exerted on one of the two stems 20', 20" from the external toward the internal of the main body 10 onto the other stem, which will be pushed from the internal toward the external.

In a preferred but non-exclusive embodiment, the control unit 1 may include one or more elements 40 for adjusting the flow of the working fluid between the working chambers 11, 12.

Although hereinafter reference will be made to a single adjustment element 40, it is clear that the control unit 1 may also include more than one adjustment element without departing from the scope of protection of the attached claims. Obviously, a control unit 1 which includes more than one adjustment element will be configured as a result.

Suitably, the adjustment element 40 may be at least partially inserted into the fluidic connection line defined by the openings 13", 14" and by the duct 15 to interact with at least one passage section thereof, therefore adjusting the flow of the working fluid.

In a preferred but non-exclusive embodiment, for example shown in FIGS. 1 to 8, the adjustment element 40 may be a shutter element, for example a pin having a diameter D40, movable between two upper and lower passage sections 15', 15" of the duct 15, having a diameter of D15' and D15" respectively.

Suitably, the diameter D40 is slightly smaller than the diameter D15', for example a few tenths of millimetres, and the diameter D15' is slightly smaller than the diameter D15", for example still a few tenths of millimetres.

Thanks to the configuration above, when the pivot 40 is in the lower passage section 15', the flow of the working fluid flowing through the interspace between the latter is smaller than the one flowing through the interspace between the pivot 40 and the upper passage section 15".

The alternate sliding of the pivot 40 between the two upper and lower passage sections 15', 15" may occur due to the oil pressure imparted by the movement of the stems 20', 20".

Figure 11:
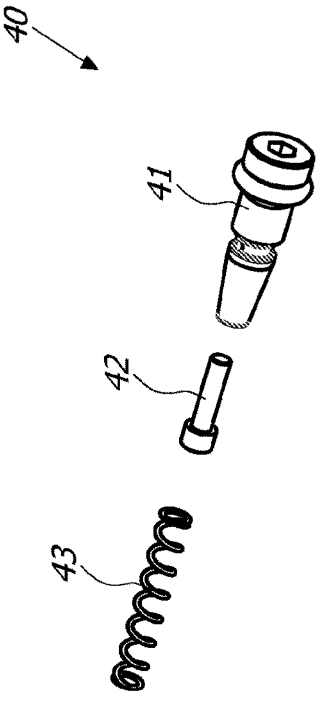
Figure 11:
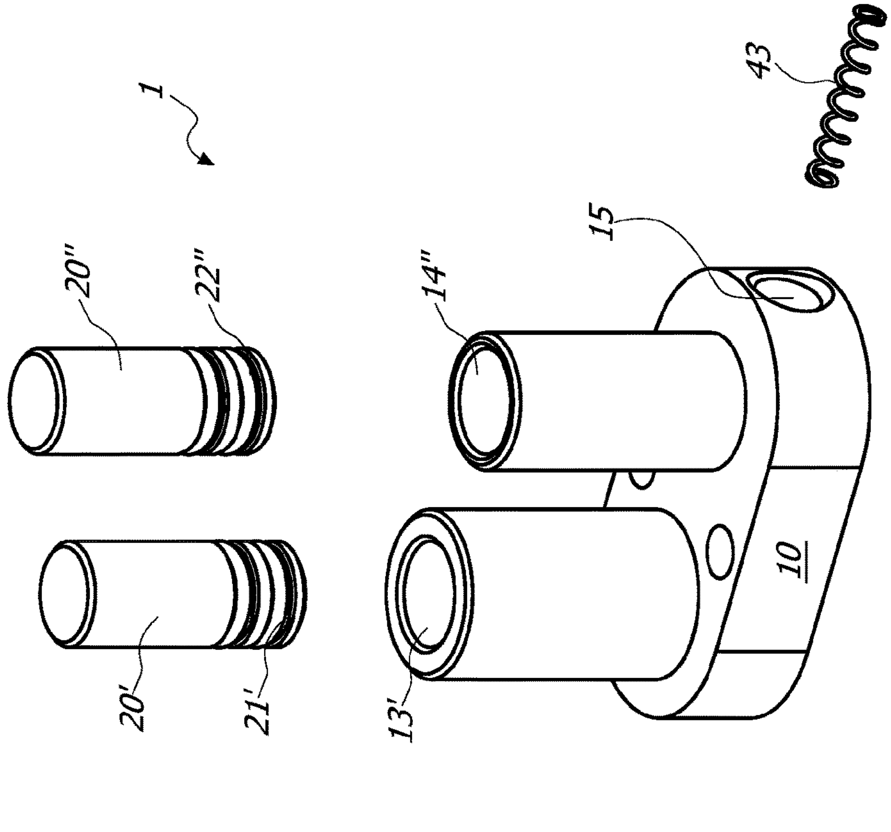

In a further preferred but not exclusive embodiment, for example shown in FIGS. 11 to 64B, the adjustment element 40 may comprise a screw element 41 engaged in a nut screw 17 for widening/narrowing the passage section 15'" of the duct 15.

A plug element 42 elastically forced by means of a spring 43 against the end 41" of the screw element 41, which, furthermore, may have an opposite vacant end 41' which can be controlled from the external by an operator, may also be provided for. It is clear that the plug element 42 may also be simply slidable without spring 43, without departing from the scope of protection of the attached claims.

Suitably, the passage section 15" of the duct 15 may having a substantially frustoconical shape, same case applying to the end 41" of the screw element 41. Preferably, the passage section 15'" may be calibrated.

A passage opening 44", which may be placed in fluid communication with the opening 13" and may be selectively closed by the plug element 42, may be provided for at the end 41".

Furthermore, a passage opening 44', which may be placed in fluid communication with the opening 14', may be provided for at the end 41'.

Furthermore, the screw element 41 may include an internal duct 45 extending between the passage openings 44', 44" to place them in mutual fluid communication.

Suitably, the plug element 42 may have a substantially mushroom-like shape, with an enlarged end 42' at the end 44" and a stem 42" slidably inserted into the internal duct 45 of the screw element 41.

Figures 13A, 13B, 14A, 14B:
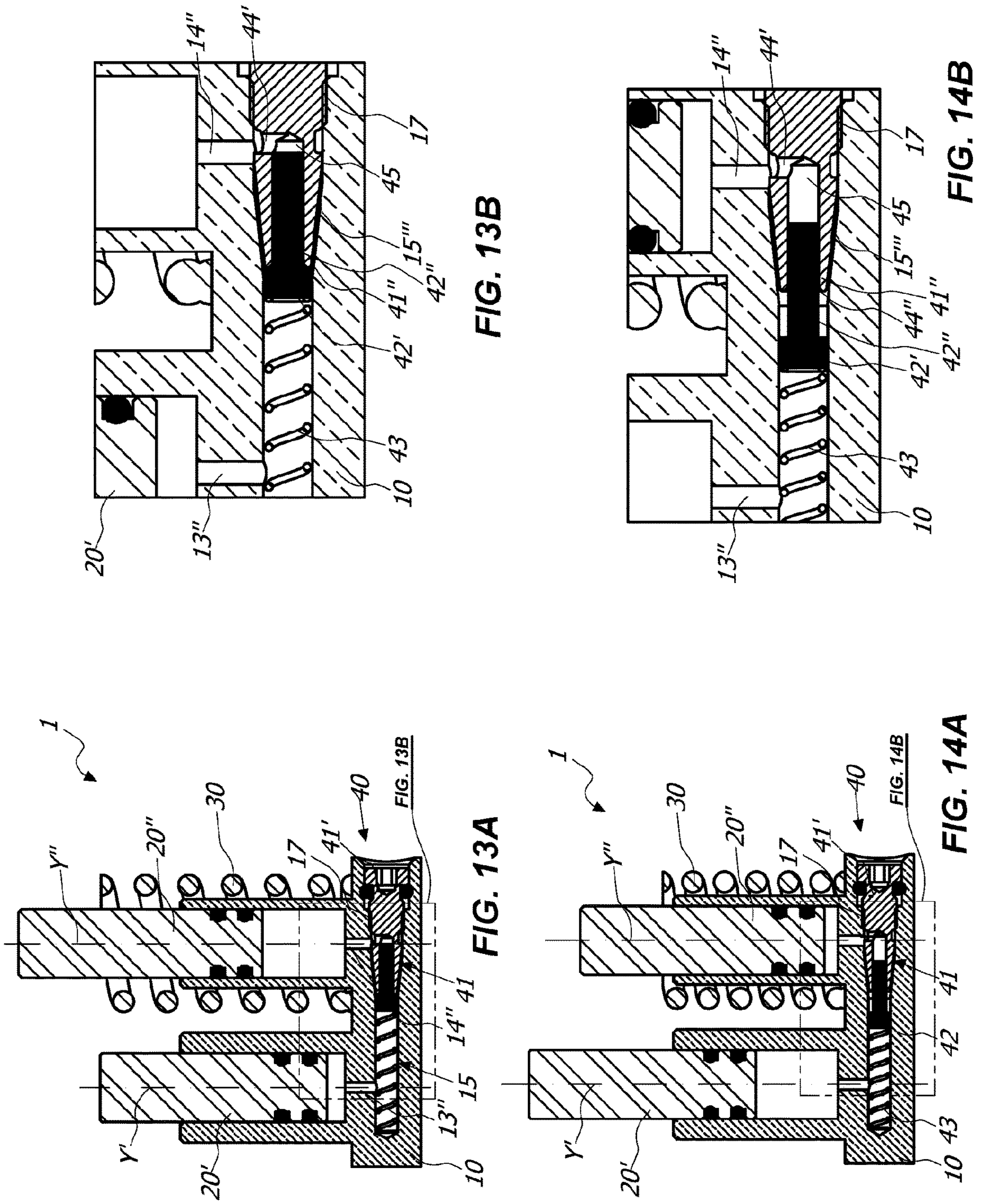
FIGS. 13A and 14A are axial cross-sectional views of the embodiment of the unit 1 of FIGS. 11 and 12 respectively during closing and opening the closing element P, with FIGS. 13B and 14B showing some enlarged details.
Figure 16:
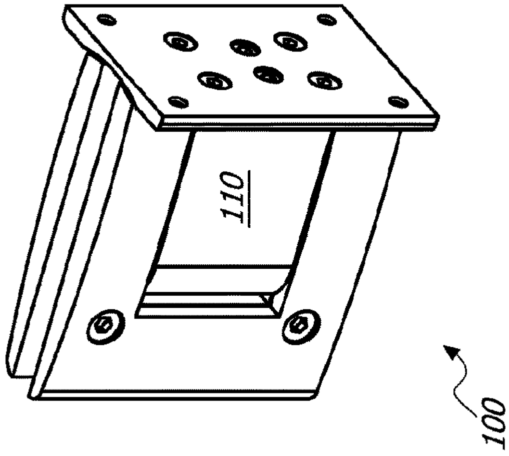
FIGS. 15 and 16 are axonometric schematic views—respectively exploded and assembled—of a second embodiment of a hydraulic hinge device 100 which includes the embodiment of the unit 1 of FIGS. 11 and 12.

The spring 43 may be suitably sized so that when the stem 20" slides from the distal position for example shown in FIG. 13A to the proximal one for example shown in FIG. 14A the plug element 42 opens, vacating the passage opening 44" and allowing the working fluid to controllably flow through the interspace between the internal duct 45 and the stem 42" of the plug element 42.

However, upon the reverse passage, the plug element 42 will close, plugging the passage opening 44" and forcing the working fluid to controllably flow through the passage section 15"".

Therefore, basically, the spring 43—plug element 42 assembly acts as one-way valve means for controlling the flow of the working fluid.

The flow of the working fluid through the duct 15 will always be controlled in both directions. The difference of diameters between the internal duct 45 and the stem 42" of the plug element 42 will actually control the flow of the working fluid in one direction, while the size of the passage section 15" will control the flow of the working fluid inn the reverse direction.

In order to protect the control unit 1 from possible sudden pressure increases therein, an overpressure valve element 50 may be provided for lying in a duct 18 fluidically connected with the duct 15.

The overpressure valve element 50 may include a spring 51 and a shutter 52, for example a ball shutter, elastically forced against a seat obtained in the duct 18. The spring 51 and the shutter 52 may be held in operative position by a grub screw 53.

Suitably, the spring 51 may be sized so that the shutter 52 exclusively opens when the pressure inside the working chambers 11, 12 or in the duct 15 exceeds a predetermined threshold value, calculated so as to damage to the control unit 1.

Advantageously, the control unit 1 may include elastic counteracting means, for example one or more helical springs 30.

Depending on the function of the device into which the control unit 1 will be inserted, the one or more springs 30 may be thrust or return springs.

Advantageously, each spring 30 may be coaxially inserted onto the respective stem 20', 20" and interposed between an abutment surface 16 of the main body 10 and an abutment surface 23 of such spring 20', 20". Alternatively, the spring 30 may be arranged inside the stem, as shown in FIGS. 59-60B.

Suitably, the one or more springs 30 may exclusively act on one of the stems, for example the stem 20", while the other stem, for example the stem 20', may be free to slide along the respective axis Y' without elastic counteracting means.

Figure 29:
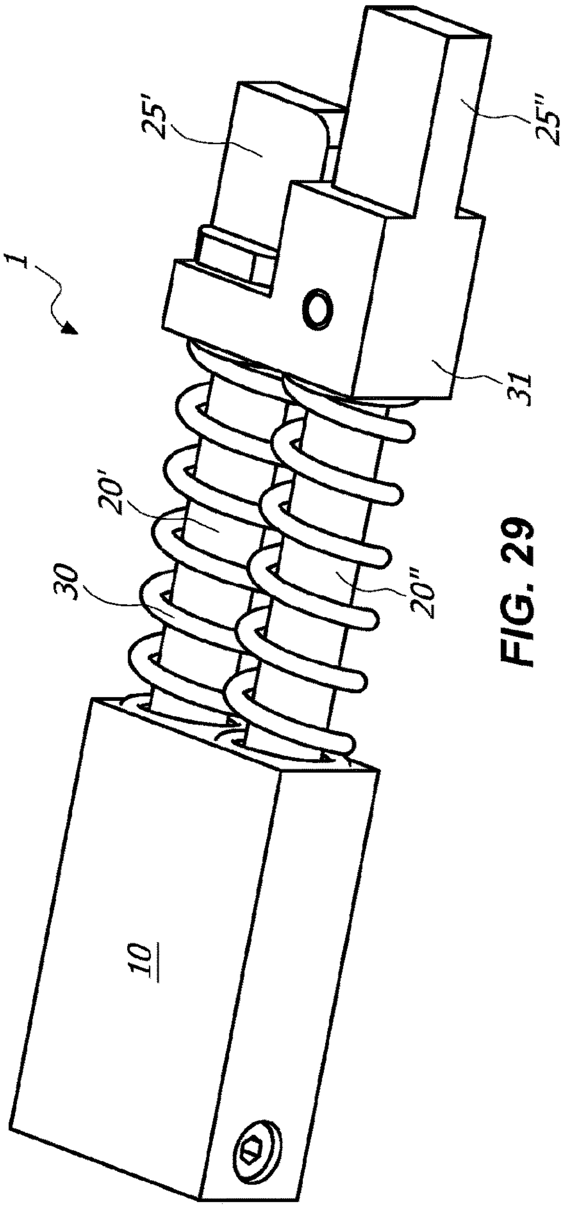
FIGS. 29 and 30 are axonometric schematic views—respectively assembled and exploded—of a third embodiment of a control unit 1.
Figure 30:
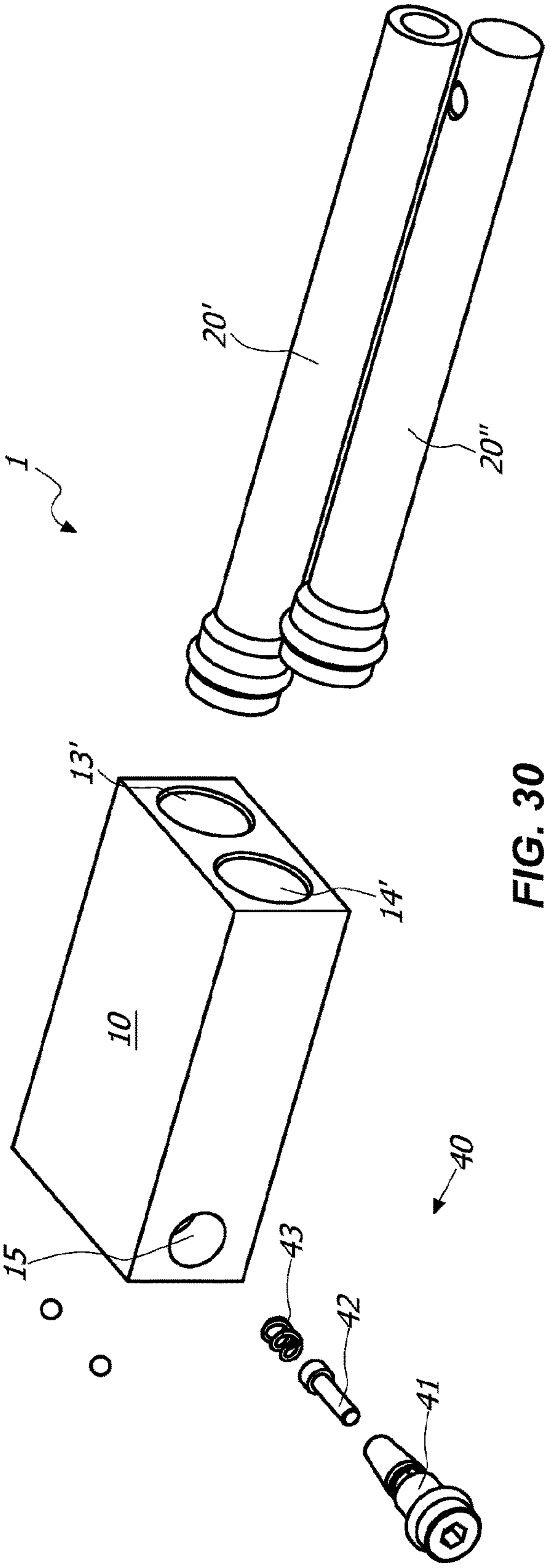
Figure 31B:
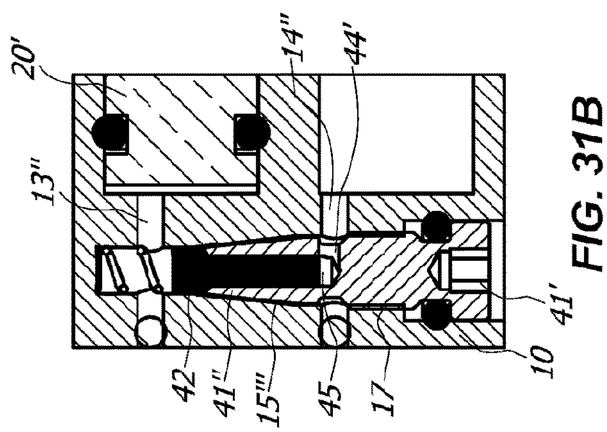
FIGS. 31A and 32A are axial cross-sectional views of the embodiment of the unit 1 of FIGS. 29 and 30 respectively during closing and opening the closing element P, with FIGS. 31B and 32B showing some enlarged details.
Figure 31A:
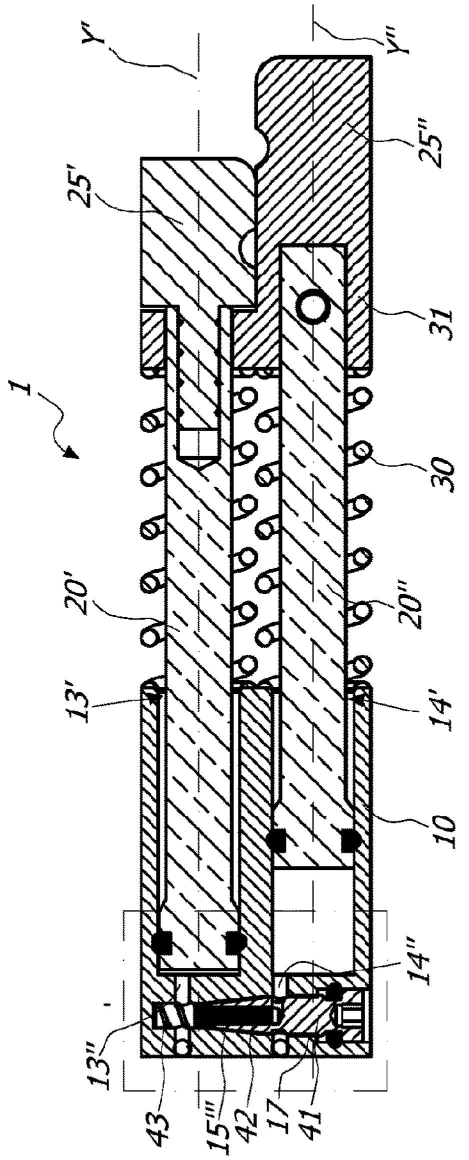
Figure 32B:
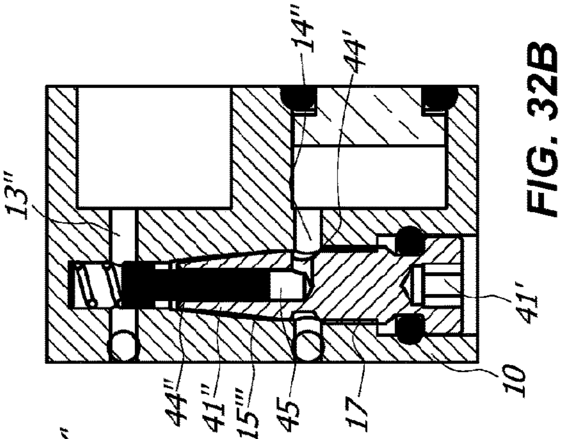
Figure 32A:
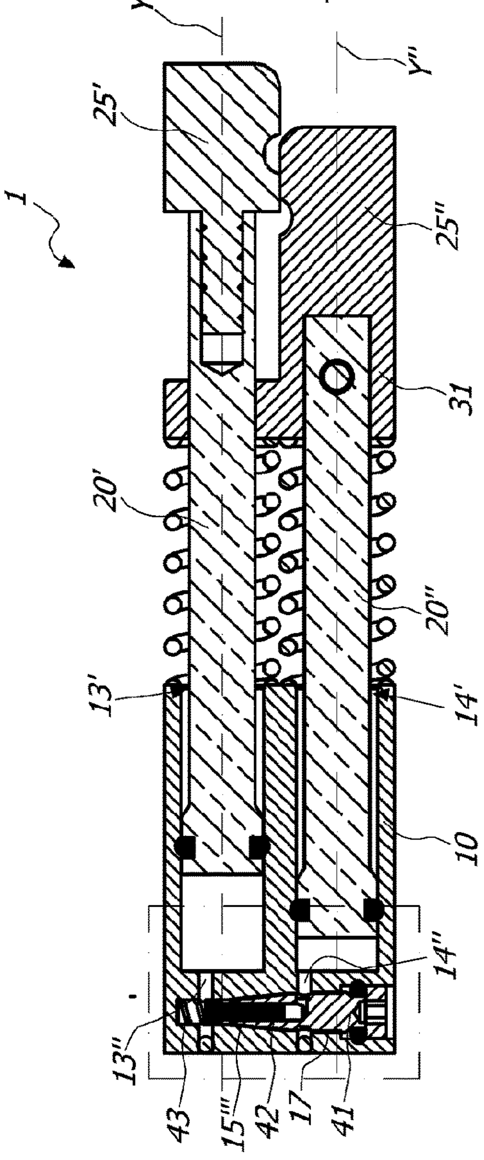
Figure 33:
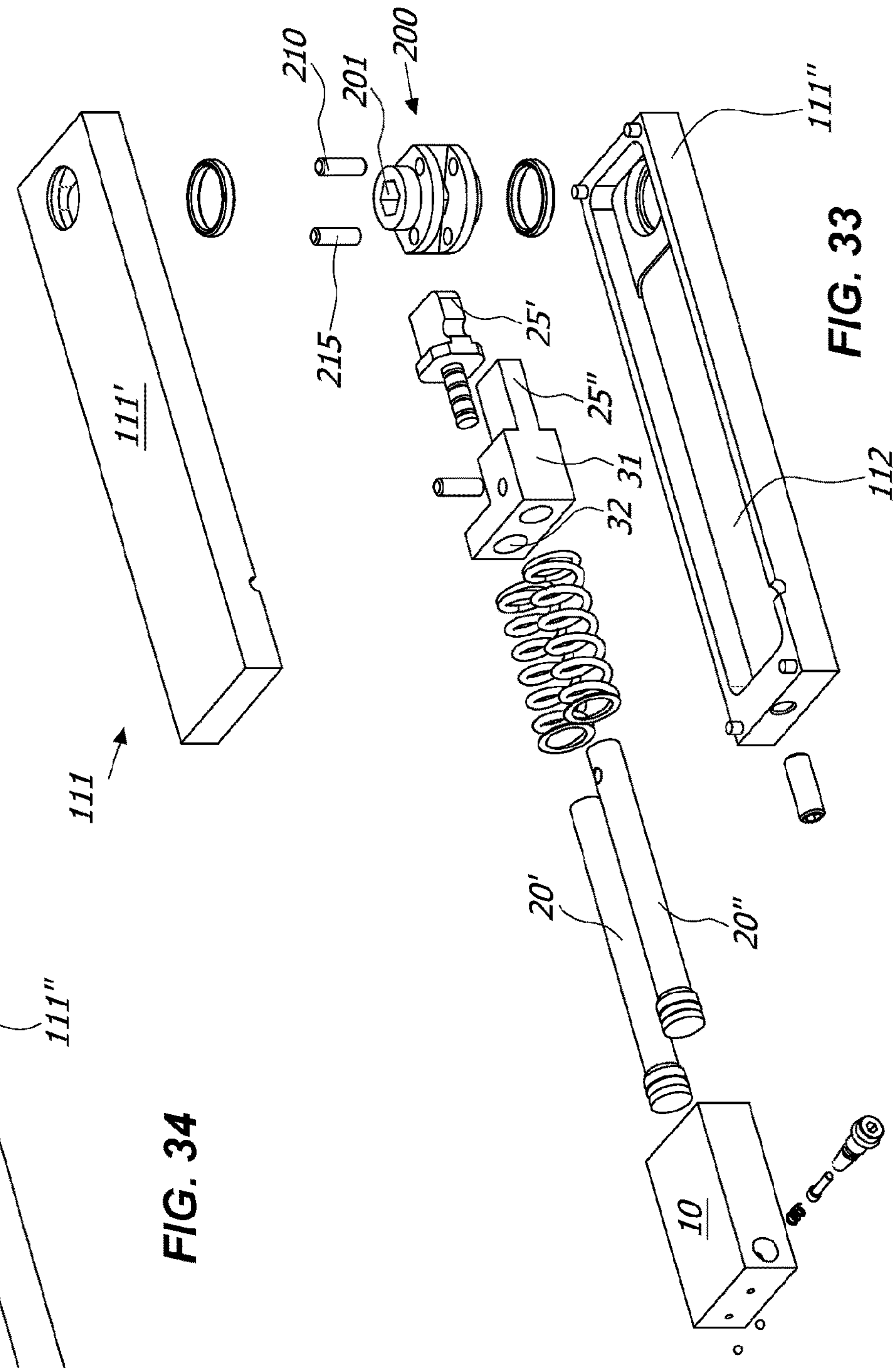
FIGS. 33 and 34 are axonometric schematic views—respectively exploded and assembled—of a third embodiment of a hydraulic hinge device 100 which includes the embodiment of the unit 1 of FIGS. 29 and 30.
Figure 34:
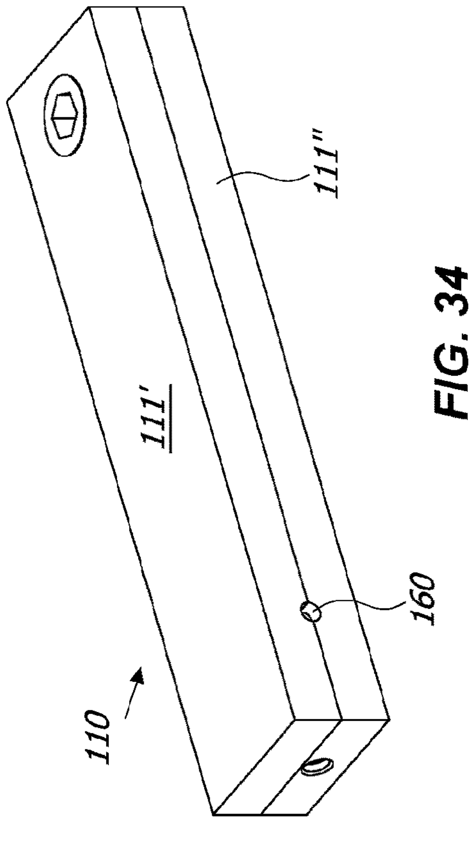
Figure 43:
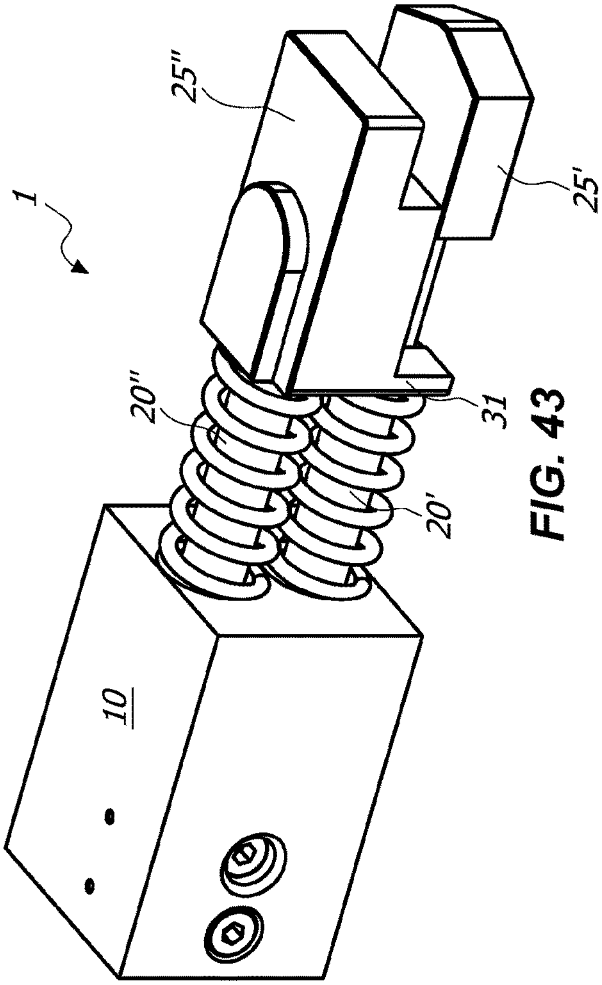
FIGS. 43 and 44 are axonometric schematic views—respectively assembled and exploded—of a fourth embodiment of a control unit 1.
Figure 44:
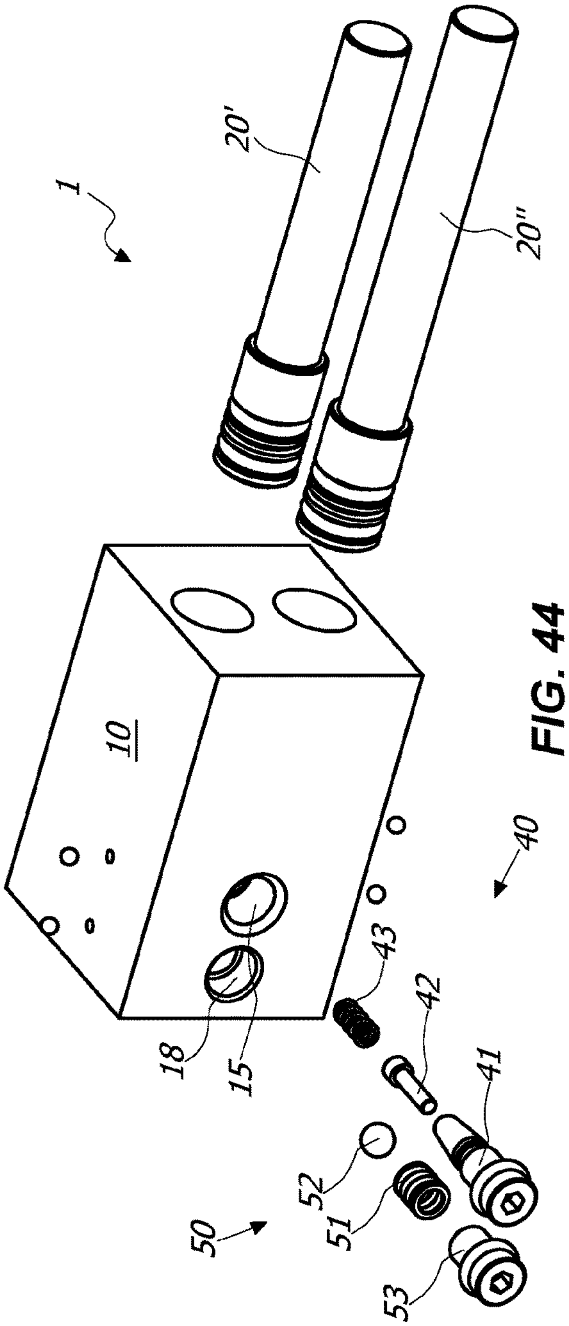
Figures 45A, 45B, 45C, 46A, 46B, 46C:
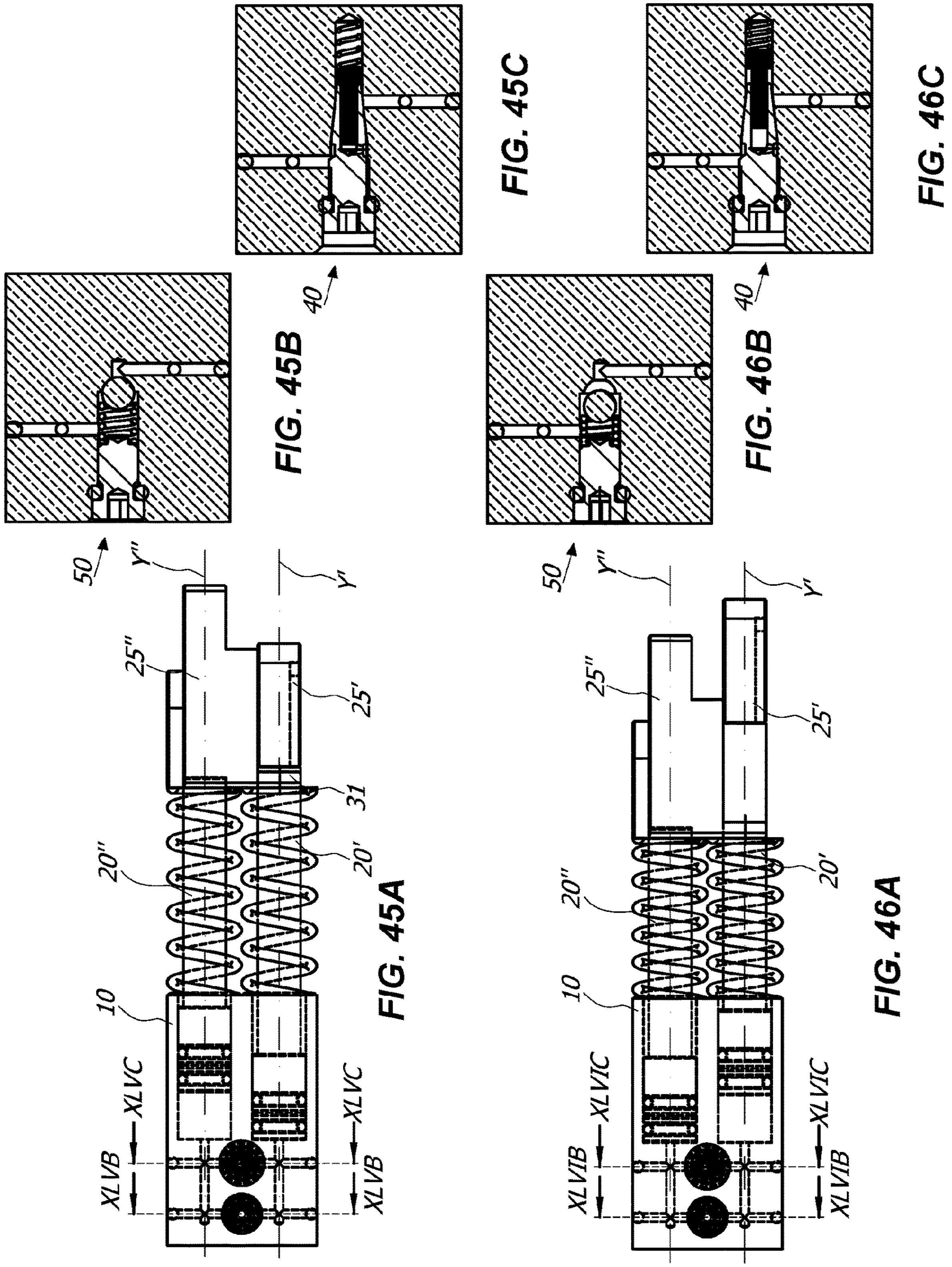
FIGS. 45A and 46A are lateral schematic views of the embodiment of the unit 1 of FIGS. 43 and 44 respectively during the forced closing and the opening of the closing element P, with FIGS. 45B, 45C, 46B and 46C showing cross-sectional views of some enlarged details taken respectively along the planes XLVB-XLVB, XLVC-XLVC, XLVIB-XLVIB and XLVIC-XLVIC.
Figure 47:
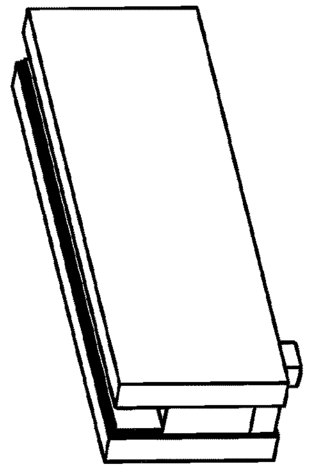
FIGS. 47 and 48 are axonometric schematic views—respectively assembled and exploded—of a fifth embodiment of a hydraulic hinge device 100 which includes the embodiment of the unit 1 of FIGS. 43 and 44.
Figure 48:
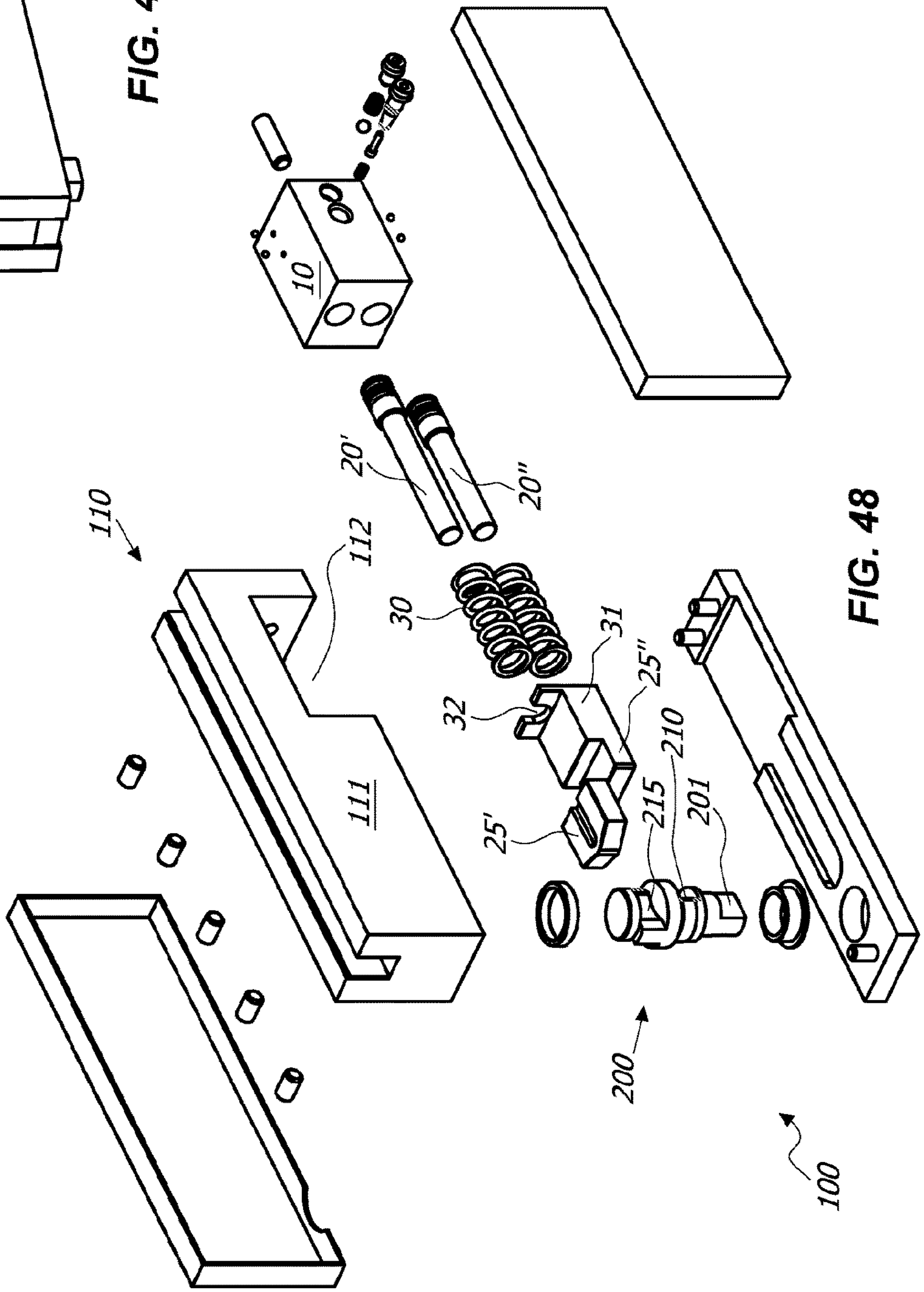
Figure 49:
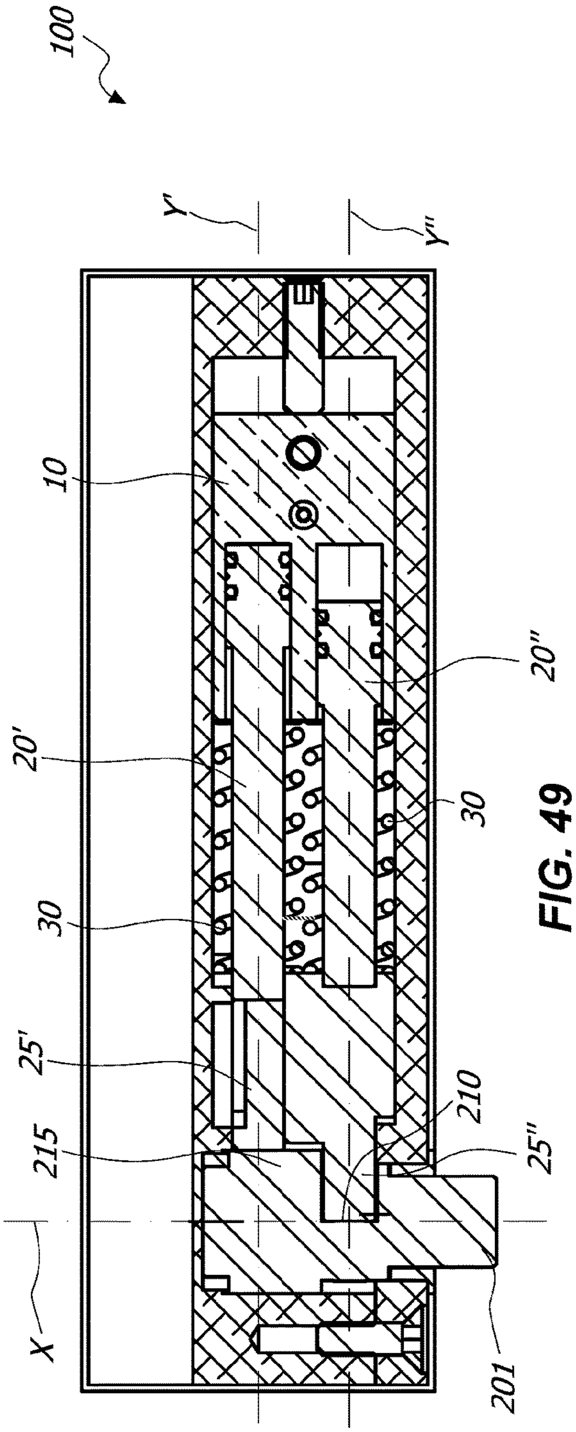
FIGS. 49 and 50 are axial cross-sectional views of the embodiment of the hinge device 100 of FIGS. 47 and 48 respectively in the closed and open position of the closing element P.
Figure 50:
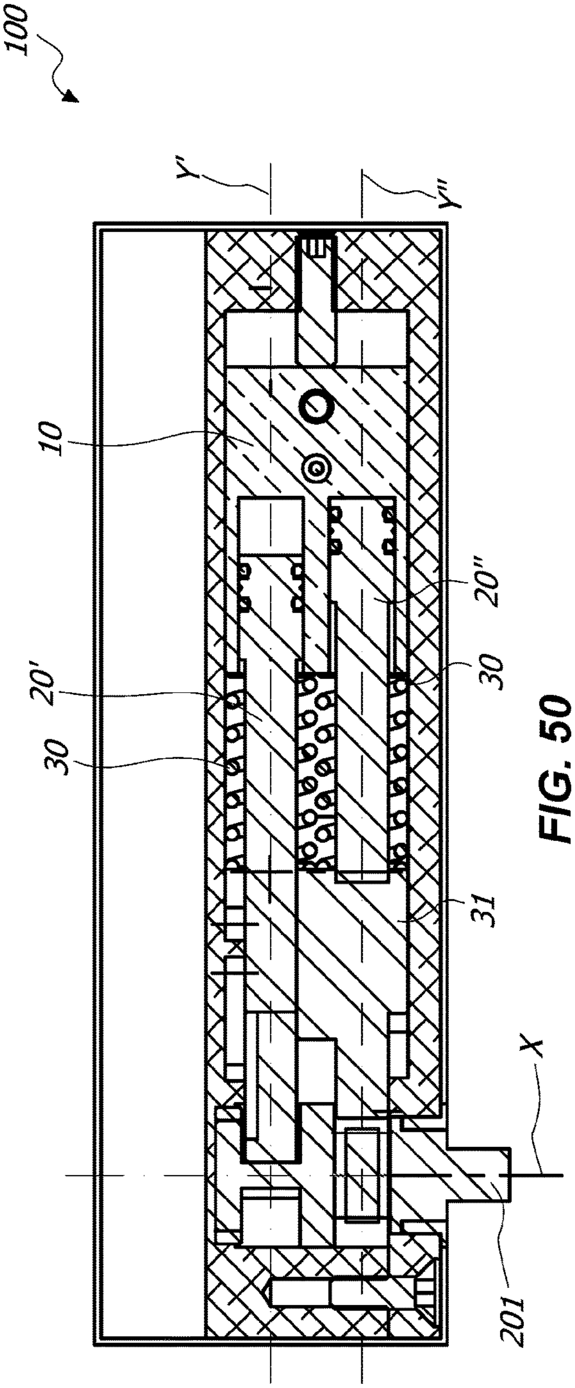
Figure 51:
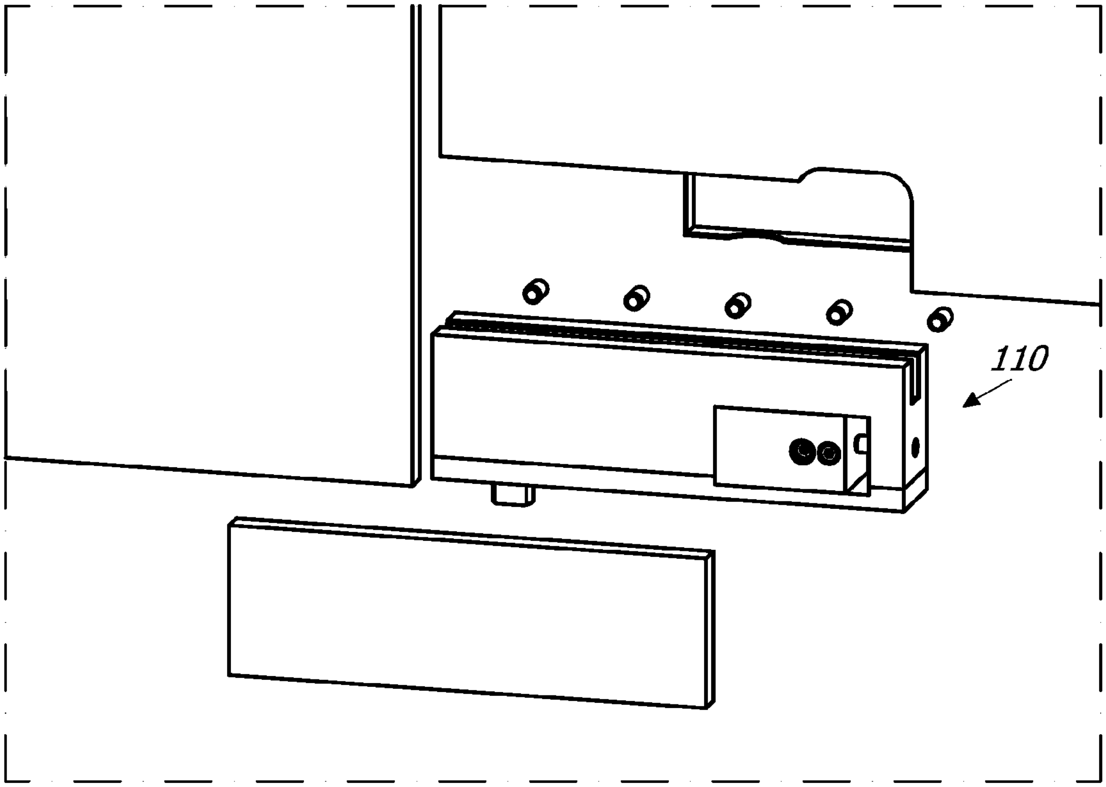
FIG. 51 is a schematic view of the embodiment of the hydraulic hinge device 100 of FIGS. 47 and 48 anchored to a closing element P.
Figure 52:
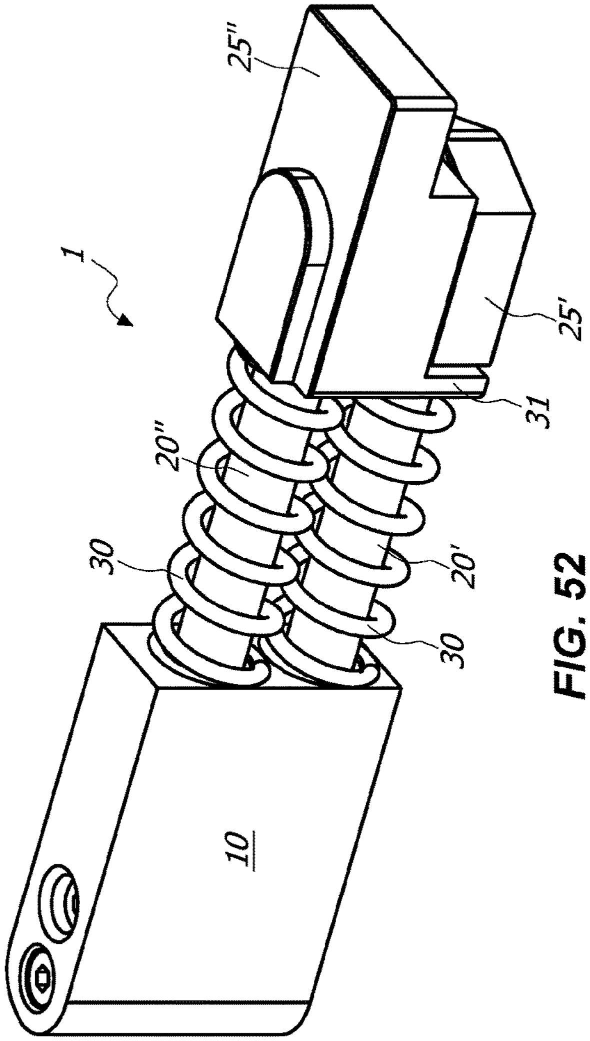
FIGS. 52 and 53 are axonometric schematic views—respectively assembled and exploded—of a fifth embodiment of a control unit 1.
Figure 53:
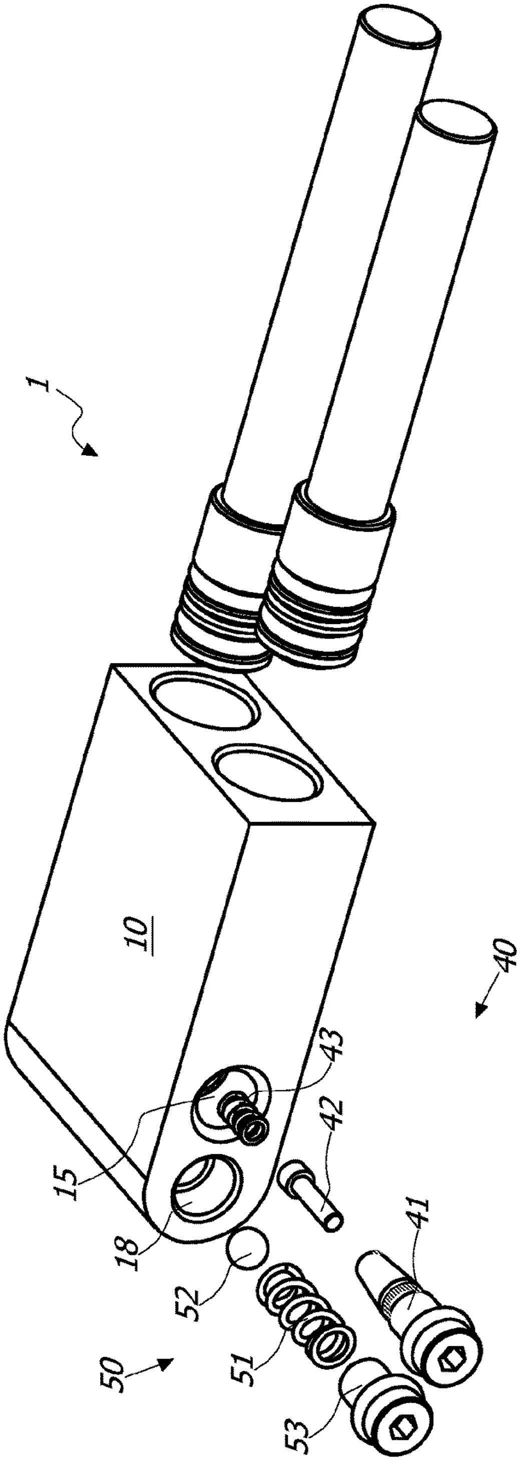
Figure 54:
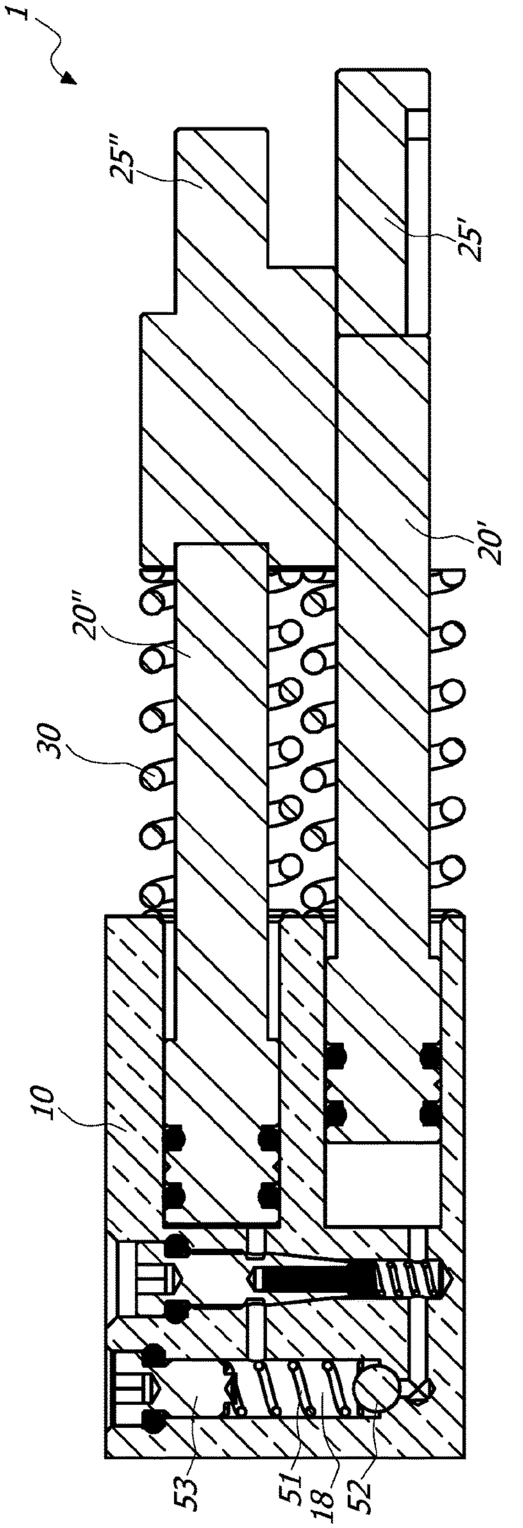
FIGS. 54 and 55 are axial cross-sectional views of the embodiment of the unit 1 of FIGS. 52 and 53 respectively during the closing and opening of the closing element P.
Figure 55:
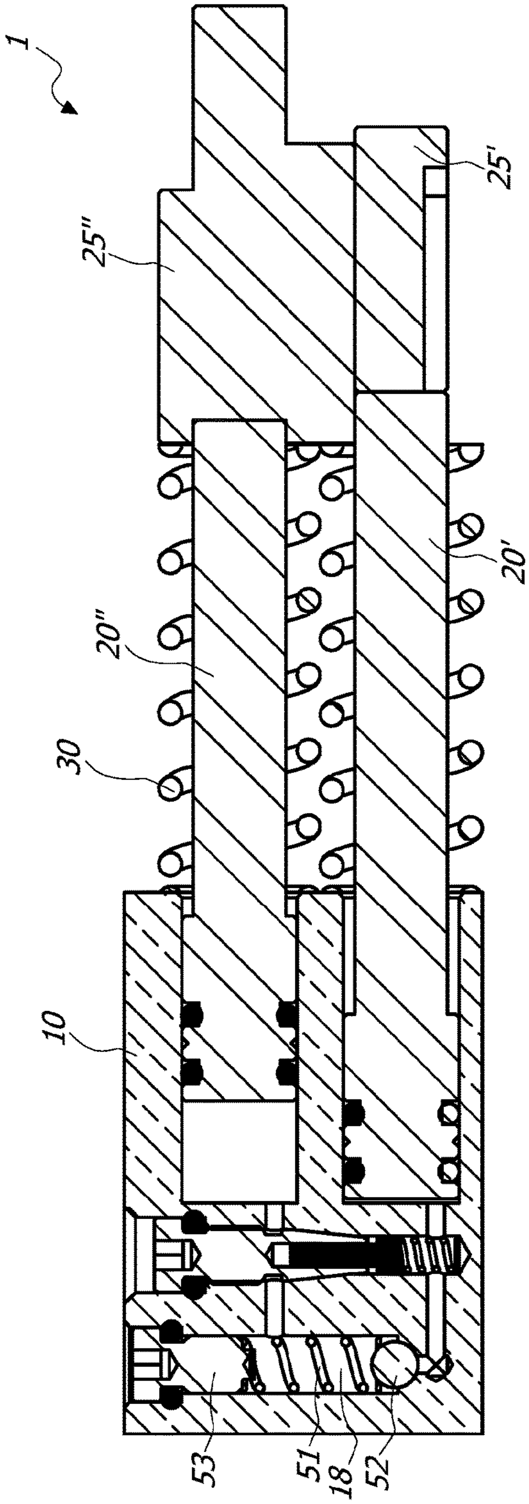

To this end, in the case of the control unit 1 which includes two springs 30, such as for example in the embodiments for example shown in FIGS. 29, 43 and 52, an abutment element 31 fixed to the stem on which the springs 30 act, for example the stem 20" may be provided for.

The abutment element 31 may include the abutment surfaces 23 for the springs 30 and it may also include a through seat 32 for the stem 20'. In this manner, the latter may freely slide along the axis Y' without elastic counteracting means.

Advantageously, as better illustrated below, the abutment element 31 may include the cam follower means 25", while the stem 20' may include or be integrally joined with the cam follower means 25'.

In the light of the above, the action of one or more springs on the stem 20" will be independent from the action for controlling the flow of the fluid exerted by the control unit 1 on both stems 20', 20".

As a result, thanks to the functional independence between the springs and stems, even in the event of sudden pressure exerted from the external onto one of the stems, the other stem will always be controlled, and the stem on which the springs act will always return to the maximum distal position In a preferred but non-exclusive embodiment, the control unit 1 may be particularly useful for controlling the flow of a working fluid in a hydraulic hinge device 100.

The latter may be particularly useful for the controlled rotary movement of a closing element P, such as for example a door, a door leaf or the like, with respect to a stationary support structure S, such as a floor, a frame or the like.

Although hereinafter reference will be made to a door P and to a floor or a frame S depending on the various embodiments of the hinge device 100, it is clear that the latter may be connected with any closing element and any stationary support structure without departing from the scope of protection of the attached claims.

The control unit 1 in the hinge device 100 may hydraulically control the movement of the door P between a closing position, for example shown in FIGS. 8, 18A, 31A and 49, and an opening position, for example shown in FIGS. 7, 20A, 32A and 50.

Figures 5A, 5B, 5C:
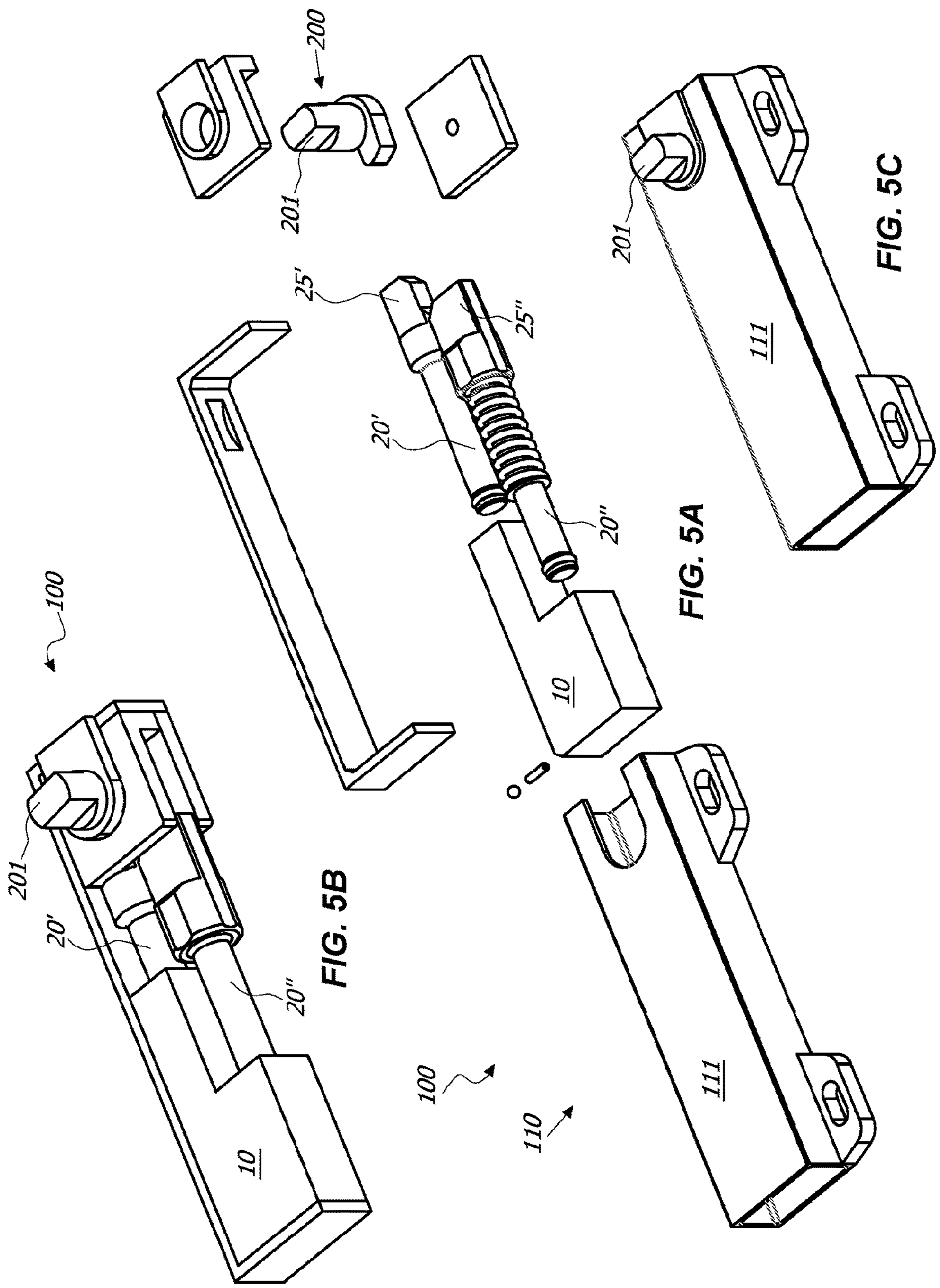
FIGS. 5A, 5B and 5C are axonometric schematic views—respectively exploded, partially assembled without shell 111 and assembled—of a first embodiment of a hydraulic hinge device 100 which includes the embodiment of the unit 1 of FIGS. 1 and 2.
Figure 6:
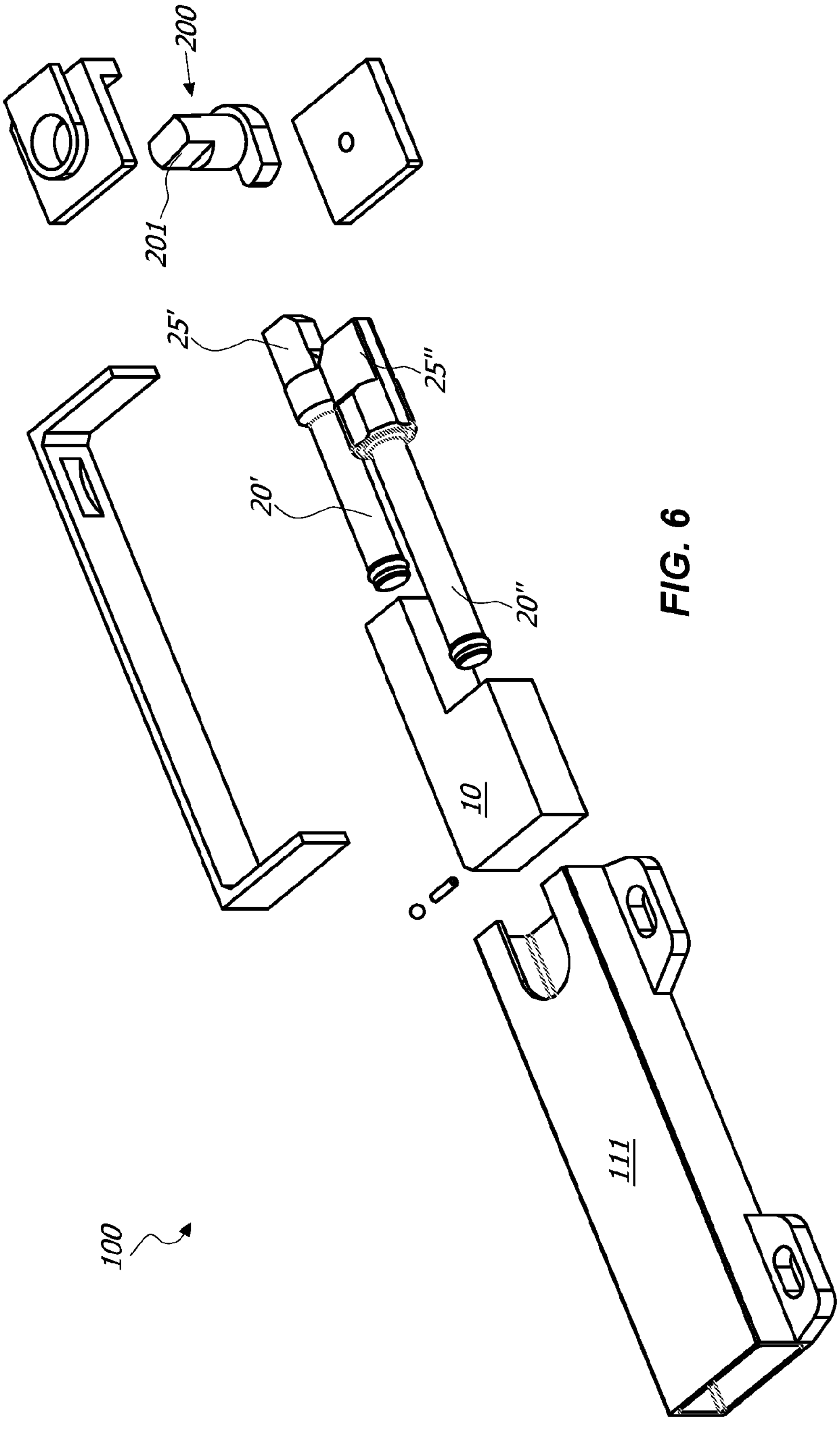
FIG. 6 is an exploded axonometric schematic view of another embodiment of a hydraulic hinge device 100 which includes the embodiment of the unit 1 of FIGS. 1 and 2, without spring.
Figure 7:
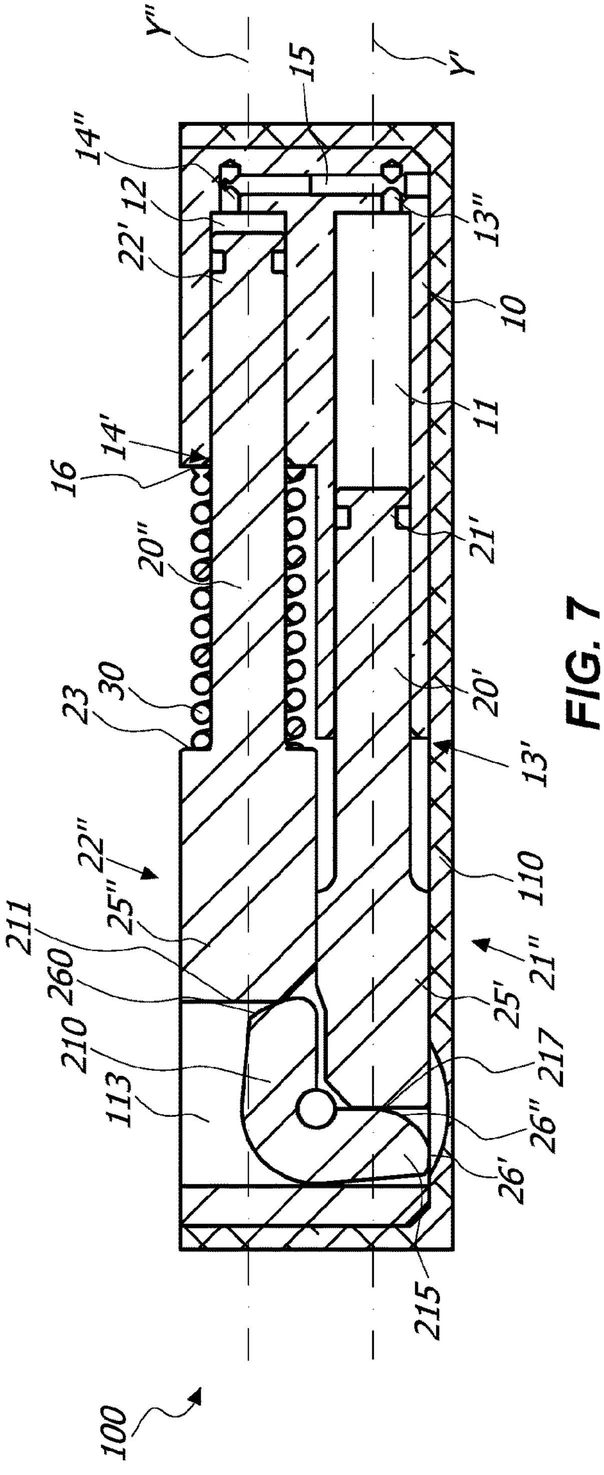
FIGS. 7 and 8 are axial cross-sectional views of the embodiment of the hinge device 100 of FIGS. 5A, 5B and 5C, respectively, in the open and closed position of the closing element P.
Figure 8:
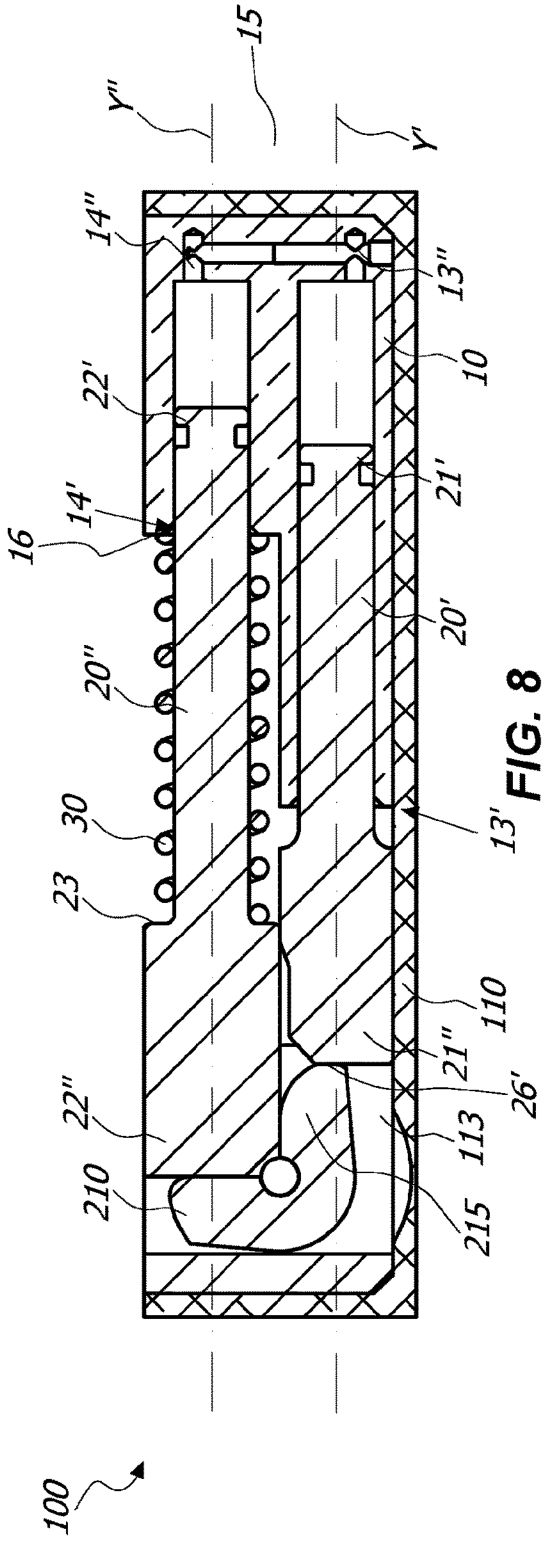
Figures 9A, 9B, 9C, 10A, 10B, 10C:
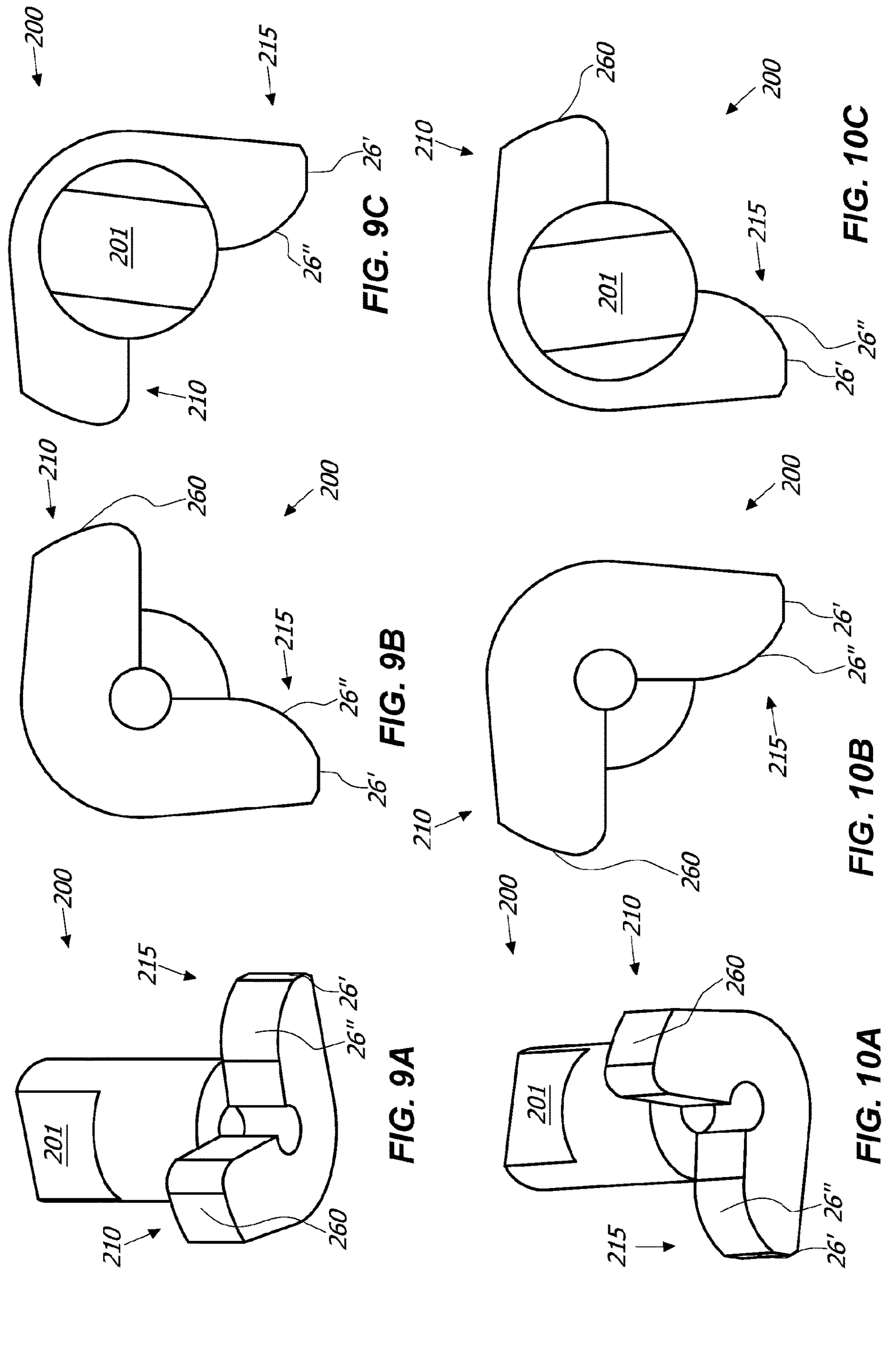
FIGS. 9A, 9B and 9C are schematic views of an embodiment of a pivot 200 with opening in the anticlockwise direction (left) suitable for the embodiment of the hinge device 100 of FIGS. 5 and 6.
FIGS. 10A, 10B and 10C are schematic views of another embodiment of a pivot 200 with opening in the clockwise direction (right) suitable for the embodiment of the hinge device 100 of FIGS. 5 and 6.
Figure 12:
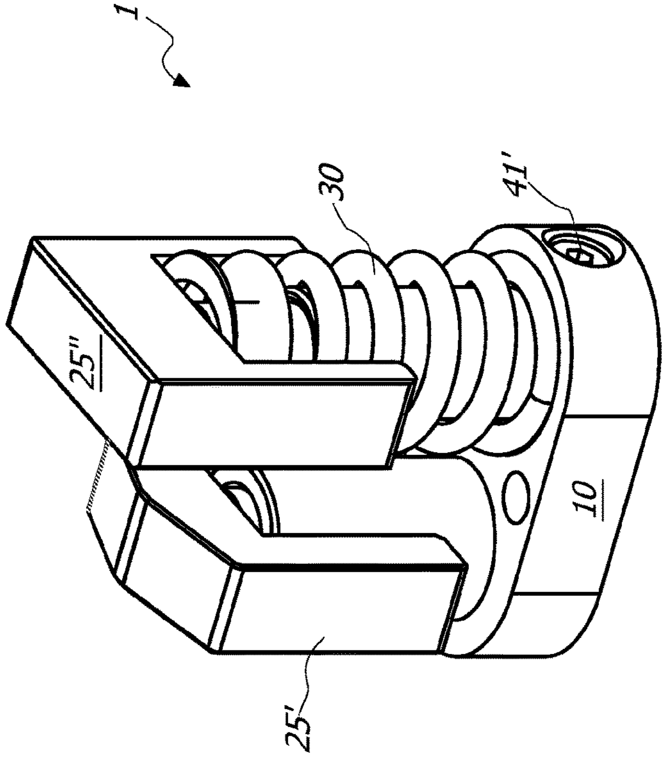
FIGS. 11 and 12 are axonometric schematic views—respectively exploded and assembled—of a second embodiment of a control unit 1.
Figure 15:
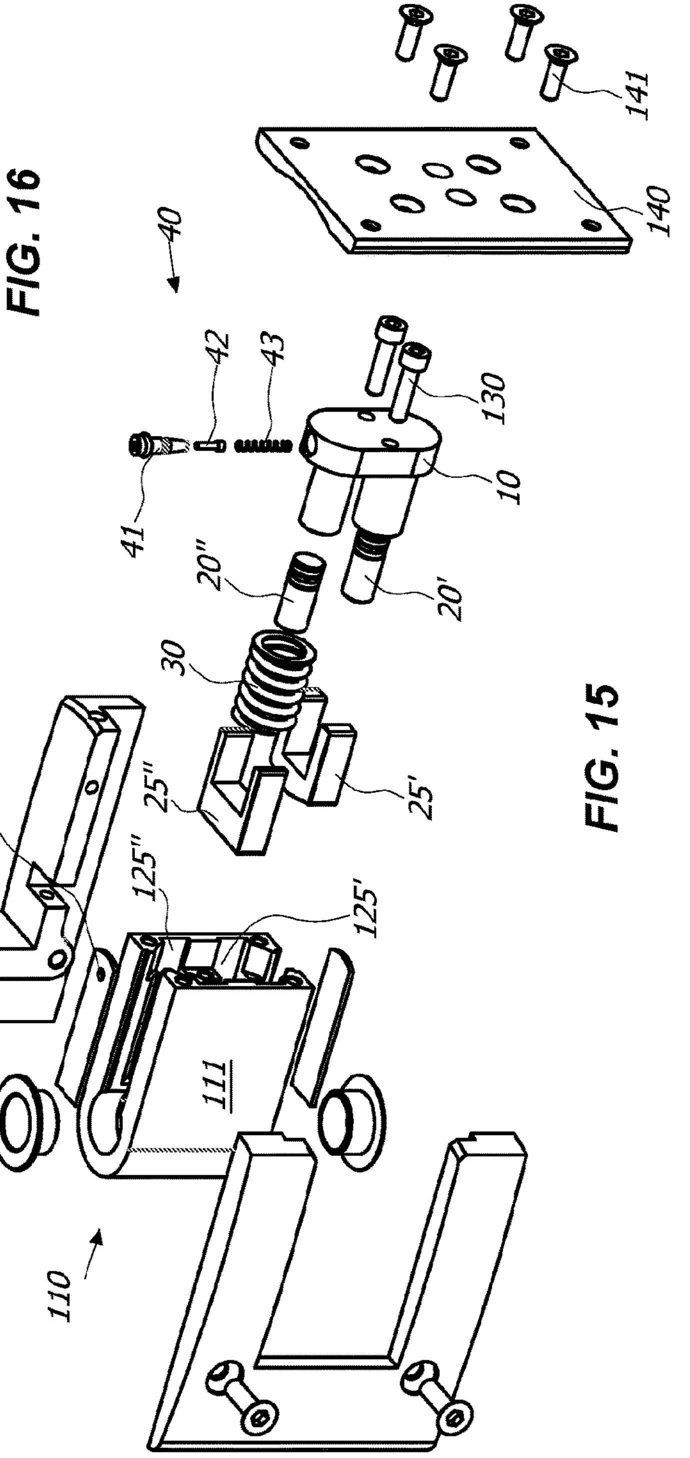
Figure 15:
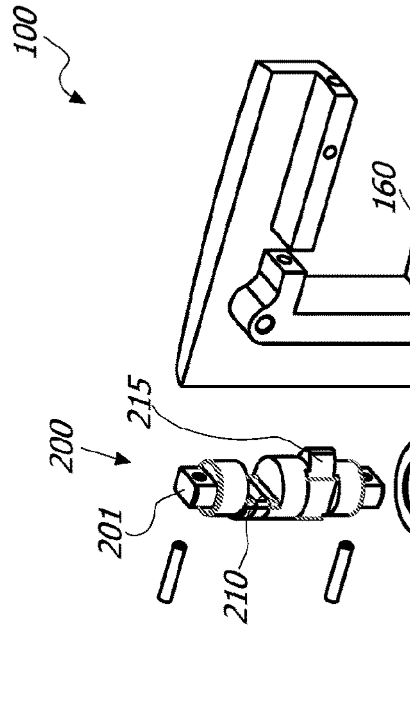
Figure 17:
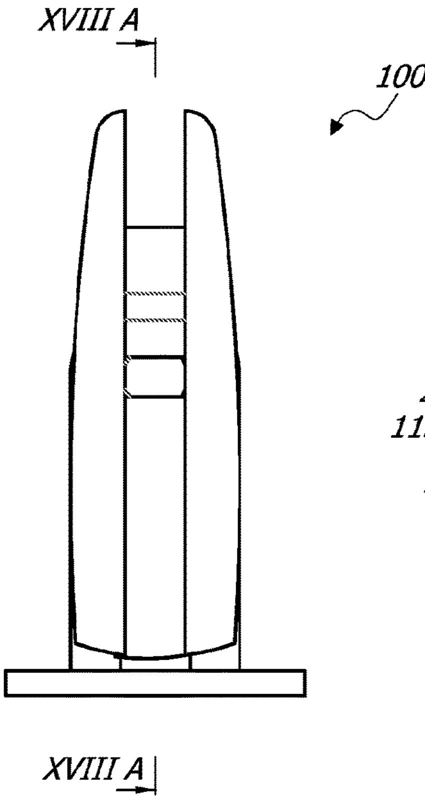
FIG. 17 is a top view of the embodiment of the hinge device 100 of FIGS. 15 and 16 in the closed position of closing element P, with FIGS. 18A, 18B and 18C showing cross-sectional views taken respectively along the planes XVIII A-XVIII A, XVIII B-XVIII B and XVIII C-XVIII C.

Depending on the configuration, the hinge device 100 may be a closing hinge, for example as shown in FIG. 5A or 15, or a hydraulic control hinge, for example as shown in FIG. 6, 23 of in FIGS. 65-69B.

In the former case, the hinge device 100 may include one or more thrust springs 30, while in the latter case the hinge device 100 may include a return spring, preferably, it may be without springs.

In use, two or more hinge devices 100, for example two closing hinges or one closing hinge and one hydraulic control hinge, or a closing and control hinge device 100 and an articulation can be mounted on a door P, without particular restrictions.

Figure 28B:
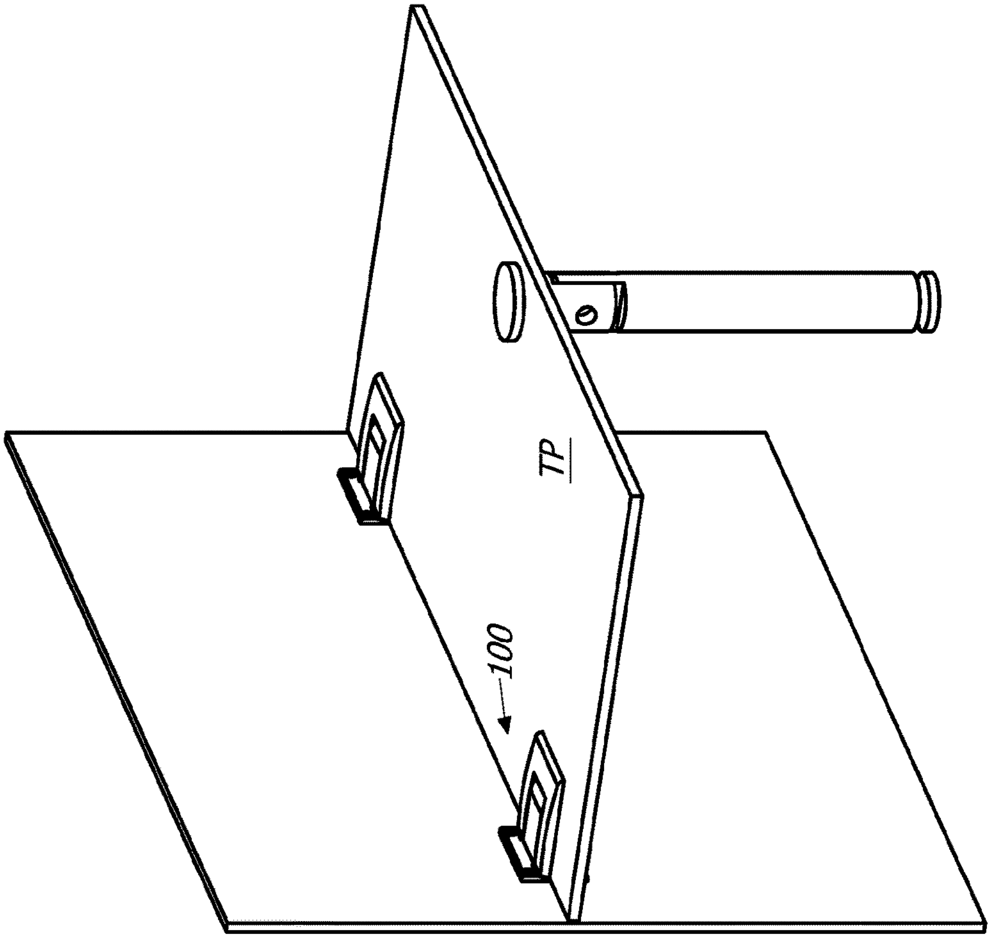
FIGS. 28A and 28B are axonometric schematic views of an example of a folding table TP respectively in closed and open position, which includes the embodiment of the hinge device 100 of FIG. 23.
Figure 28A:
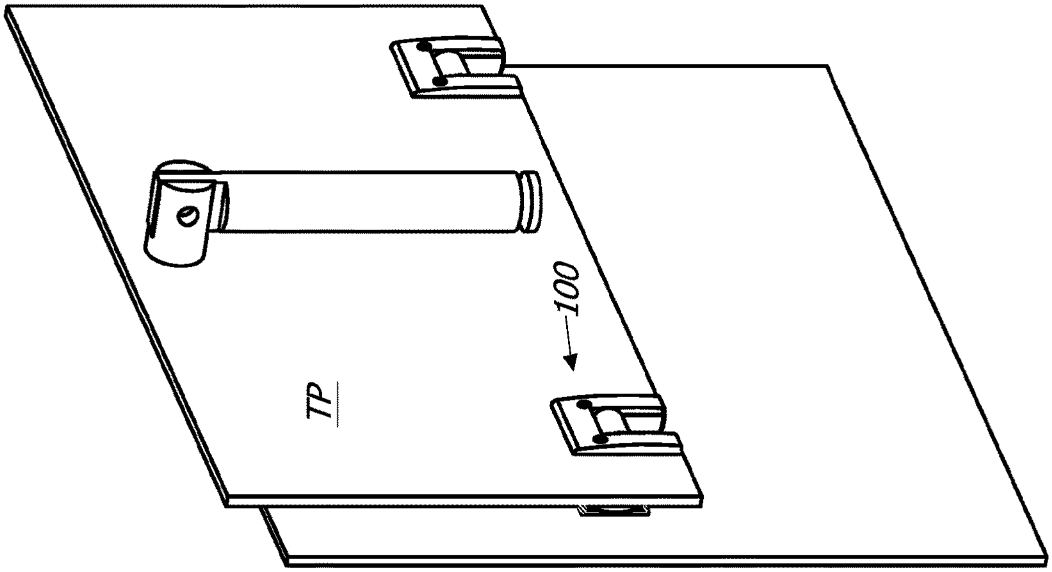

By way of non-limiting example, one or more hydraulic control hinge devices 100 can be mounted on a folding glass table TP, as shown in FIGS. 28A and 28B.

In a preferred but non-exclusive embodiment, for example shown in FIGS. 5A to 10C, the hinge device 100 may be a flat hinge particularly suitable to be concealably inserted into the tubular frame of a fridge door.

In a further preferred but not exclusive embodiment, for example shown in FIGS. 15 to 27 and 65 to 69B, the hinge device 100 may be an ambidextrous hinge for frameless glass doors.

In a further preferred but not exclusive embodiment, for example shown in FIGS. 33 to 41, the hinge device 100 may be a hinge for internal doors tiltable to make it ambidextrous, to be anchored to a floor S by means of a bushing B, per se known.

In a further preferred but not exclusive embodiment, for example shown in FIGS. 47 to 51, the hinge device 100 may be an ambidextrous hinge for frameless glass doors mounted in a pivoting fashion, to be anchored to a floor S.

Figure 58:
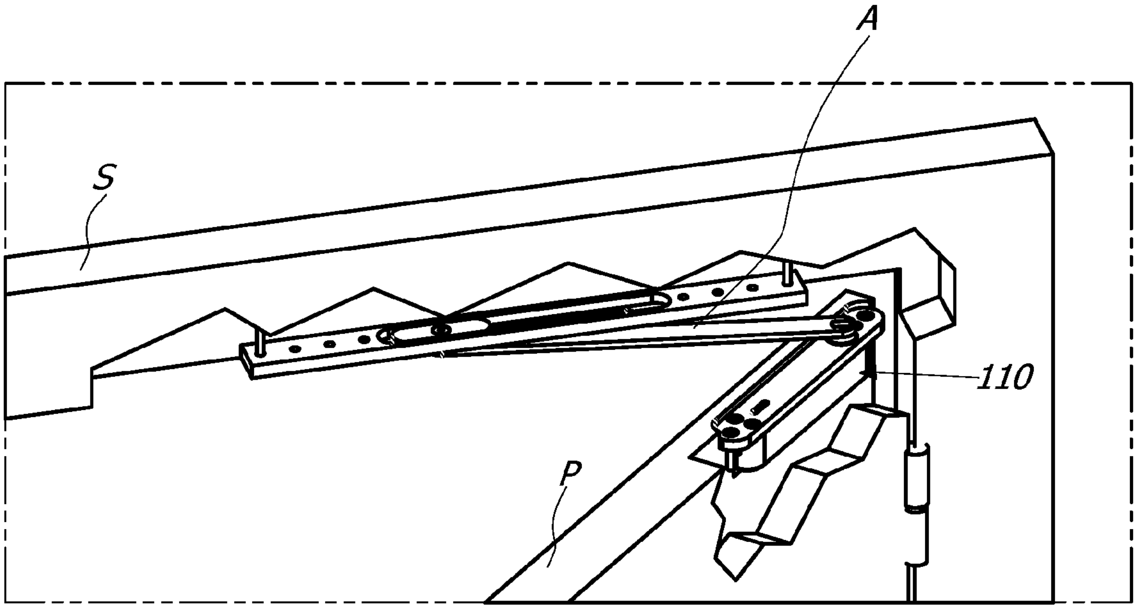
FIG. 58 is a schematic view of the embodiment of the hydraulic hinge device 100 of FIGS. 52 and 53 anchored to a closing element P.
Figure 57:
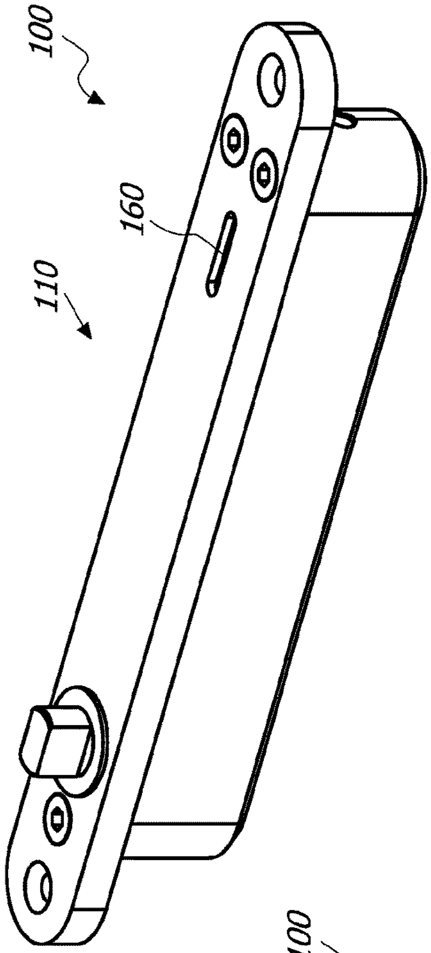
FIGS. 56 and 57 are axonometric schematic views—respectively exploded and assembled—of a sixth embodiment of a hydraulic hinge device 100 which includes the embodiment of the unit 1 of FIGS. 52 and 53.
Figure 56:
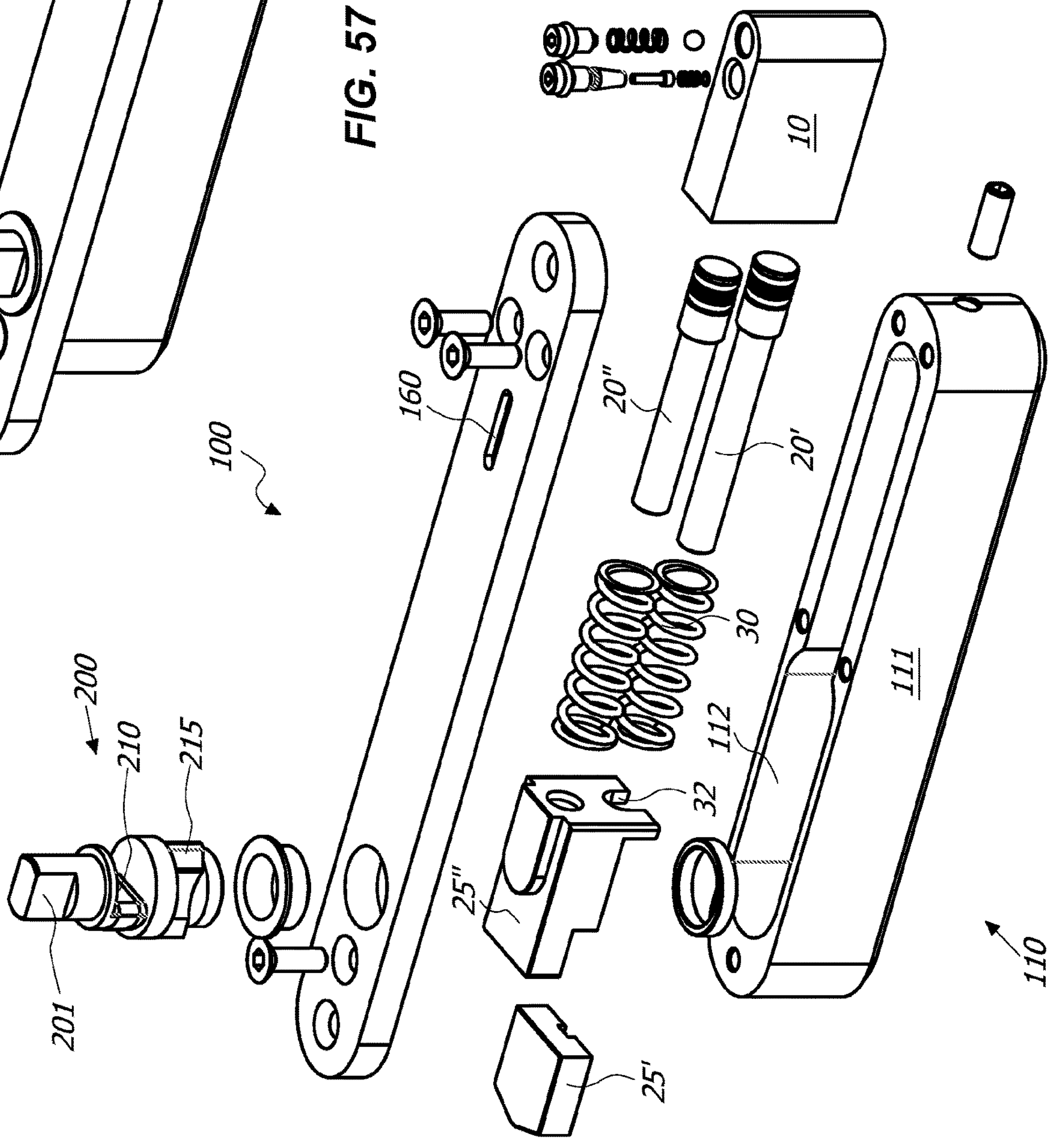

In a further preferred but not exclusive embodiment, for example shown in FIGS. 56 to 58, the hinge device 100 may be an ambidextrous recessed door closure for internal doors, to be anchored to the frame S of the door by means of a pivoted arm A, per se known.

Advantageously, the hinge device 100 may generally comprise a hinge body 110, which can be integrally anchored to the door P or to the stationary support structure S depending on the embodiment, according to the attached drawings. For example, in the preferred but non-exclusive embodiment shown in FIGS. 15 to 27, the hinge body 110 may be anchored to the frame S, while in the preferred but non-exclusive embodiment shown in FIGS. 47 to 51, the hinge body 110 may be anchored to the door P.

As better shown hereinafter, the hinge body 110 may have various configurations, depending on the embodiment.

Figure 4C:
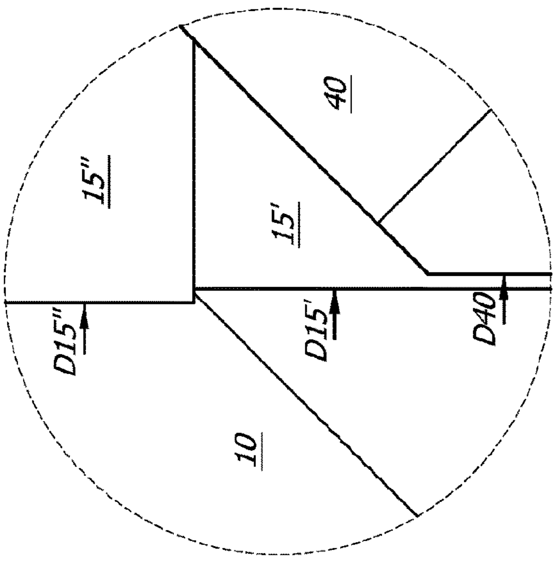
FIGS. 3A and 4A are axial cross-sectional views of the embodiment of the unit 1 of FIGS. 1 and 2 respectively during the opening and closing of the closing element P, with FIGS. 3B, 4B and 4C showing some enlarged details.
Figure 1:
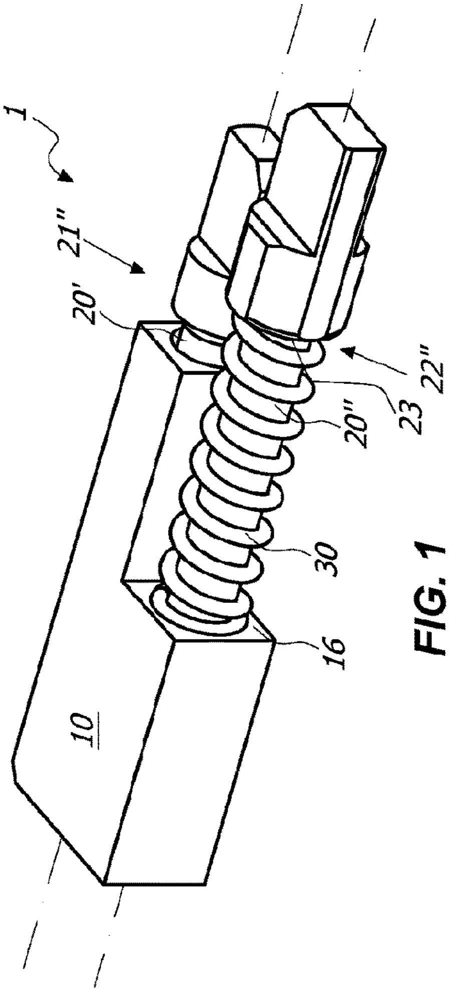
FIGS. 1 and 2 are axonometric schematic views—respectively assembled and exploded—of a first embodiment of a control unit 1.
Figure 2:
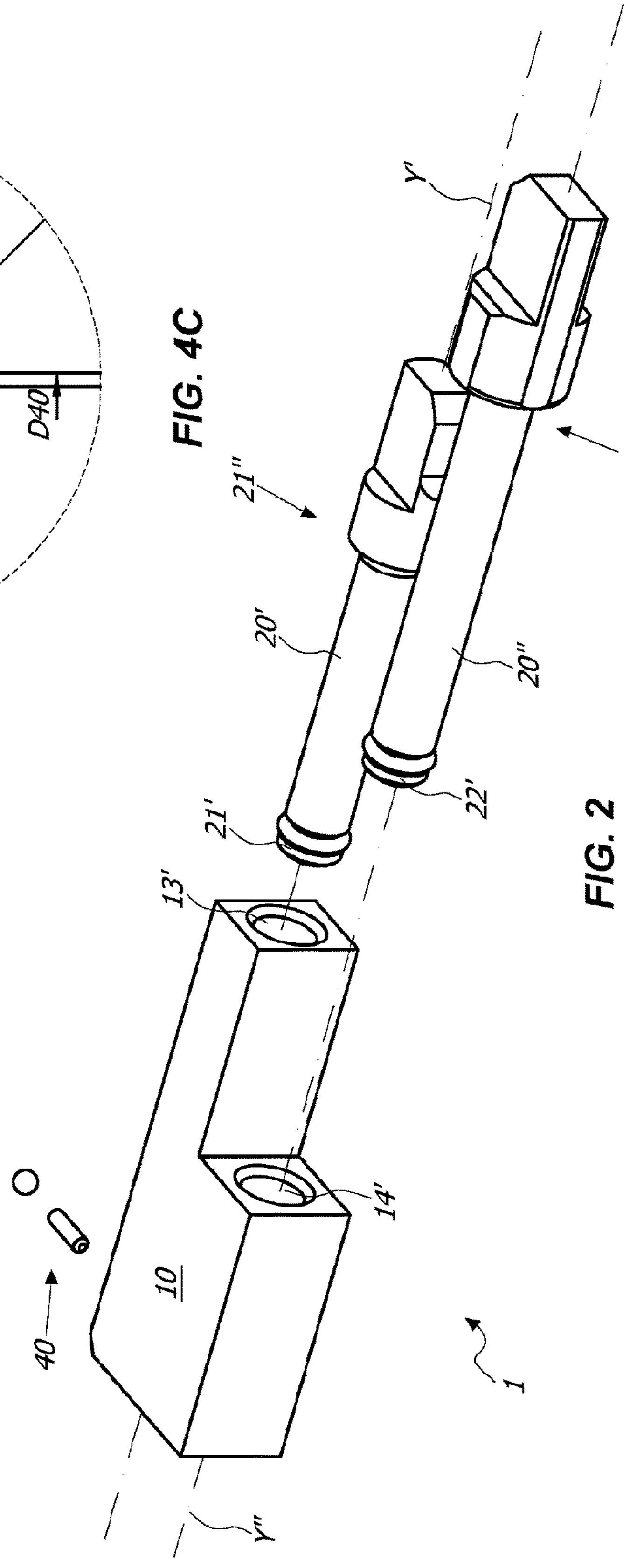

In the embodiments shown in FIGS. 1 to 58, the control unit 1 may be removably inserted into the compartment 112 to define the hydraulic portion, with the ends 21", 22" of the stems 20', 20" protruding from the main body 10 so as to remain in the dry portion 113 of the compartment 112, in which they will interact with the pivot 200.

In such embodiments, the hinge body 110 may comprise or consist of a shell 111, possibly consisting of two or more half-shells 111', 111" like in the preferred but non-exclusive embodiment shown in FIGS. 47 to 51. The shell 111 may internally include at least one compartment 112, into which the control unit 1 and a pivot 200 may be inserted.

On the other hand, for example as illustrated in the embodiment of FIGS. 65 to 69B, the control unit 1 may be integrated in the compartment 112 to define the aforementioned hydraulic portion. In other words, the control unit 1 may be obtained in the hinge body 110, so that the latter includes the former.

The pivot 200 may define an axis X, which will also act as a mutual rotation axis between the pivot 200 and the hinge body 110.

The pivot 200 may have one or more portions 201 for the coupling with the door P or the stationary support structure S and first and second cam means 210, 215.

The latter may be mutually arranged side by side or superimposed, and they may have a configuration such to mutually interact selectively and alternately with the stem 20" and the stem 20', and preferably with corresponding first and second cam follower means 25', 25" integrally coupled respectively with the latter, as better explained hereinafter.

In particular, the first and second cam follower means 25', 25" may be obtained as a single piece with the first and second stem 20', 20" to define the respective opposite ends 22', 22", for example as in the embodiments of FIGS. 1-10C or of FIGS. 65-69B, or they may be integrally coupled with the latter, for example as in the embodiments of FIGS. 11-58.

This will promote the reciprocating motion of the stems 20', 20", so that the sliding of the stem 20' from the opening 13' toward the opening 13", that is from the end 21" from the distal position toward the proximal position, corresponds to the sliding of the stem 20" from the opening 14" toward the opening 14', that is of the end 22" from the proximal position toward the distal position, and, vice versa, the sliding of the stem 20" from the opening 14' toward the opening 14", that is of the end 22" from the distal position toward the proximal position, corresponds to the sliding of the stem 20' from the opening 13" toward the opening 13', that is of the end 21" from the proximal position toward the distal position.

As shown above, during such passages the working fluid will hydraulically dampen the door closing and/or opening movement.

Figure 23:
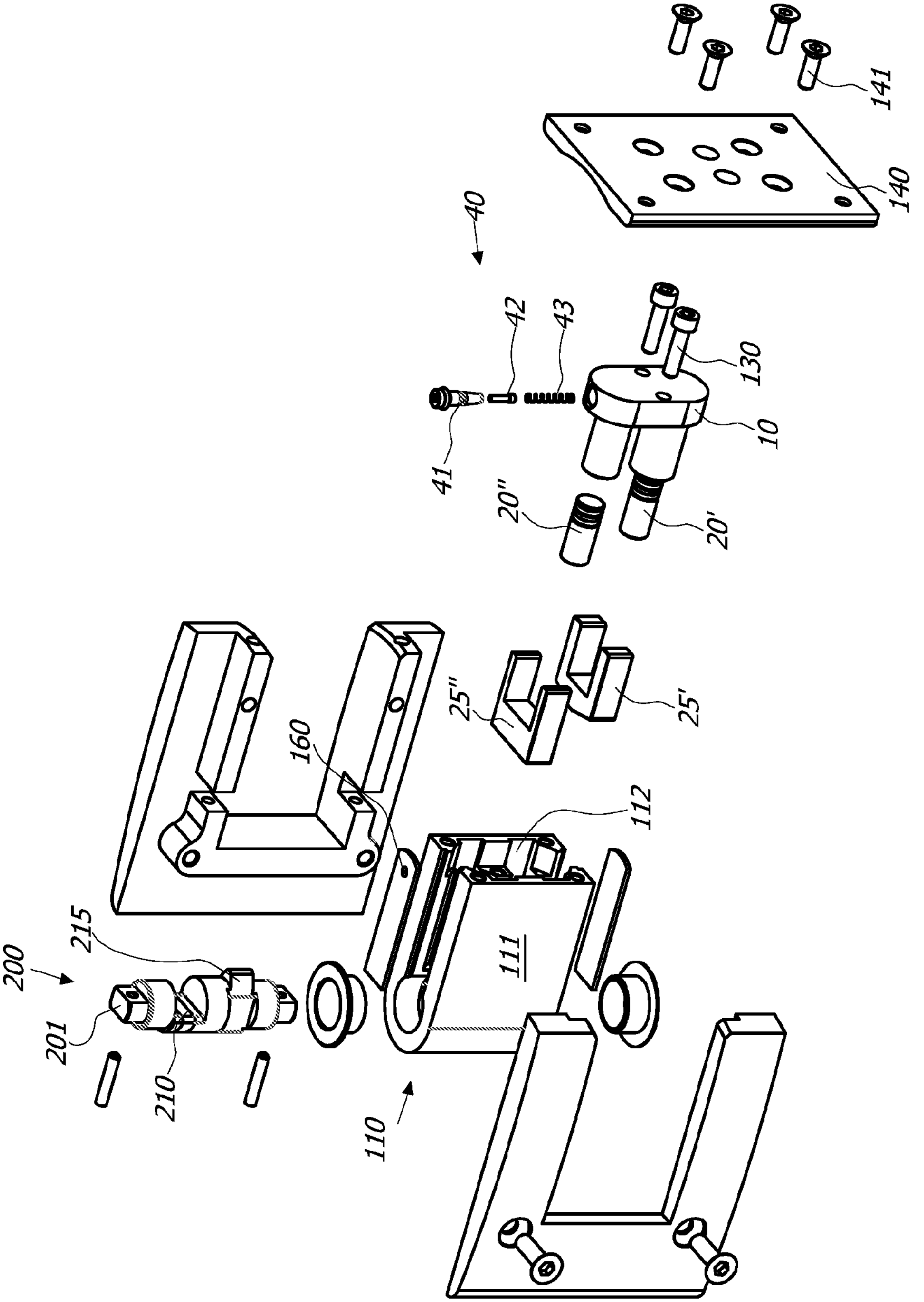
FIG. 23 is an exploded axonometric schematic view of a further embodiment of a hydraulic hinge device 100 which includes the embodiment of the unit 1 of FIGS. 11 and 12, without spring.
Figure 24:
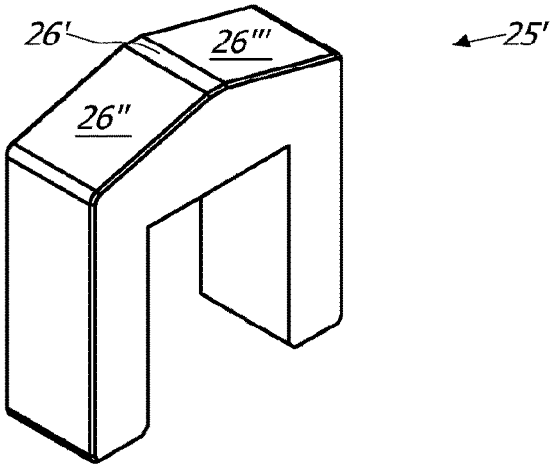
FIGS. 24, 25 and 26 are axonometric schematic views of an embodiment of the cam follower element 25', that of 25" and of the pivot 200 of the embodiment of the hinge device 100 of FIGS. 15 and 16.
Figure 26:
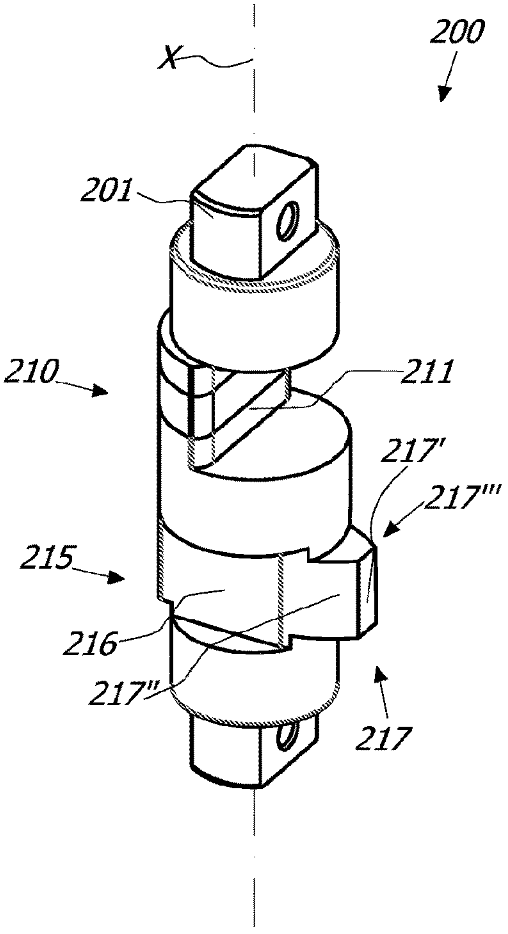
Figure 25:
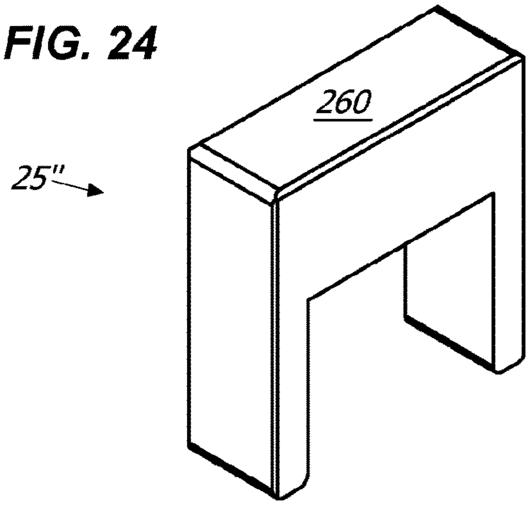
Figure 27:
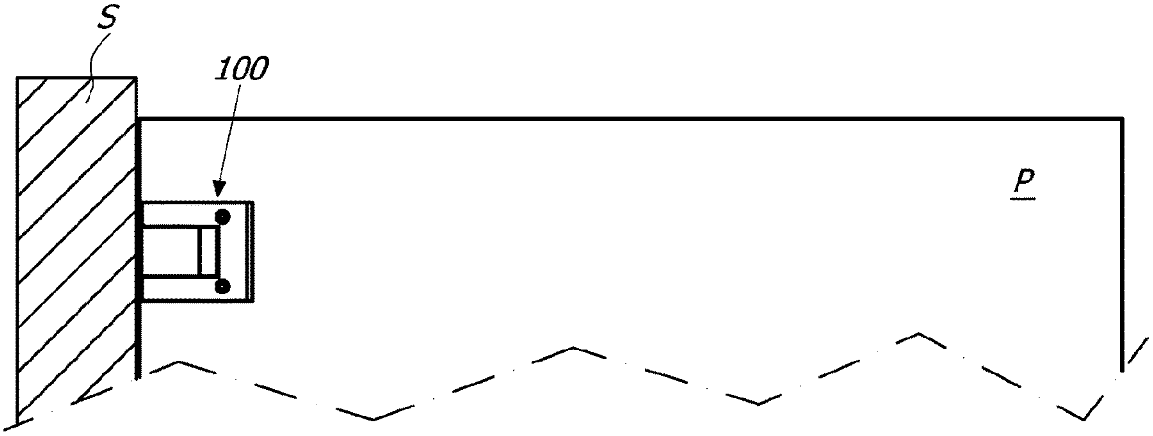
FIG. 27 is a schematic view of a closing element P in the form of a frameless glass door on which there is mounted the embodiment of the hinge device 100 of FIGS. 15 and 16.

Although hereinafter reference will be made to a hinge device 100 which automatically closes the door P and hydraulically dampens the closing and opening movement thereof, it is clear that the hinge device 100 may hydraulically dampen the closing and opening movement of the door P alone, for example as shown in the embodiments of FIG. 6 or 23 of FIGS. 65-69B, without departing from the scope of protection of the attached claims.

The pivot 200 and the control unit 1 may be configured so that the distal and proximal positions respectively of the stems 20", 20' corresponds to that of the door P closed and the proximal and distal positions respectively of the stems 20", 20' correspond to that of the door P open.

To this end, the cam means 210, 215 may be suitably configured. In particular, depending on the embodiment of the hinge device 100 and of the relative pivot 200, the cam means 210, 215 may define respective axes or planes substantially perpendicular to each other.

In any case, the cam means 210, 215 and the stems 20", 20' may interact and mutually rotate around the axes X between a door closed and a door open position in which the stems 20", 20' may take the positions described above, sliding along the respective axis Y", Y'. It is clear that depending on the embodiments the one of the cam means 210, 215 and the stems 20", 20' will rotate and the others will be stationary.

In particular, when opening the door P, the cam means 210 may push the stem 20" to slide along the axis Y" from the distal position of the end 22" thereof to the proximal one. At the same time, the oil present in the chambers 11, 12 will push the stem 20' to slide along Y' from the proximal position of the end 21" thereof to the distal one. During such movement, the cam means 215 will rotate in relation to the stem 20' to allow the aforementioned sliding, and the one or more springs 30, if present, will be compressed from the maximum extension position to the maximum compression one.

Suitably, during such movement the cam means 215 and the end 21" of the stem 20' may be mutually spaced apart and not in contact.

The pressure inside the circuit will bring the plug element 42 to open or the pin 40 in the portion 15" of the duct 15 to a larger diameter, to allow the oil to flow through the duct 15.

In the embodiments where the spring 43—plug element 42 assembly is present, as shown above, such through passing will occur through the tubular interspace between the internal duct 45 and the stem 42" of the plug element 42.

Therefore, such tubular interspace will define the maximum opening force that acts on the door P, even in case of sudden forcing for example due to a gust of wind or incautious user. As a matter of fact, even in this case, the door will always be controlled and protected from undesired impacts and possible damage.

On the contrary, when closing the door P, the one or more springs 30, if present, may promote the movement of the stem 20" along the axis Y" from the proximal position of the end 22" thereof to the distal one and the rotation of the door P toward the closing position. At the same time, the cam means 215 will push the stem 20' to slide along Y' from the distal position of the end 21" thereof to the proximal one.

The pressure inside the circuit will bring the plug element 42 to close or the pin 40 in the portion 15' of the duct 15 to a smaller diameter, allowing the oil to act to hydraulically dampen the closing movement of the door P, as described above.

It is clear that in the embodiments in which the hinge device 100 is without springs, the pushing force may be exerted by an external force, for example an external closing hinge or gravity, and the hinge device 100 will basically act as a hydraulic brake to hydraulically dampen the closing movement of the door P.

In this manner, the movement of the door is always controlled both to open and to close, even in case of sudden forces that act on the door P, for example a gust of wind or the thrust of an incautious user. On the other hand, should such thrust pose a danger to the wholeness of the hinge device 100 the overpressure valve element 50 would open, protecting it.

When closing the door, the one or more springs 30, if present, will act on the cam follower means 25", which in turn will act on the cam means 210 so as to move the pivot 200 and the door P. Such movement is independent from the hydraulic movement of the stems 20', 20".

In particular, the spring 30—cam follower 25"—cam 210 assembly will be independent from the movement of the stem 20". As a matter of fact, the latter will be pushed to slide along the axis Y" by the action of the other stem 20' alone, which will in turn be pushed by the cam 215 acting on the cam follower 25'.

Such independent movement, together with the particular configuration of the cam follower 25', will allow to obtain a closing mechanical snap, as better shown hereinafter.

The hinge device 100 may be advantageously substantially planar. In particular, the axes Y', Y" may define a plane n substantially perpendicular to the axis X, for example as in the embodiments of FIGS. 5A—10C and 33-42, or parallel thereto, for example as in the embodiments of FIGS. 15-27, 48-51, 56-58 and 65-69B.

In the latter embodiments, the first and second cam means 215, 210 and the first and second cam follower means 25', 25" may be mutually superimposed along the plane π defined by the axes Y', Y".

Figure 18A:
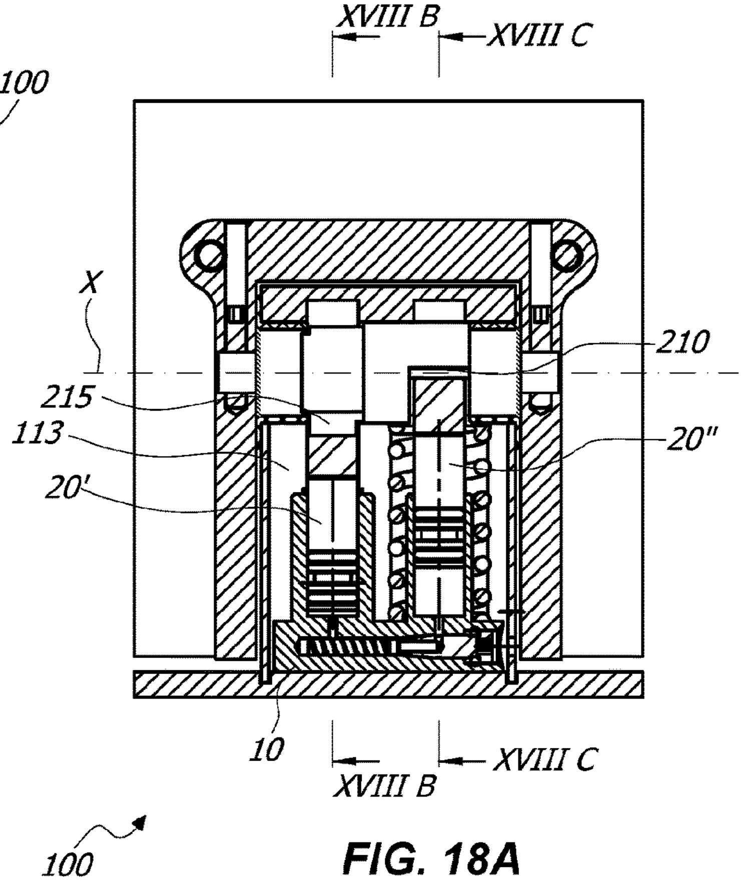
Figure 18B:
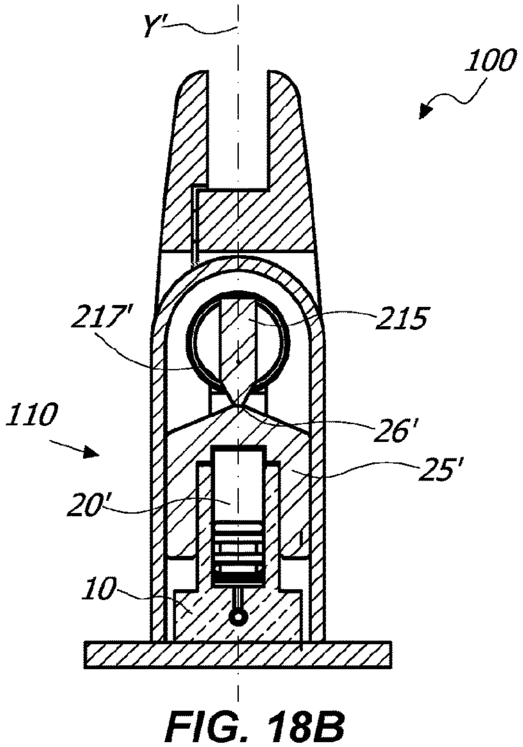
Figure 18C:
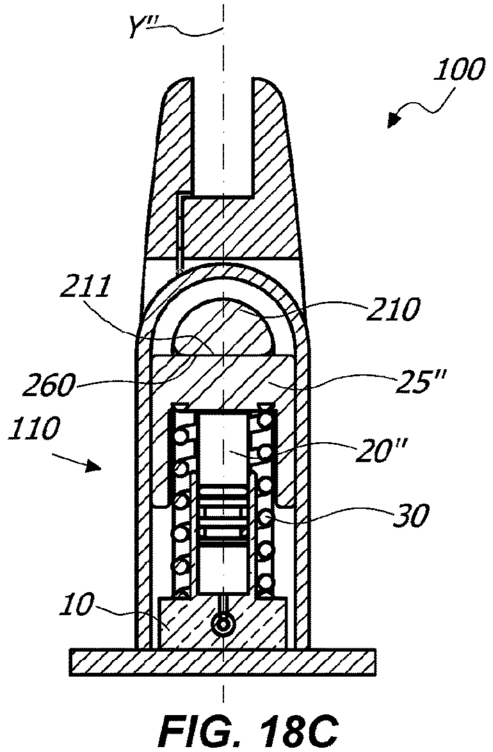
Figure 19:
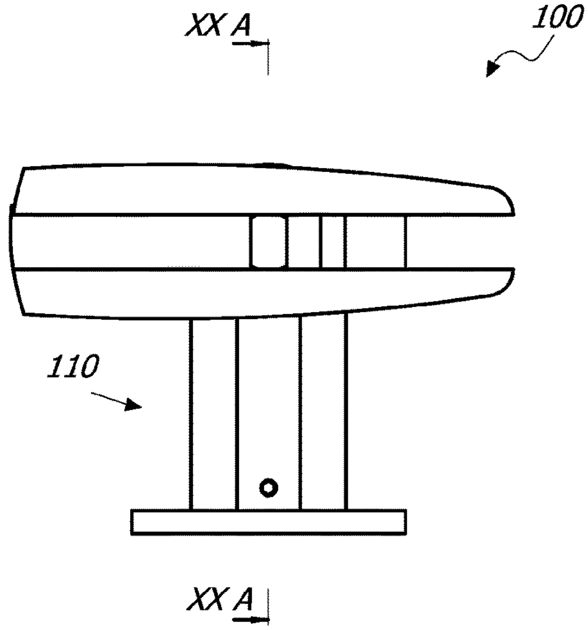
FIG. 19 is a top view of the embodiment of the hinge device 100 of FIGS. 15 and 16 in the 90° open position of the closing element P, with FIGS. 20A, 20B and 20C showing cross-sectional views taken respectively along the planes XX A-XX A, XX B-XX B and XX C-XX C and FIG. 20D showing some enlarged details.
Figure 20A:
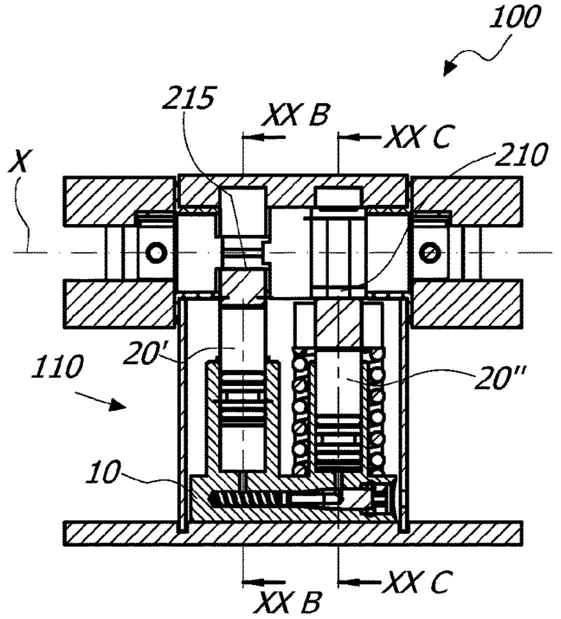
Figure 20B:
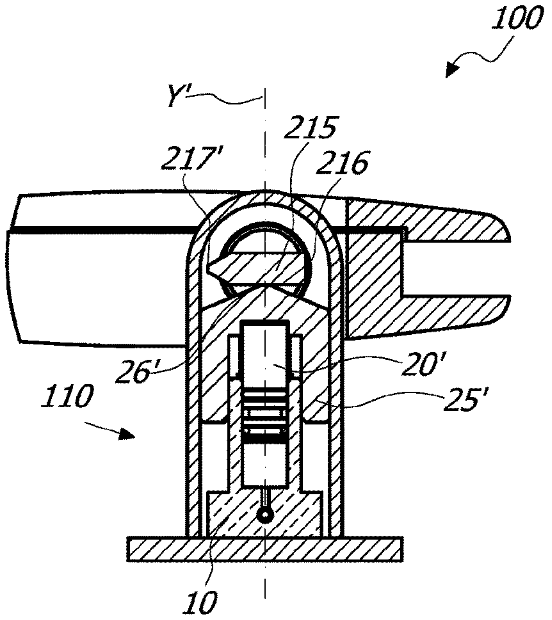
Figure 20C:
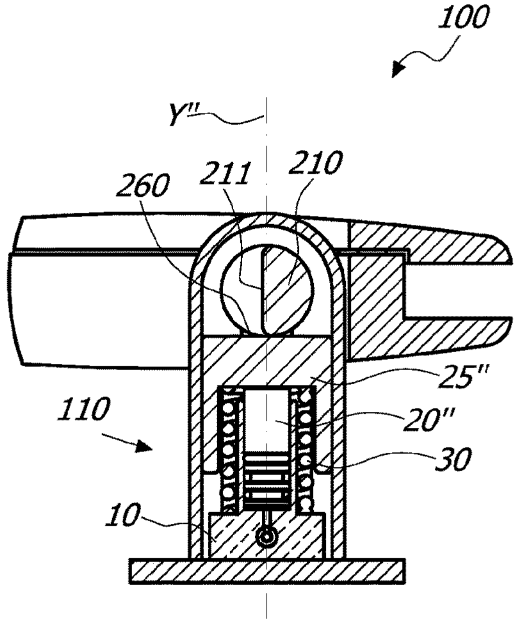
Figure 22:
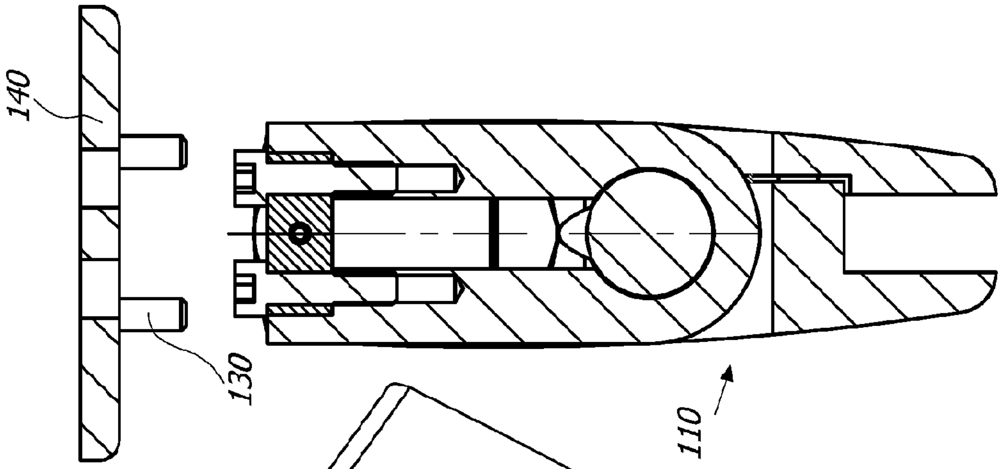
FIGS. 21 and 22 are partially exploded views—respectively axonometric and radial cross-sectional—of the embodiment of the hinge device 100 of FIGS. 15 and 16.
Figure 21:
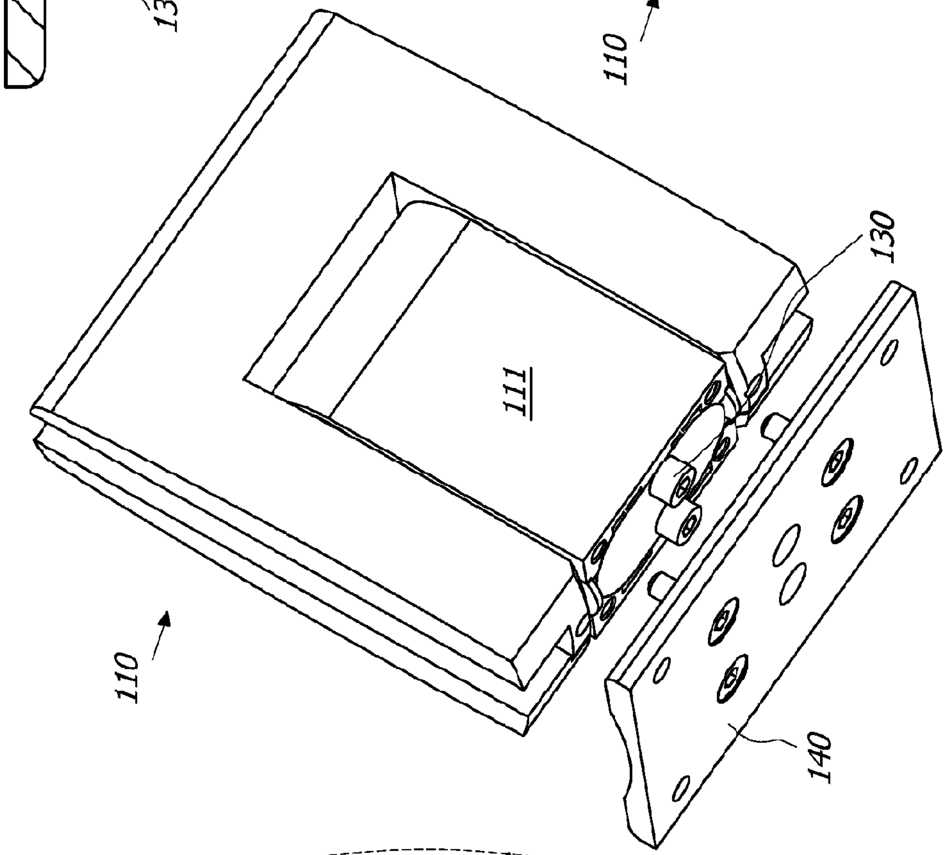

In particular, the cam means 210 may include or consist of a compartment with a planar surface 211 substantially perpendicular and parallel to the plane n respectively in the positions for closing and opening the door P, for example as shown respectively in FIGS. 18C and 20C.

Figure 69A:
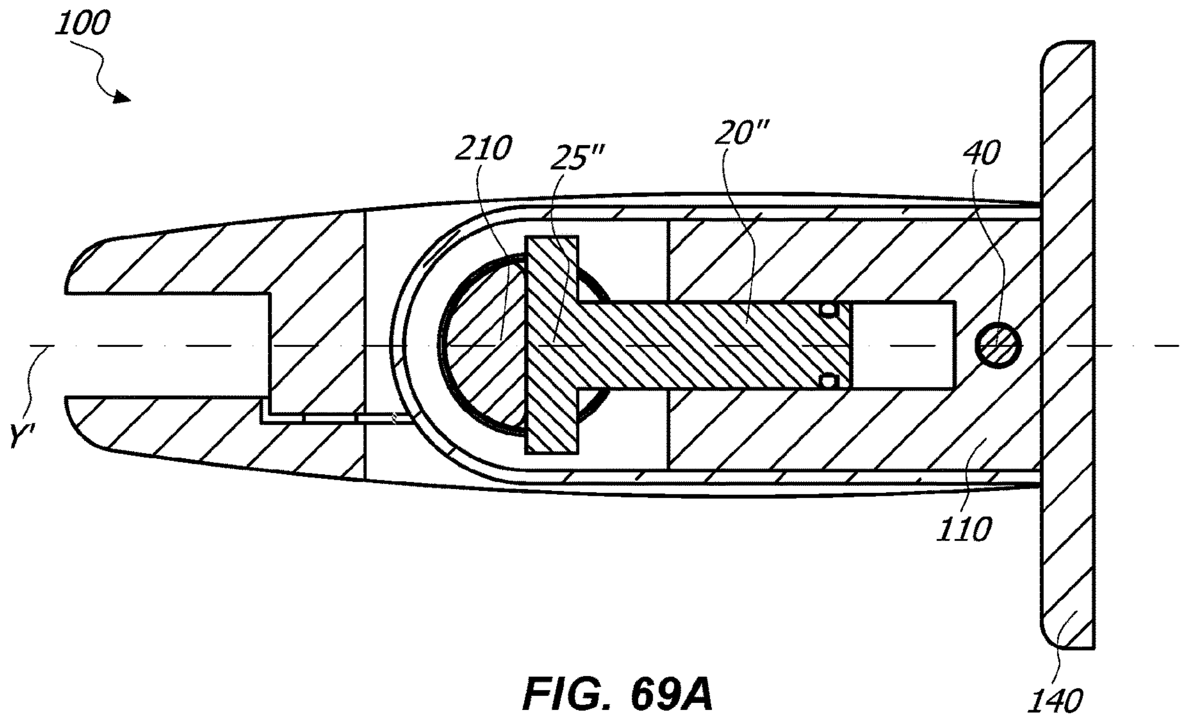
FIGS. 69A and 69B are radial cross-sectional views taken along the planes of line LXIX A-LXIX A and LXIX B-LXIX B in FIG. 67.

On the other hand, the cam follower means 25" may include or consist of a flat face 260 substantially perpendicular to the plane n both in the position for closing and in the position for opening the door P, for example as shown still respectively in FIGS. 18C, 20C and 69A.

Figure 69B:
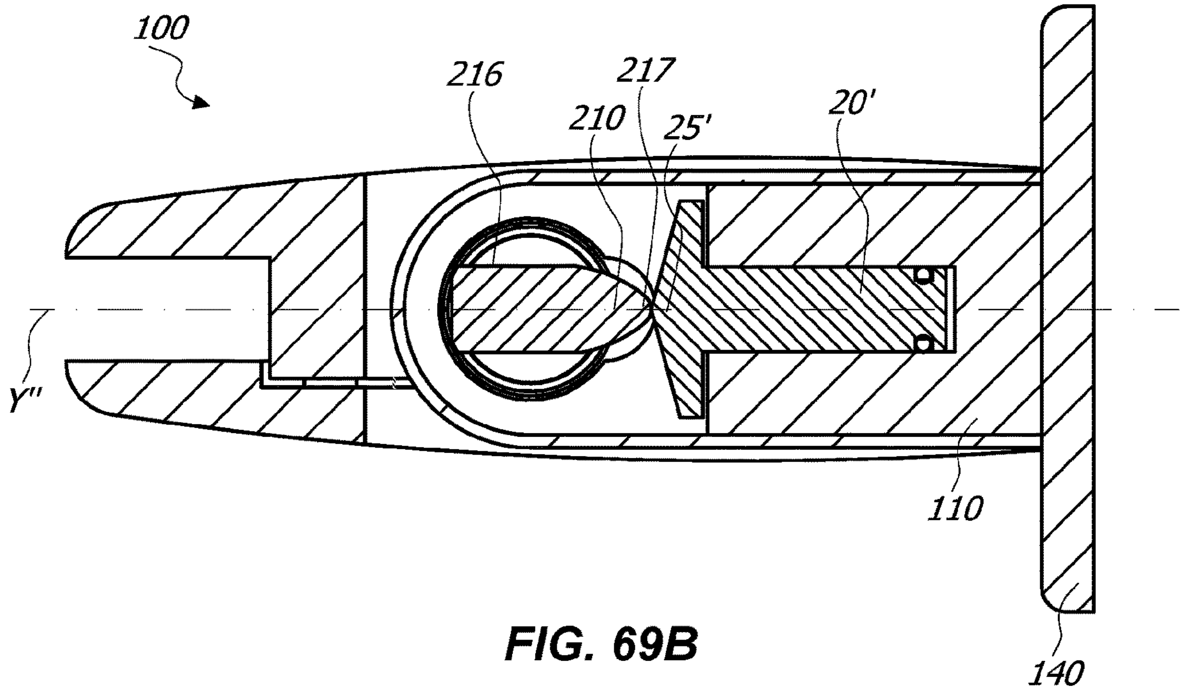

Furthermore, the cam means 215 may include or consist of a compartment with a pair of opposite flat walls 216 substantially parallel and perpendicular to the plane n respectively in the positions for closing and opening the door P, for example as shown respectively in FIGS. 18B, 20B and 69B.

An end portion 217, designed to come into contact with the cam follower means 25' in the closing position, for example shown in FIG. 18B, and be spaced apart from and not in contact with the latter in the opening position, for example shown in FIG. 20B, may be arranged between the two walls 216. More precisely, the contact area 217', which may be arranged in central position with respect to two flat and tapered surfaces 217" and 217'", of the end portion 217 may be substantially flat and perpendicular to the walls 216.

On the other hand, the cam follower means 25' may include a flat face 26' substantially perpendicular to the plane n both in the position for closing and in the position for opening the door P, for example as shown still respectively in FIGS. 18B and 20B.

Such flat face 26' may be positioned in the central position with respect to two tapered flat surfaces 26", 26'", and it may come into contact with the cam means 215 to define the stop positions at 0° and 90°. More precisely, the flat surface 26' may come into contact with the contact area 217' of the end portion 217 in the closing position, for example shown in FIG. 18B, and with one of the walls 216 in the opening position, for example shown in FIG. 20B.

This will allow not only to obtain a stop position that is stable in the closing position and in the opening positions, but also to obtain a mechanical snap of the door P toward the closing position.

Figure 20D:
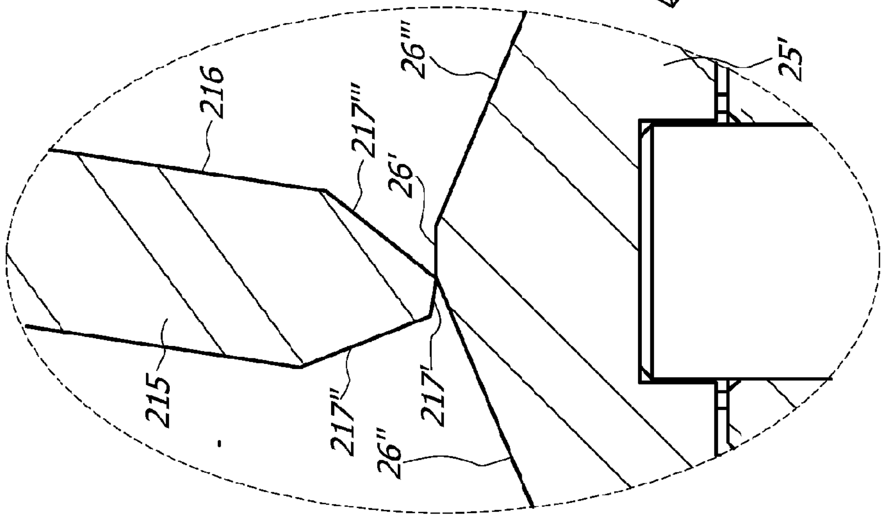

Starting from the open position for example shown in FIG. 20B, the cam means 215, initially in contact with one of the walls 216, will actually rotate around the axis X, pushing on the cam follower means 25'. Due to such rotation, the flat surface 26' may firstly come into contact with one of the surfaces 217" or 217'", depending on the opening direction, and then with the contact area 217' of the end portion 217. Upon passing from one of the surfaces 217" or 217'" to the contact area 217', the flat surface 26' will no longer have contact with a surface but with a point, as shown in FIG. 20D.

As a result, the cam means 215 will be subjected to a sudden and uncontrolled tilting around the contact point with the cam follower means 25', until the flat surface 26' and the contact area 217' will not be in mutual contact to define the closing stop position. Due to the fact that the thrust of spring 30 is continuous and independent from the hydraulic control, this causes a mechanical snap of the hinge device 100 toward the closing position.

Suitably configuring the profile of the cam means 215 and of the cam follower means 25' will allow to predetermine the point where such snap occurs. On the other hand, the force of the snap will be determined by the force of the spring 30.

It is also clear that configuring the cam follower means 25' or cam means 215 so that they are without the plane 26' will allow the hinge devices to be without snap.

In the embodiments of FIGS. 5A-10C and 33-42, the cam means 215, 210 and the cam follower means 25', 25" may lie on a plane substantially parallel to or coincident with the plane n identified by the axes Y', Y".

Suitably, the cam means 215, 210 may extend perpendicularly from the first axis X to come into contact with the first and second cam follower means 25', 25" and move the stems 20', 20" as described above.

In particular, the cam means 215, 210 may have surfaces 26, 26" and 260 designed to interact with the surfaces 217 and 211 of cam follower means 25', 25".

Similarly to the above, in proximity of the closed position the cam means 215 will tilt around the contact point between the surfaces 26 and 26" until the surface 26' will not come into contact with the surface 217, defining the closing stop position.

It is clear that the profile of the cams and of the cam follower of the embodiments is shown herein only by way of example, and it may be configured depending on the motion to be imparted to the door P to open or close.

With particular reference to the embodiment of FIGS. 33-38, the block 31 may include cam means 25", while the cam follower 25' may be removably fitted onto the stem 20'. This simplifies the mounting of the hinge to the maximum.

Figure 35:
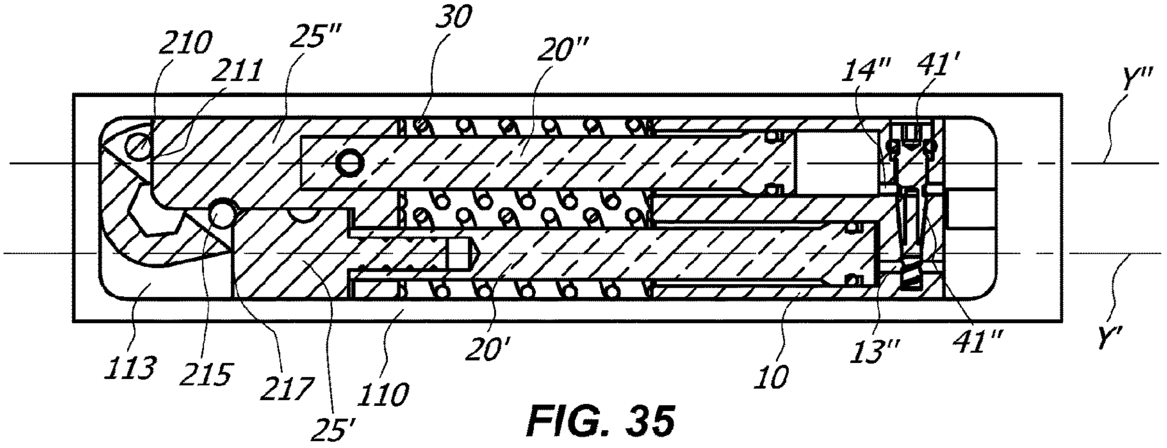
FIGS. 35 and 37 are views of the embodiment of the hydraulic hinge device 100 of FIGS. 33 and 34 with the upper half-shell 111 of the hinge body 110 removed and the internal components in axial section, respectively in the closed and open positions of the closing element P.
Figure 36:
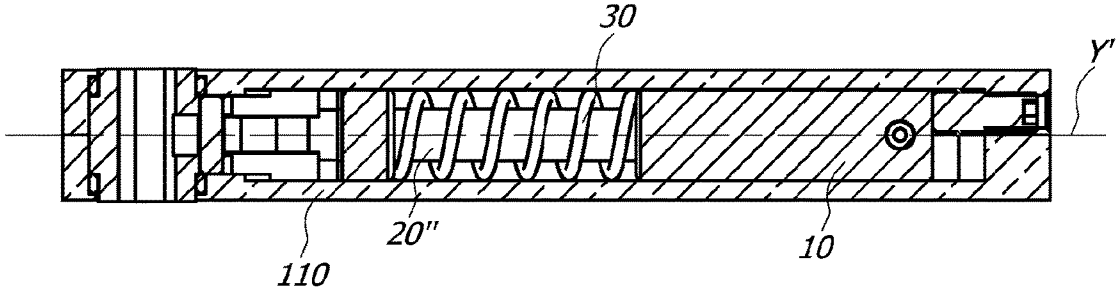
FIGS. 36 and 38 are views of the embodiment of the hydraulic hinge device 100 of FIGS. 33 and 34 in axial section with a cross-sectional plane substantially perpendicular to that of FIGS. 35 and 37, respectively in the closed and open positions of the closing element P.
Figure 37:
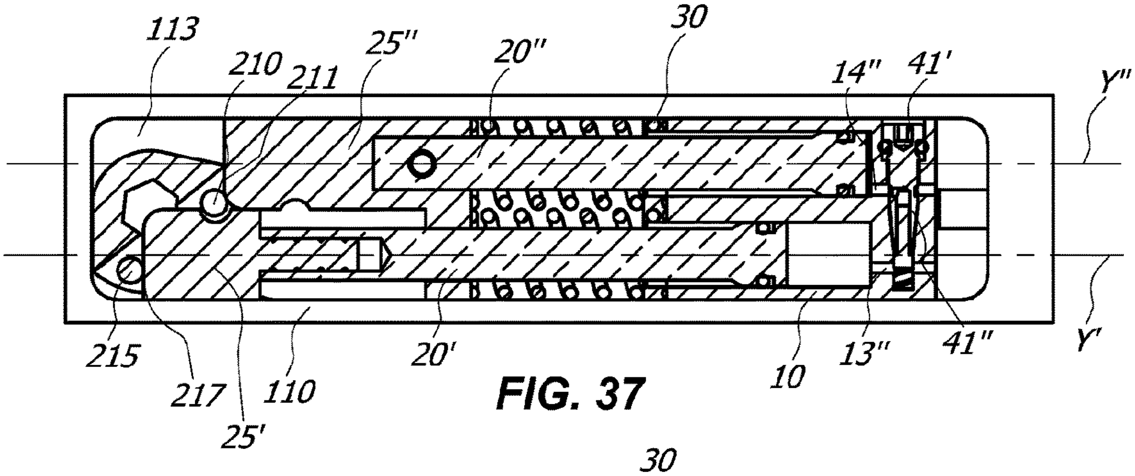
Figure 38:
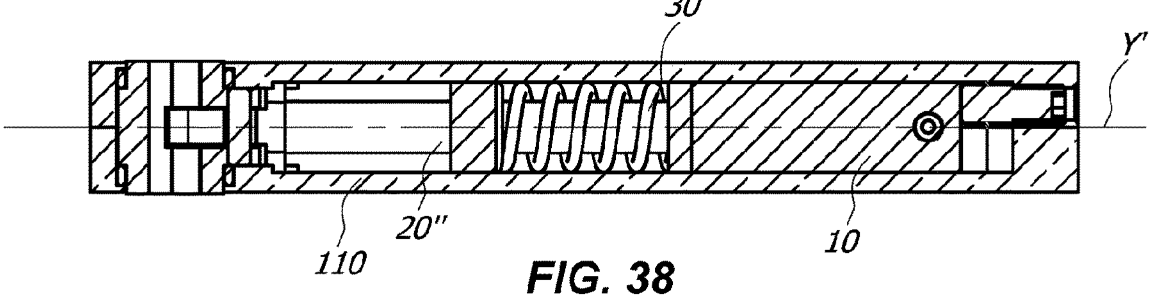

In such embodiment, the pivot 200 may be configured to impact against the shell 111 both to open and to close, as shown in FIGS. 35 and 37. To close, this allows to confer a pre-load to the door P, which push against the relative door leaf. Then, to open, such solution acts as a system for preventing the unhinging of the door P, preventing the impact thereof against any obstacles. To this end, both the cam followers 25', 25" may be provided with a system for discharging the cams 210, 215.

Figure 39:
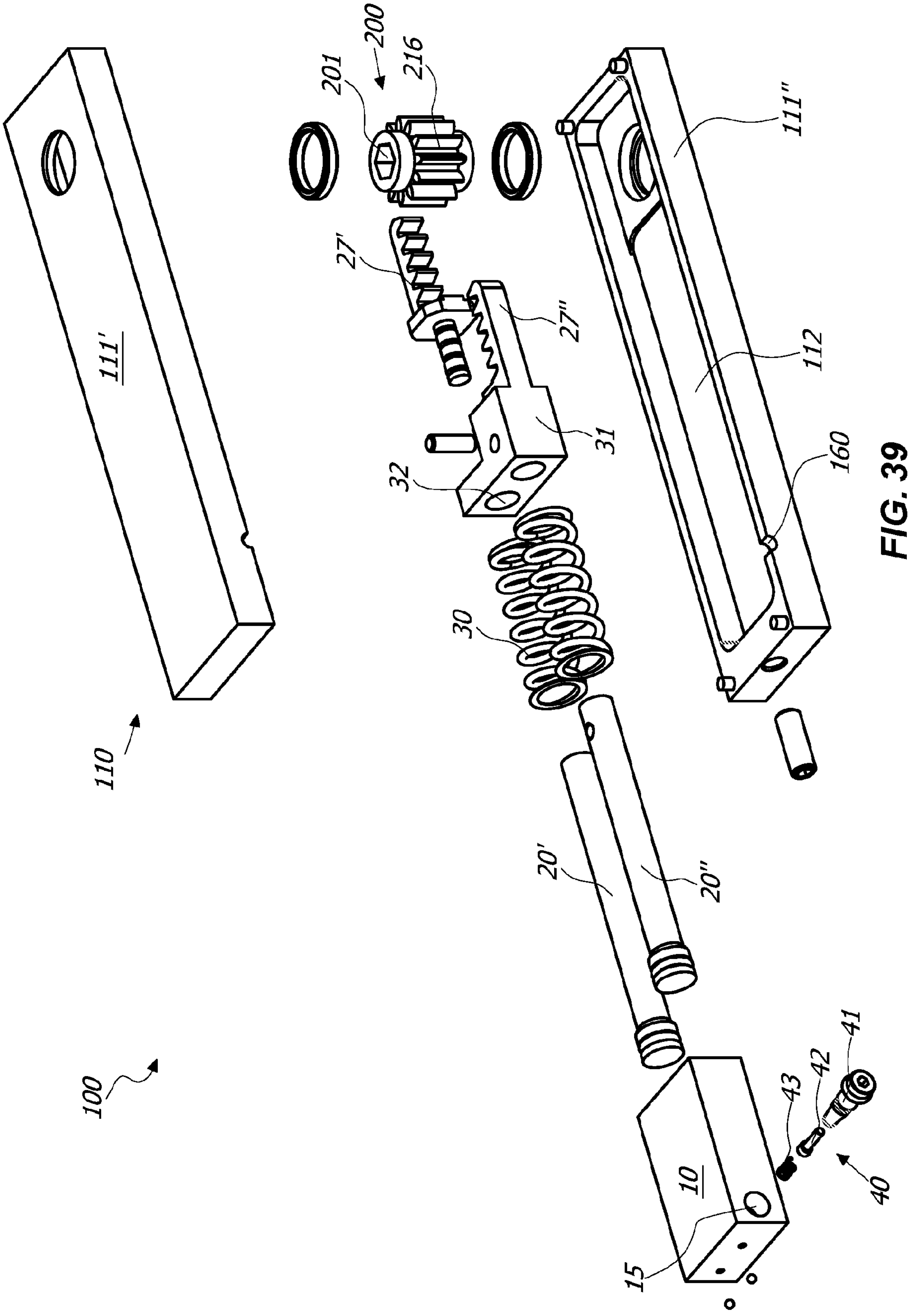
FIG. 39 is an exploded axonometric schematic view of a fourth embodiment of a hydraulic hinge device 100 which includes the embodiment of the unit 1 of FIGS. 29 and 30.
Figure 40A:
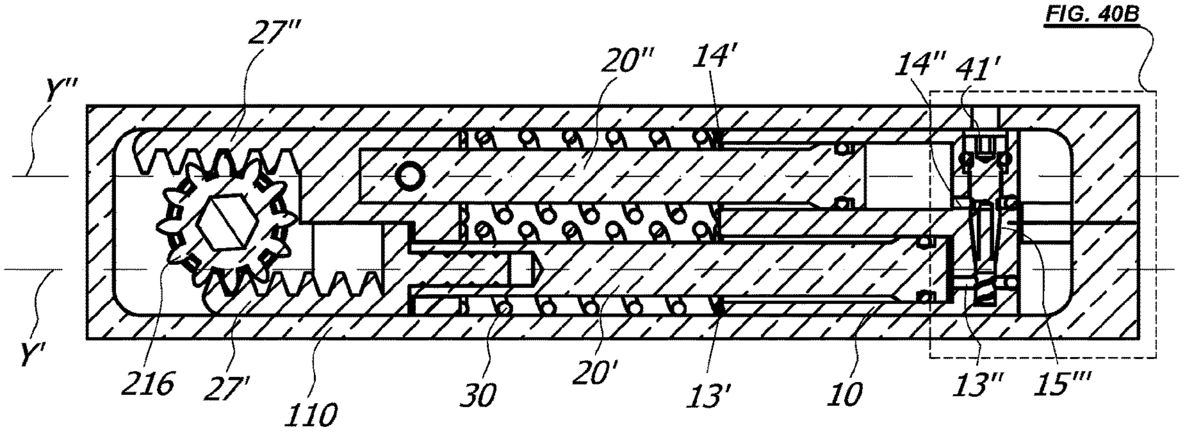
FIG. 40A is an axial cross-sectional view of the embodiment of the hydraulic hinge device 100 of FIG. 39 in the closed position of closing element P, with FIG. 40B showing some enlarged details.
Figure 40B:
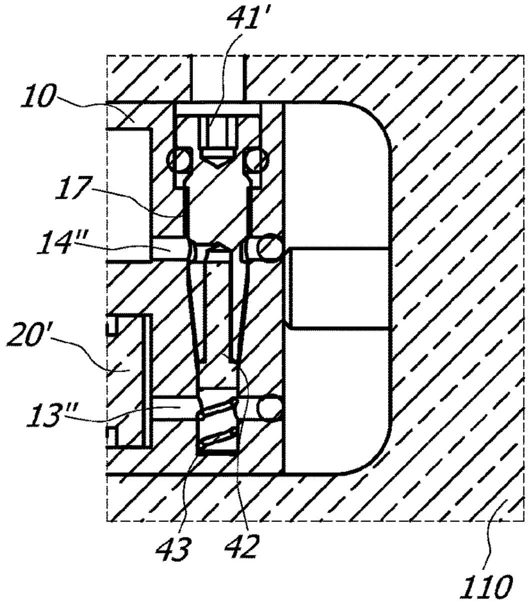
Figure 41:
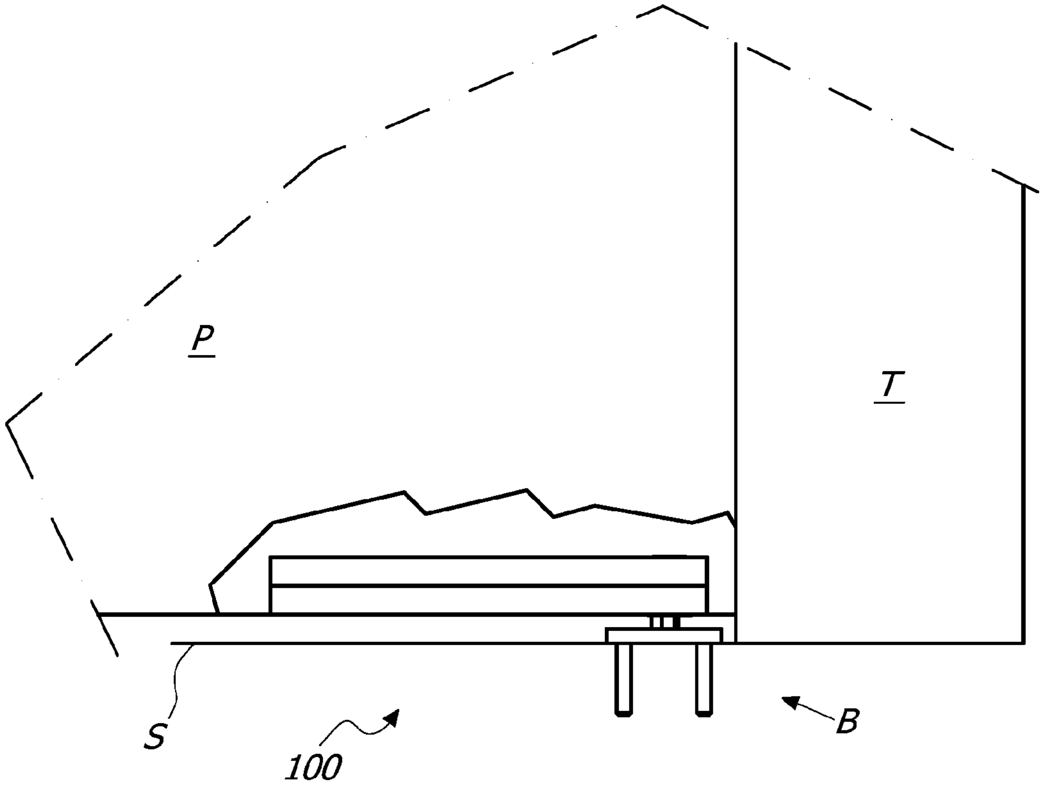
FIG. 41 is a schematic view of the embodiment of the hydraulic hinge device 100 of FIGS. 35 and 37 anchored to a closing element P and fixed to a floor S, with FIG. 42 showing a partially cross-sectional view to highlight the bushing B adjustment system.
Figure 42:
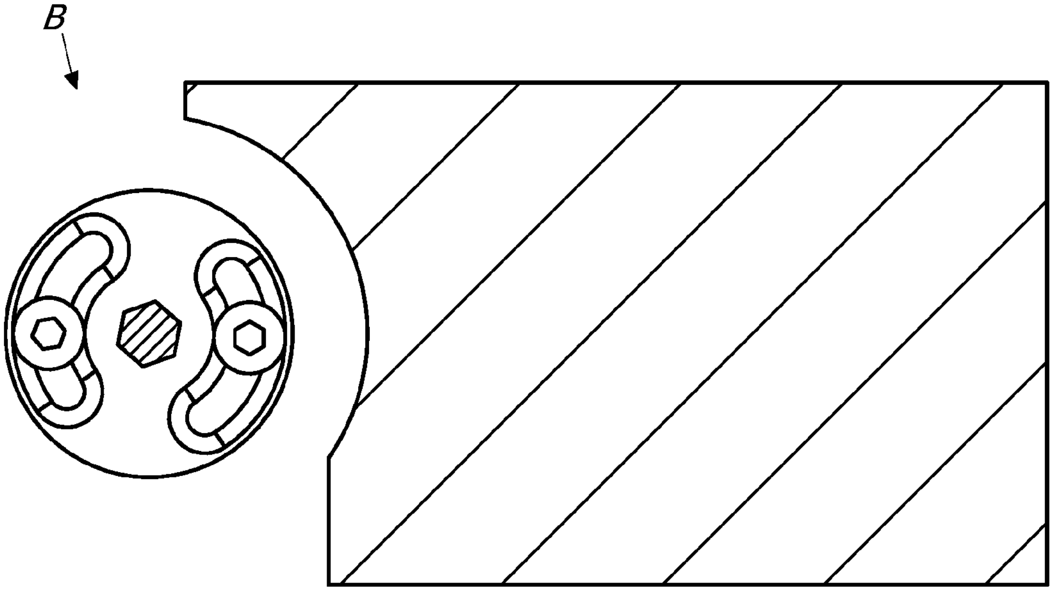

Alternatively to the cam and cam follower means, in a preferred but non-exclusive embodiment for example shown in FIGS. 39-40B the pivot 200 may have pinion means 220 susceptible to interact with corresponding rack and pinion means 27', 27" integrally coupled respectively with the stems 20', 20". The rack and pinion means 27" may be included in the block 31, which in turn may be inserted by means of a pin on the stem 20". On the other hand, the rack and pinion means 27' may be removably inserted into the stem 20', which may freely slide through the opening 32.

Such embodiment allows the maximum control on the door P, which will always close from any opening position.

The hinge device 100 is very easy to mount, given that the control unit 1 with the cam follower means and the pivot 200, the whole pre-assembled as a pack, are basically inserted into the compartment 112 and then the shell 111 is closed using a closing element. Finish covers may be possibly provided for.

Advantageously, the adjustment element 40 may be accessible even with the hinge device mounted, possibly removing a finish cover.

In the embodiment of FIGS. 15-27, 33-38, 39-40B, 56-58 and 65-69B, the adjustment element 40 may actually be accessible through an opening 160, while in the embodiment of FIGS. 48-51 the adjustment element 40 may be accessible by removing the cover 161.

With particular reference to the embodiment of FIGS. 15-27, the shell 111 may have sliding guides 125', 125" into which cam follower means 25', 25" are slidably inserted.

This will make the mounting of the hinge extremely easy, and the movement exceptionally fluid.

Still with reference to such embodiment, after inserting the pivot 200 into the shell 111 and the cam follower means 25', 25" into the guides 125', 125", it will be sufficient to screw the control unit 1 to the shell 111, using screws 130 passing through the body 10.

At that point, to complete the mounting it is sufficient to screw the aforementioned assembly to the fixing plate 140 by means of screws 141. Such type of mounting makes such hinge device particularly versatile, given that the assembly can be mounted on various types of plates 140.

The screws 130 may pass through the fixing plate 140 so that once in operative position the head thereof rests on the plate 140 so that the latter bears the weight of the plate P.

Given that in the embodiment of FIGS. 65-69B the control unit 1 is integrated in the hinge body 110 to define means for hydraulically controlling the flow of the working fluid, such embodiment may be without screws 130, but it may however include pins 131 passing through the plate 140 to bear the weight of the door P.

Figure 68:
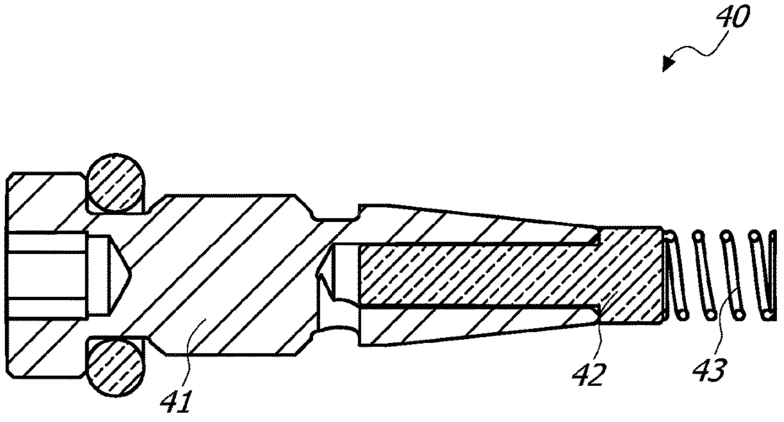
FIG. 68 is an axial cross-sectional view of an alternative embodiment of the adjustment element 40 included in the hydraulic hinge device 100 of FIG. 65.

Suitably, such embodiment may provide for an adjustment element configured like in FIG. 68, that is comprising an adjustment screw 41, plug element 42 and spring 43, or the adjustment screw 41 alone.

Furthermore, such embodiment may provide for a finish cover 162.

In the light of the above, it is clear that the invention attains the pre-set objectives.

The invention is susceptible to numerous modifications and variants, all falling within the scope of protection of the attached claims. All details can be replaced by other technically equivalent elements, and the materials can be different depending on the needs, without departing from the scope of protection defined by the attached claims.

The invention claimed is:

1. A hydraulic hinge device for a controlled rotary movement of a closing element (P), which can be anchored to a stationary support structure(S), the hydraulic hinge device comprising:

a hinge body (110) configured to be integrally anchored to one of the closing element (P) and the stationary support structure(S);

a pivot (200) configured to be integrally anchored to the other one of the closing element (P) and the stationary support structure(S), said pivot (200) defining a first axis (X), said hinge body (110) and said pivot (200) being mutually rotatably coupled to rotate one with respect to the other around an axis substantially parallel to or coincident with said first axis (X) between an opening position and a closing position of the closing element (P);

control means (1) for controlling a flow of a working fluid, comprising:

a first and a second hydraulic working chamber (11, 12) housing said working fluid, said first and said second hydraulic working chamber (11, 12) comprising a respective first and second opening (13', 14');

a duct (15) for a fluidic connection of said first and said second working chamber (11, 12);

an adjustment element (40) for adjusting the flow of the working fluid arranged in said duct (15); and a first and a second stem (20', 20") sealingly and slidably inserted into the respective first and second opening (13', 14') to slide along a respective second and third axis (Y', Y"), each of said first and said second stems (20', 20") comprising an end (21', 22') respectively disposed inside the first and the second hydraulic working chamber (11, 12) and an opposite end (21", 22") external thereto respectively slidable along the second and the third axes (Y', Y") between respective positions distal from and proximal to the respective first and second openings (13', 14');

wherein said hinge body (110) internally includes a compartment (112) comprising said pivot (200), said compartment (112) further including said control means (1) or the control means being removably insertable into said compartment (112);

wherein said working fluid is exclusively contained in said first and said second working chamber (11, 12) and said duct (15), said compartment (112) comprising a dry portion (113) which includes said pivot (200) and the opposite ends (21", 22") of said first and said second stem (20', 20");

wherein said first and said second hydraulic working chamber (11, 12) respectively comprise a third and a fourth opening (13", 14") that are fluidically connected by said duct (15);

wherein said pivot (200) comprises a first and a second cam portion (215, 210) susceptible to dry-interact selectively and alternately, and without mechanical linkages, with corresponding at least first and second cam followers (25', 25") integrally coupled respectively with said opposite ends (21", 22") of said first and said second stem (20', 20"); and wherein, to a mutual rotation of said hinge body (110) and said pivot (200) around said axis substantially parallel to or coincident with said first axis (X) between said opening position and said closing position of the closing element (P), there corresponds a sliding of one of said opposite ends (21") along the respective second or third axis (Y') from a respective distal position from said third opening (14') toward a respective proximal position and a simultaneous sliding of the other one of said opposite ends (22") along the respective second or third axis (Y") from the respective proximal position from said fourth opening (14") toward the respective distal position and vice versa, said sliding of the one of said opposite ends (21") causing a thrust to be applied to the working fluid in the first hydraulic working chamber, and further causing a passage of the working fluid in the duct (15), and a thrust to be applied by the working fluid on the other one of said opposite ends (22") and the simultaneous sliding thereof.

2. The device according to claim 1, wherein said hinge body (110) and said pivot (200) rotate mutually so that:

to a rotation from one of said opening position and said closing position, there corresponds the sliding of one of said opposite ends (21") along the respective second or third axis (Y') from the respective distal position toward the respective proximal position and the simultaneous sliding of the other one of said opposite ends (22") along the respective second or third axis (Y") from the respective proximal position toward the respective distal position; and to the rotation of the other one of said opening position and said closing position, there corresponds the sliding of said one of said opposite ends (21") along the respective second or third axis (Y') from the respective proximal position toward the respective distal position and the simultaneous sliding of said other one of said opposite ends (22") along the respective second or third axis (Y") from the respective distal position toward the respective proximal position.

3. The device according to claim 1, wherein said hinge body (110) and said pivot (200) rotate mutually so that:

to the rotation from one of said opening position and said closing position, there corresponds the sliding of said first stem (20') along said second axis (Y') from said first opening (13') toward said second opening (13") and a corresponding sliding of said second stem (20") along said third axis (Y") from said fourth opening (14") toward said third opening (14'); and to the rotation of the other one of said opening position and said closing position, there corresponds the sliding of said second stem (20") along said third axis (Y") from said third opening (14') toward said fourth opening (14") and the corresponding sliding of said first stem (20') along said second axis (Y') from said second opening (13") toward said first opening (13').

4. The device according to claim 1, wherein said first and said second cam followers (25', 25") are monolithic with said first and said second stem (20', 20") to define the respective opposite ends (22', 22") or are removably coupled with the first and the second stem (20', 20").

5. The device according to claim 1, further comprising elastic counteracting means (30) acting on one of said first and said second cam followers (25") to push said first and said second cam followers against corresponding first or second cams (210), the other one of said first and said second cam followers (25') being without the elastic counteracting means.

6. The device according to claim 1, wherein each of said first and said second stems (20', 20") comprises respective first and second elastic counteracting means (30) coaxially coupled therewith, said control means (1) having respective second abutment surfaces (16), an abutment element (31) being provided for being fixed to said one of said first or said second stem (20', 20") which includes said corresponding first or second cam portions (215, 210) and respective first abutment surfaces (23), said first and said second elastic counteracting means (30) being interposed between the respective first and second abutment surfaces (16, 23) to act on said one of said first and said second stem (20', 20"), said abutment element (31) having at least one passage (32) for the other one of said first or said second stem (20', 20").

7. The device according to claim 1, wherein both said first and said second cam follower portions (25') are without elastic counteracting means.

8. A hydraulic hinge device for a controlled rotary movement of a closing element (P), which can be anchored to a stationary support structure(S), the hydraulic hinge device comprising:

a hinge body (110) configured to be integrally anchored to one of the closing element (P) and the stationary support structure(S);

a pivot (200) configured to be integrally anchored to the other one of the closing element (P) and the stationary support structure(S), said pivot (200) defining a first axis (X), said hinge body (110) and said pivot (200) being mutually rotatably coupled to rotate one with respect to the other around an axis substantially parallel to or coincident with said first axis (X) between an opening position and a closing position of the closing element (P);

control means (1) for controlling a flow of a working fluid, comprising:

a first and a second hydraulic working chamber (11, 12) housing said working fluid, said first and said second hydraulic working chamber (11, 12) comprising a respective inlet port (13', 14');

a line (15) for a fluidic connection of said first and said second working chamber (11, 12);

an adjustment element (40) for adjusting the flow of the working fluid arranged in said fluidic connection line (15); and a first and a second stem (20', 20") sealingly and slidably inserted into the respective inlet port (13', 14') to slide along a respective second and third axis (Y', Y"), each of said first and said second stems (20', 20") comprising an end (21', 22') respectively disposed inside the first and the second hydraulic working chamber (11, 12) and an opposite end (21", 22") external thereto respectively slidable along the second and the third axes (Y', Y") between respective positions distal from and proximal to the respective inlet ports (13', 14'), wherein said hinge body (110) internally includes a compartment (112) comprising said pivot (200), said compartment (112) further including said control means (1) or the control means being removably insertable into said compartment (112), wherein said working fluid is exclusively contained in said first and said second working chamber (11, 12) and said fluidic connection line (15), said compartment (112) comprising a dry portion (113) which includes said pivot (200) and the opposite ends (21", 22") of said first and said second stem (20', 20"), wherein said pivot (200) comprises a first and a second cam portion (215, 210) susceptible to dry-interact selectively and alternately with corresponding at least first and second cam followers (25', 25") integrally coupled respectively with said opposite ends (21", 22") of said first and said second stem (20', 20"), wherein, to a mutual rotation of said hinge body (110) and said pivot (200) around said axis substantially parallel to or coincident with said first axis (X) between said opening position and said closing position of the closing element (P), there corresponds a sliding of one of said opposite ends (21") along the respective second or third axis (Y') from a respective distal position toward a respective proximal position and a simultaneous sliding of the other one of said opposite ends (22") along the respective second or third axis (Y") from the respective proximal position toward the respective distal position and vice versa, and wherein said control means (1) consist of a control unit (1) having a main body (10), which internally includes said first and said second hydraulic working chamber (11, 12), said fluidic connection line (15), said adjustment element (40) and said first and said second stem (20', 20") being sealingly and slidably inserted into the respective inlet port (13', 14') of said first and said second hydraulic working chamber (11, 12), said control unit (1) being removably insertable into said compartment (112).

9. The device according to claim 8, wherein said hinge body (10) comprises a shell (111) into which said pivot (200) and said control unit (1) can be inserted, the control unit (200, 1) being insertable into the shell (111).

10. The device according to claim 1, wherein said adjustment element (40) comprises a screw (41) engaged in a nut screw (17) for widening or narrowing a passage section (15'") of said duct (15), said screw (41) comprising a vacant end (41') which can be controlled from outside by a user and an opposite end (41") inserted into said fluidic connection line (15).

11. A hydraulic hinge device for a controlled rotary movement of a closing element (P), which can be anchored to a stationary support structure(S), the hydraulic hinge device comprising:

a hinge body (110) configured to be integrally anchored to one of the closing element (P) and the stationary support structure(S);

a pivot (200) configured to be integrally anchored to the other one of the closing element (P) and the stationary support structure(S), said pivot (200) defining a first axis (X), said hinge body (110) and said pivot (200) being mutually rotatably coupled to rotate one with respect to the other around an axis substantially parallel to or coincident with said first axis (X) between an opening position and a closing position of the closing element (P);

control means (1) for controlling a flow of a working fluid, comprising:

a first and a second hydraulic working chamber (11, 12) housing said working fluid, said first and said second hydraulic working chamber (11, 12) comprising a respective first and second opening (13', 14');

a line (15) for a fluidic connection of said first and said second working chamber (11, 12);

an adjustment element (40) for adjusting the flow of the working fluid arranged in said fluidic connection line (15); and a first and a second stem (20', 20") sealingly and slidably inserted into the respective first and second opening (13', 14') to slide along a respective second and third axis (Y', Y"), each of said first and said second stems (20', 20") comprising an end (21', 22') respectively disposed inside the first and the second hydraulic working chamber (11, 12) and an opposite end (21", 22") external thereto respectively slidable along the second and the third axes (Y', Y") between respective positions distal from and proximal to the respective first and second opening (13', 14'), wherein said hinge body (110) internally includes a compartment (112) comprising said pivot (200), said compartment (112) further including said control means (1) or the control means being removably insertable into said compartment (112), wherein said working fluid is exclusively contained in said first and said second working chamber (11, 12) and said fluidic connection line (15), said compartment (112) comprising a dry portion (113) which includes said pivot (200) and the opposite ends (21", 22") of said first and said second stem (20', 20"), wherein said first and said second hydraulic working chamber (11, 12) respectively comprise a third and a fourth opening (13", 14") that are fluidically connected by said duct (15), wherein said pivot (200) comprises a first and a second cam portion (215, 210) susceptible to dry-interact selectively and alternately with corresponding at least first and second cam followers (25', 25") integrally coupled respectively with said opposite ends (21", 22") of said first and said second stem (20', 20").

wherein, to a mutual rotation of said hinge body (110) and said pivot (200) around said axis substantially parallel to or coincident with said first axis (X) between said opening position and said closing position of the closing element (P), there corresponds a sliding of one of said opposite ends (21") along the respective second or third axis (Y') from a respective distal position toward a respective proximal position and a simultaneous sliding of the other one of said opposite ends (22") along the respective second or third axis (Y") from the respective proximal position toward the respective distal position and vice versa, wherein said adjustment element (40) comprises a screw (41) engaged in a nut screw (17) for widening or narrowing a passage section (15'") of said fluidic connection line (15), said screw (41) comprising a vacant end (41') which can be controlled from outside by a user and an opposite end (41") inserted into said fluidic connection line (15), and wherein said screw (41) further comprises:

i. a first passage opening (44") at said opposite end (41") placed in fluid communication with one of said third or said fourth opening (13");

ii. a second passage opening (44') placed in fluid communication with the other one of said third or said fourth opening (14"); and iii. an internal duct (45) extending between said first and said second passage opening (44', 44") to place said first and said second passage opening in mutual fluid communication.

12. The device according to claim 11, wherein said opposite end (41") is inserted into a portion of said duct (15), said duct and said opposite end (41") having a substantially frustoconical shape, said passage section (15'") being defined by an interspace between said portion of said duct (15) and said opposite end (41").

13. The device according to claim 12, wherein said adjustment element (40) further comprises at a plug (42) inserted into said first passage opening (44") to selectively plug said first passage opening, said plug (42) being susceptible to open said first passage opening (44") upon a sliding of said first stem (20') from one (13') of said first opening and said second opening toward the other one (13") of said first opening and said second opening to allow the working fluid to flow through said internal duct (45) and plug said internal duct upon a reverse sliding to force the working fluid through said passage section (15'").

14. The device according to claim 13, wherein said plug (42) includes an enlarged end (42') designed to interact with said first passage opening (44") and a stem (42") slidably inserted into said internal duct (45) of said screw (41) so that, upon said sliding of said first stem (20') from one (13') of said first opening or said second opening toward the other one (13") of said first opening and said second opening, the working fluid controllably flows through the interspace between said internal duct (45) and said stem (42") of said plug (42).

* * * * *